United States Patent [19]
Guthrie et al.

[11] Patent Number: 5,388,223
[45] Date of Patent: Feb. 7, 1995

[54] 1-BIT TOKEN RING ARBITRATION ARCHITECTURE

[75] Inventors: Guy Guthrie, Manassas; Jeffery L. Swarts, Falls Church, both of Va.

[73] Assignee: International Business Machines Corporation, Armonk, N.Y.

[21] Appl. No.: 755,474

[22] Filed: Sep. 5, 1991

[51] Int. Cl.⁶ .............................................. G06F 13/36
[52] U.S. Cl. .................................. 395/325; 370/85.4; 370/85.5; 364/229.3; 364/241.8; 364/242.6; 364/242.92; 364/240; 364/240.2; 364/DIG. 1
[58] Field of Search ............... 395/725, 325, 200, 275; 370/85.4, 85.6, 85.2; 340/825.5, 825.06

[56] References Cited
U.S. PATENT DOCUMENTS

| | | | |
|---|---|---|---|
| 4,481,577 | 11/1984 | Forson | 395/600 |
| 4,517,670 | 5/1985 | Ulug | 370/85.6 |
| 4,556,974 | 12/1985 | Kozlik | 370/89 |
| 4,646,232 | 2/1987 | Chang et al. | 364/200 |
| 4,680,581 | 7/1987 | Kozlik et al. | 340/825.06 |
| 4,700,185 | 10/1987 | Balph et al. | 340/825.06 |
| 4,730,268 | 3/1988 | Marin | 395/325 |
| 4,748,560 | 5/1988 | Kataoka | 395/325 |
| 4,779,092 | 10/1988 | Takao | 340/825.52 |
| 4,799,052 | 1/1989 | Near et al. | 340/825.5 |
| 4,930,121 | 5/1990 | Shiobara | 370/85.4 |
| 4,972,313 | 11/1990 | Getson, Jr. et al. | 364/200 |
| 5,034,883 | 7/1991 | Donaldson et al. | 364/200 |
| 5,053,946 | 10/1991 | Jain | 395/275 |
| 5,081,623 | 1/1992 | Ainscow | 370/85.4 |
| 5,111,424 | 5/1992 | Donaldson et al. | 395/725 |
| 5,181,202 | 1/1993 | Walser et al. | 370/85.15 |
| 5,216,668 | 6/1993 | Zhang | 370/60 |

Primary Examiner—Gopal C. Ray
Attorney, Agent, or Firm—Joseph C. Redmond, Jr.; Mark A. Wurm; Jeffrey S. Labaw

[57] ABSTRACT

A 1-bit token ring arbitration architecture where a plurality of chips which require access to a shared bus are coupled together in a ring is described. Each chip receives an arbitration in signal from the preceding member of the ring which is used to receive the token. Each chip transmits an arbitration out signal to the following member of the ring to send the token to the following member. In the preferred embodiment, the token appears as a 1 cycle active low pulse. An error signal notifies all the bus participants that a ring error has been detected. Preferably, the number of cycles the error signal is held active, the more severe the error. A request of bus (ROB) signal notifies the chip holding the token that another bus member needs to use the bus. The ROB signal allows the current holder of the token to maintain control of the bus if it has further processing on the bus as long as no other bus member needs the bus. A Token Hold Timer may be included in a ring member which defines how long the member can hold on to the token after receiving notification on the ROB line that another bus participant wants the bus.

20 Claims, 48 Drawing Sheets

FIG. 4

| Micro Channel Bus | | MIC | | Local Processor Bus | |
|---:|:---:|:---:|:---:|:---:|:---|
| +A(0:31)i | <——/32—> | * | * | <—/20——> | +ADDR/DATA(0:19)i |
| +APAR(0:3)i | <——/4—> | * | * | <—/3——> | +A/D PAR(0:2)i |
| -APAREN | <——/1—> | G05 | F11 | <—/1——> | -ALE |
| +D(0:31)i | <——/32—> | * | F10 | <—/1——> | +R/W |
| +DPAR(0:3)i | <——/4—> | * | F09 | <—/1——> | -DAV |
| -DPAREN | <——/1—> | G06 | F08 | <—/1——> | +RDY |
| -ADL | <——/1—> | M07 | E11 | <—/1——> | +M/ -IO |
| -CD SFDBK | <——/1— | R14 | F07 | <—/1——> | -BHE |
| -SFDBKRTN | ——/1—> | N12 | D11 | <—/1—— | -LPB ERR |
| -DS 16 RTN | ——/1—> | N11 | D15 | <—/1—— | -LPM/SS4_IN |
| -DS 32 RTN | ——/1—> | P11 | A05 | ——/1——> | -BUS REQ/SS3_OUT |
| -BE(0:3)i | <——/4—> | * | C11 | <—/1—— | -BUS GNT/SS3_IN |
| +MADE 24 | <——/1—> | R01 | A03 | <—/1—— | -CSEL |
| -SBHE | <——/1—> | S02 | * | ——/4——> | -INT(0:3) |
| +M/ -IO | <——/1—> | M06 | | | |
| -SO, -SI | <——/2—> | * | | | Local Data Bus |
| -CMD | <——/1—> | M09 | | | |
| +CD CHRDY | <——/1— | R11 | * | <—/10——> | +ADDR(0:9)i |
| +CHRDYRTN | ——/1—> | R12 | * | <—/2——> | +APAR(0:1)i |
| -SDEN | <——/1— | Q13 | * | <—/32——> | -DATA(0:31)i |
| -MSDR | <——/1—> | Q11 | * | <—/4——> | -DPAR(0:3)i |
| -SDR(0), -SDR(1) | <——/2—> | * | C15 | <—/1——> | +R/W |
| -SD STB | <——/1—> | M08 | * | <—/4——> | -BE(0:3)i |
| +ARBI(0:3)i | ——/4—> | * | E17 | ——/1——> | -RARBO/SS2_OUT |
| +ARBO(0:3)i | <——/4— | * | J15 | <—/1—— | -RARBI/SS2_IN |
| +ARB/ -GNT | ——/1—> | J01 | D16 | <—/1——> | -LDB ERR |
| -BURST | <——/1 | K03 | N17 | <—/1——> | -HALE |
| -PREEMPT | <——/1—> | M01 | Q16 | <—/1——> | -ROB |
| -IRQ(0:3) | <——/4— | * | | | |
| +IRQ_SEL/SS1_OUT | <——/1— | G03 | | | Self Test Interface |
| -CD SETUP | ——/1—> | S01 | | | |
| -CHCK | <——/1 | F06 | * | <—/2—— | +A/B CLK |
| +M/ -S | <——/1 | N04 | A01 | <—/1—— | +DIN/SS1_IN |
| +DO/ -I | <——/1 | Q03 | A02 | <—/1—— | +MODE |
| -DLOE | <——/1 | Q05 | C03 | <—/1—— | -SEL |
| -NTLBE | <——/1— | P08 | C04 | ——/1——> | +DOUT/SS4_OUT |
| +AO/ -I | <——/1 | P05 | | | |
| | | | | | Miscellaneous |
| Micro Channel | 119 | | * | <—/2—— | +SYS CLK |
| Local Data Bus | 58 | | * | <—/2—— | +SD CLK |
| Local Processor Bus | 38 | | K14 | <—/1—— | +TEST_C |
| Self Test Interface | 6 | | * | <—/4—— | +DI/+TI/+CI/+SG |
| Miscellaneous | 10 | | K12 | <—/1—— | +SYS RESET |
| Total Signal I/O | 231 | | | | |

FIG. 14

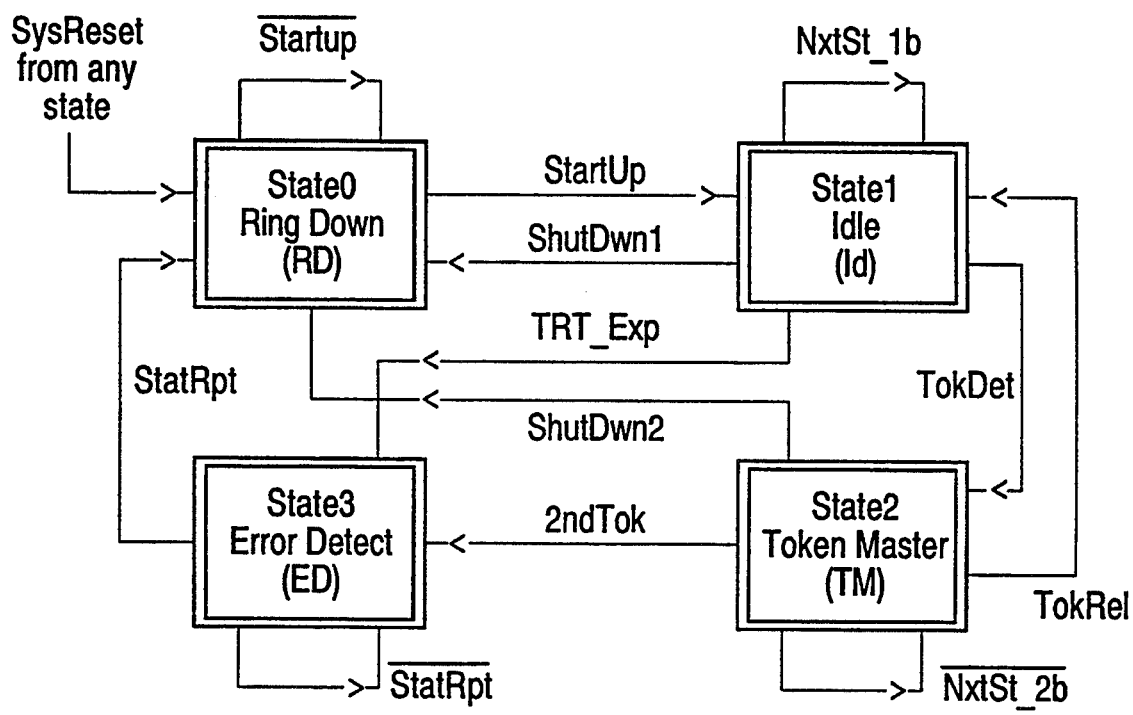

ShutDwn1 = ErrIn & ErrIn_D1 & $\overline{TRT\_Exp}$

ShutDwn2 = ErrIn & ErrIn_D1 & $\overline{2ndTok}$

ErrRpt = Error Reported

StartUp = $\overline{ErrIn}$ & $\overline{ErrIn\_D1}$ & TokOut

NxtSt_1b = $\overline{ShutDwn1}$ & $\overline{TokDet}$ & $\overline{THT\_Exp}$

TokRel = TokOut & $\overline{ShutDwn2}$ & $\overline{2ndTok}$

TokDet = TokIn & $\overline{ShutDwn1}$ & $\overline{THT\_Exp}$

NxtSt_2b = $\overline{ShutDwn2}$ & $\overline{TokRel}$ & $\overline{2ndTok}$

TRT_Exp = Token Hold Timer Expired

2ndTok = TokIn

FIG. 15A

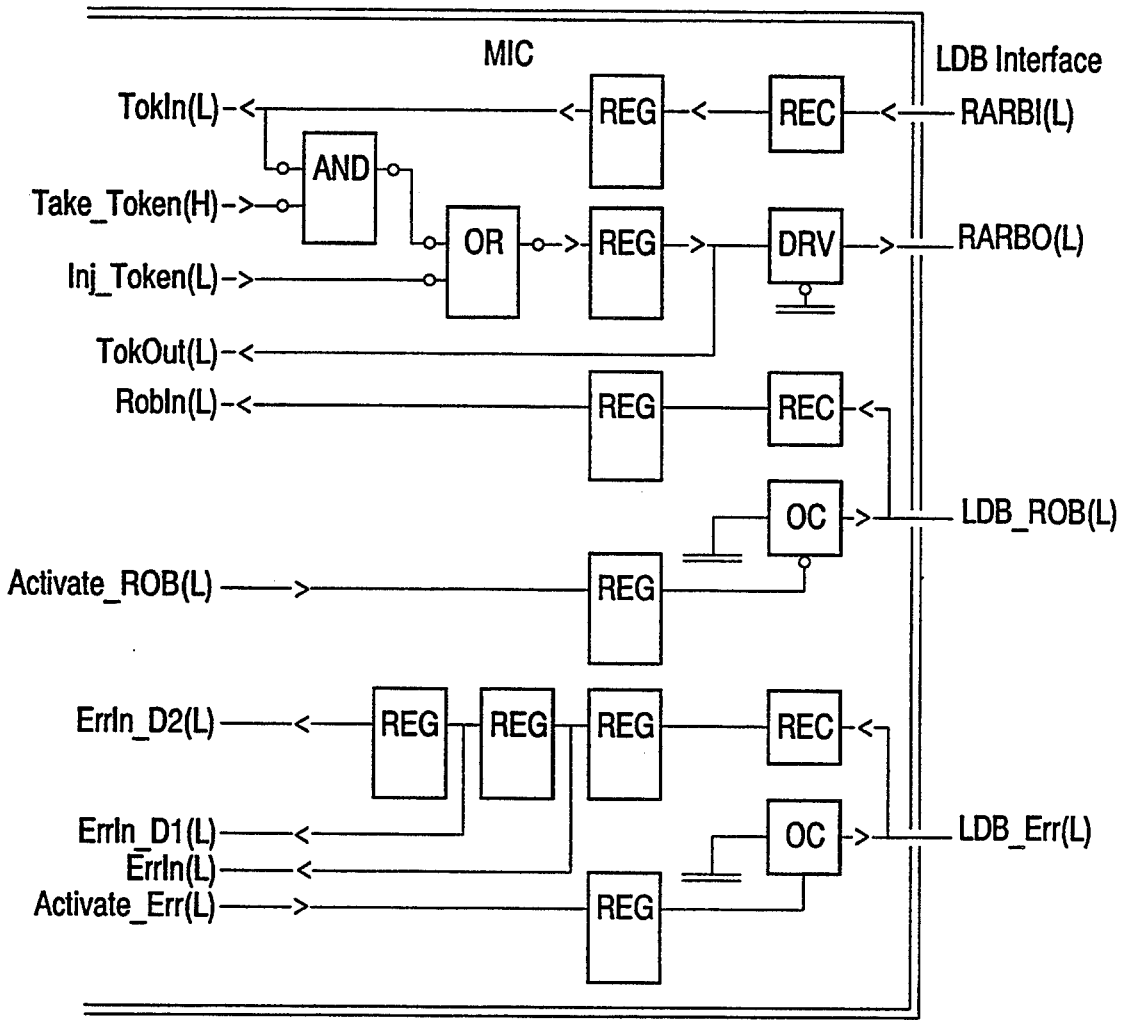

REC = Receiver, REG = Register, OC = Open Collector Driver, DRV = Driver

Inj_Token(L) = [State0 & Ring_Master & ErrIn & ErrIn_D1 & TokOut] +
 [State2 & $\overline{\text{TokIn}}$ & RelOwn]

Take_Token(H) = [State1 & ReqBus & TokDet] + [State1 & TRT_Exp] +
 State2 + State3 + SysReset +
 [State0 & (ErrIn + ErrIn_D1 + ErrIn_D2)]

Activate_ROB(L) = ReqBus & [(State1 & $\overline{\text{TokIn}}$) + (State2 & TokOut)]

Activate_Err(L) = State3 + (State1 & TRT_Exp) + (State2 & 2ndTok)

RelOwn = Release Ownership = State2 & $\overline{\text{TokOut}}$ & (THT_Exp + $\overline{\text{ReqBus}}$)

RelOwn = Release Ownership
 RPE = Ring Participate Enable
 ReqBus = Internal chip request to use bus
 Ring_Master = initialization register that tells device to
  start ring if it was down.

- c1 (cycle 1)
  - defined by Device 1 passing the token on to the next device
  - last cycle Device 1 can drive HALE, R/-W, and ADDR(0:9)
    (Note: HALE is driven inactive to prepare for release)

- c2 (cycle 2)
  - last cycle Device 1 can drive or have LDS drive DATA(0:31)

- c3 (cycle 3)
  - 1st cycle Device 2 can drive ADDR(0:9), HALE, and R/-W

- c4 (cycle 4)
  - 1st cycle Device 2 can drive DATA(0:31) and BE(0:3)

FIG. 23

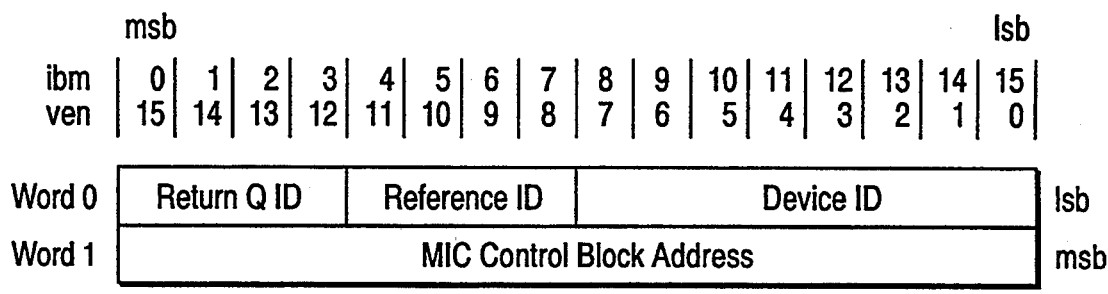

| Word | Bits | Name: Description |
|---|---|---|
| 0 | 0 - 3 i<br>15 - 12 v | Return Queue Identification (RQID) number:<br>    Indicates the Queue number which the MIC will return the<br>    MSW to at the end of the Command Transfer. |
| 0 | 4 - 7 i<br>11 - 8 v | Reference Identification (RID) number:<br>    Software pointer to reference the MCW with the MSW & MPC.<br>    Note: This field has no relevance to MIC operations and<br>           can be redefined and used by software. |
| 0 | 8 - 15 i<br>7 - 0 v | Device Identification (DID) number:<br>    Software pointer or device reference field.<br>    Note: This field has no relevance to MIC operations and<br>           can be redefined and used by software. |
| 1 | 0 - 15 i<br>15 - 0 v | MIC Control Block Address (MCB Addr):<br>    The upper 16-bits of the LPB memory address where<br>    the MCB or first MCB in a chain can be found. The<br>    starting MCB Address is generated by the following;<br>    MCB LPB Address = MCB Address:0000 |

FIG. 24

| | msb | | | | | | | | | | | | | | lsb |
|---|---|---|---|---|---|---|---|---|---|---|---|---|---|---|---|
| ibm | 0 | 1 | 2 | 3 | 4 | 5 | 6 | 7 | 8 | 9 | 10 | 11 | 12 | 13 | 14 | 15 |
| ven | 15 | 14 | 13 | 12 | 11 | 10 | 9 | 8 | 7 | 6 | 5 | 4 | 3 | 2 | 1 | 0 |

| | | |
|---|---|---|
| Word 0 | OPE \| PCI \| JMP \| CHN \| NOP \| FMT \| BUF \| PST \| WAT \| 0 \| 0 \| 0 \| ABM | lsb |
| Word 1 | MC Device Queue Control I/O Address \| 0 \| MPC Queue ID | |
| Word 2 | Source Address (MSB) | |
| Word 3 | Source Address (LSB) | |
| Word 4 | Command/Status Flags \| 0 0 0 0 0 0 0 0 | |
| Word 5 | Target Address (MSB) | |
| Word 6 | Target Address (LSB) | |
| Word 7 | Block Length | msb |

| Word | Bits | Name: Description |
|---|---|---|
| 0 | 0 - 2 i<br>15 - 13 v | Operation (OPE) :<br>This field defines the data movement during the Commanded Transfer.<br>000 = LDB to Micro Channel I/O Address space.<br>001 = LDB to Micro Channel Memory Address space.<br>010 = Micro Channel I/O Address space to LDB.<br>011 = Micro Channel Memory Address space to LDB.<br>1XX = LDB to LDB, wrap operation.<br>Note : The CEN field in POS register 2 MUST be disabled when OPE='1XX', LDB to LDB wrap operation. CEN MUST be enabled when OPE='0XX'. |
| 0 | 3 i<br>12 v | Program Controlled Interrupt (PCI) :<br>0 = The MIC will NOT post a MSW to a Queue at the end of the Commanded Transfer unless there was an error.<br>1 = The MIC will build and post a MSW to the Queue number defined in the RQID at the end of the Commanded Xfer. |

FIG. 25

| Word | Bits | Name: Description |
|---|---|---|
| 0 | 4 i<br>11 v | Jump (JMP) :<br>0 = No jump.<br>1 = The MIC will use the least significant 16-bits of the Source Address field in forming the address of the next MCB. |
| 0 | 5 i<br>10 v | Chain (CHN) :<br>0 = No chaining.<br>1 = The address of the next MCB is equal to the current starting MCB address plus 16 bytes. |
| 0 | 6 i<br>9 v | No Operation (NOP) :<br>0 = No no-op.<br>1 = MIC will only process the PCI flag. No actual data or Commanded Transfer will occur. |
| 0 | 7 i<br>8 v | Format (FMT) :<br>This bit indicates whether data movement during the Commanded Transfer will occur.<br>0 = Data Block Move operation and Status Posting operations enabled.<br>1 = Status Posting operations only. |
| 0 | 8 i<br>7 v | Free Block Request (BUF) :<br>0 = During a Data Block Move operation the destination address is specified by the Target Address.<br>1 = During a Data Block Move operation the destination address is read from the Free Block List pointed to by the MC Device Queue Control Address. |
| 0 | 9 i<br>6 v | Post Command / Status Request (PST) :<br>0 = No MPC will be sent to a MC device after the completion of the Commanded Transfer.<br>1 = A MPC will be built and sent to the Queue defined in MPC Queue ID field to the address defined by the MC Device Queue Control Address after the completion of the Commanded Transfer. |

FIG. 26

| Word | Bits | Name: Description |
|---|---|---|
| 0 | 10 i<br>5 v | Wait (WAT) :<br>0 = The MIC will process the MCB immediately and will continue to read the remaining words of the MCB.<br>1 = The MIC will not process the MCB and will continue to reread MCB Word 0 until WAT=0.<br>Note: The MIC will reread MCB Word 0 approximately every 256 clock cycles (10.24usec), automatically. |
| 0 | 11 - 13 i<br>4 - 2 v | Reserved at a value of '0'. |
| 0 | 14 - 15 i<br>1 - 0 v | Address Burst Management (ABM)<br>This field defines the ABM size used for the Commanded Transfer Writes. These bits override the ABM field defined in the MC POS Register 4 Sub-Address 0000.<br>00 = ABM defined in the POS Register (default)<br>01 = 16 byte address boundary.<br>10 = 32 byte address boundary.<br>11 = 64 byte address boundary.<br>Note: This field is only valid when OPE=00X. |
| 1 | 0 - 11 i<br>15 - 4 v | MC Device Queue Control I/O Address:<br>This field defines the starting MC I/O Address location where the MIC can access control registers necessary to complete a Queue or Free Block Fetch operation. These control register should have the same format as the MIC's I/O Control Registers (QRC, QWC, QD, and FB registers) and should be located at the following address offsets; QRCR = 0000, QWCR = 0100, QDR = 1000, FBR = 1100. |
| 1 | 12 - 15 i<br>3 - 0 v | Micro Channel Post Command Queue ID (MPC QID) :<br>This field defines the Queue number on another MC device where the MPC can be posted to. The receiving Queue's Byte Count is 8 bytes. |
| 2 | 0 - 15 i | Source Address (MSB) :<br>The high order address bits used to source data which will be moved during the Commanded Transfer. FMT MUST equal '0', to use this field. |

FIG. 27

| Word | Bits | Name: Description |
|---|---|---|
| 3 | 0 - 15 i<br>15 - 0 v | Source Address (LSB) :<br>The low order address bits used to source data which will be moved during the Commanded Transfer. Also, these bits define the MCB LPB Address when JMP='1'. |
| 4 | 0 - 7 i<br>15 - 8 v | Command / Status Flags :<br>Flags used for Command / Status transfers. This word specifies no MIC function and can be used for software defined functions and flags. |
| 4 | 8 - 15 i<br>7 - 0 v | Reserved at a value of '0'. |
| 5 | 0 - 15 i<br>15 - 0 v | Target Address (MSB) :<br>The high order address bits used to target data which will be moved during the Commanded Transfer. Note : the MPC does not use the 8 msb of this field. |
| 6 | 0 - 15 i<br>15 - 0 v | Target Address (LSB) :<br>The low order address bits used to target data which will be moved during the Commanded Transfer. |
| 7 | 0 - 15 i<br>15 - 0 v | Block Length :<br>The number of bytes which will be moved during the Commanded Transfer. |

FIG. 28

| Commanded Operation | OPE | PCI | JMP | CHN | NOP | FMT | BUF | PST | WAT |
|---|---|---|---|---|---|---|---|---|---|
| LDB to MC I/O Addr | 000 | X | 0 | X | 0 | 0 | 0 | 0 | X |
| LDB to MC Memory Addr | 001 | X | 0 | X | 0 | 0 | 0 | X | X |
| | 001 | X | 0 | X | 0 | 0 | 1 | 1 | X |
| MC I/O Addr to LDB | 010 | X | 0 | X | 0 | 0 | 0 | 0 | X |
| MC Memory Addr to LDB | 011 | X | 0 | X | 0 | 0 | 0 | 0 | X |
| LDB to LDB Wrap | 1XX | X | 0 | X | 0 | 0 | 0 | 0 | X |
| Posting Only | 0XX | X | * | * | 0 | 1 | 0 | 1 | X |
| NOP | XXX | X | * | * | 1 | X | X | 0 | X |

\* - Valid Chain and Jump Flags are defined in this figure ⟶

| JMP | CHN | |
|---|---|---|
| 0 | 0 | last MCB |
| 0 | 1 | MCB = MCB + 16 |
| 1 | 0 | MCB = SRC Addr |
| 1 | 1 | Illegal |

FIG. 29

|       | msb |    |    |    |    |    |    |    |    |    |    |    |    |    |    | lsb |
|-------|-----|----|----|----|----|----|----|----|----|----|----|----|----|----|----|-----|
| ibm   | 0   | 1  | 2  | 3  | 4  | 5  | 6  | 7  | 8  | 9  | 10 | 11 | 12 | 13 | 14 | 15  |
| ven   | 15  | 14 | 13 | 12 | 11 | 10 | 9  | 8  | 7  | 6  | 5  | 4  | 3  | 2  | 1  | 0   |

| Word 0 | 1 | 1 | 0 | 1 | Reference ID |   |   |   | Device ID |   |   |   |   |   |   |   | lsb |
|--------|---|---|---|---|--------------|---|---|---|-----------|---|---|---|---|---|---|---|-----|
| Word 1 | 0 | 0 | 0 | MXSM State | | | | 0 | 0 | 0 | FBR | MXSM RC | | | | | |
| Word 2 | 0 | 0 | 0 | 0 | 0 | 0 | 0 | 0 | 0 | 0 | 0 | 0 | 0 | 0 | 0 | 0 | |
| Word 3 | MIC Control Block Address | | | | | | | | | | | | | | | | msb |

| Word | Bits | | Name: Description |
|------|------|---|-------------------|
| 0 | 0 - 3<br>15 - 12 | i<br>v | These bits define the source Queue number of the MSW, which for the MIC is Queue # D ('1101') |
| 0 | 4 - 7<br>11 - 8 | i<br>v | Reference Identification (RID) number :<br>Software pointer to reference the MCW with the MSW. |
| 0 | 8 - 15<br>7 - 0 | i<br>v | Device Identification (DID) number :<br>Software pointer to reference the MCW with the MSW. |
| 1 | 0 - 2<br>15 - 13 | i<br>v | Reserved at a value of '0'. |
| 1 | 3 - 7<br>12 - 8 | i<br>v | Master Execution State Machine State :<br>This field defines the state which the Master Execution Unit was in at the end of the Commanded Transfer.<br>If no error occurred then MXSM State = '00000'. |
| 1 | 8 - 10<br>7 - 5 | i<br>v | Reserved at a value of '0' |
| 1 | 11<br>4 | i<br>v | Free Block Return (FBR) :<br>This indicates that an error has occurred which required the MIC to return a Fetched Free Block from another MC device. If MCB field BUF='0' then this field is invalid.<br>0 = The MIC was unsuccessful in returning the FB to the MC device it was fetched from.<br>1 = The MIC was successful in returning the FB to the MC device it was fetched from. |
| 1 | 12 - 15<br>3 - 0 | i<br>v | Master Execution State Machine Return Code :<br>This field indicates the completion status of the Commanded Transfer operation. * |
| 2 | 0 - 15<br>15 - 0 | i<br>v | Reserved at a value of '0'. |
| 3 | 0 - 15<br>15 - 0 | i<br>v | MCB Address :<br>The upper 16-bits of the LPS memory address where the MCB or last MCB was used for the Commanded Transfer. |

FIG. 30

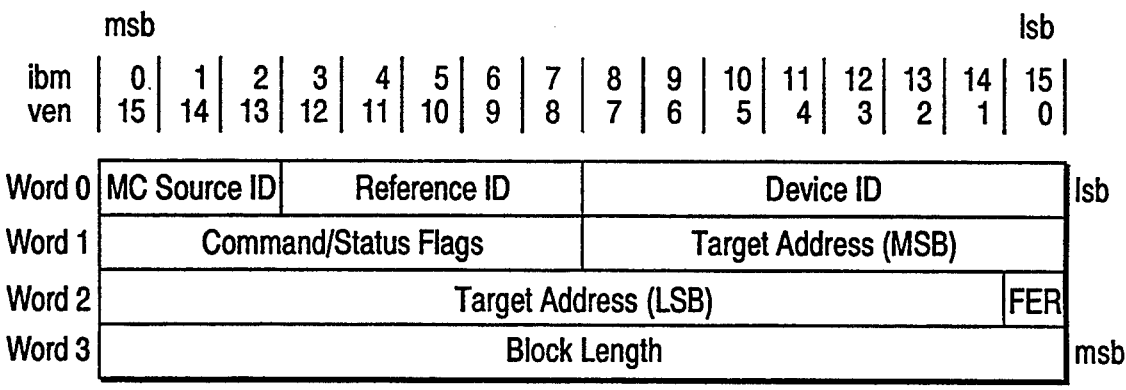

| Word | Bits | | Name: Description |
|---|---|---|---|
| 0 | 0-3<br>15-12 | i<br>v | MC Source ID/Device Address :<br>These bits define the MICs Micro Channel Device Address.<br>These bits are equal to the POS Reg 2 Device Addr field. |
| 0 | 4-7<br>11-8 | i<br>v | Reference Identification (RID) number :<br>Software pointer to reference the MCW with the MSW. |
| 0 | 8-15<br>7-0 | i<br>v | Device Identification (DID) number :<br>Software definable. |
| 1 | 0-7<br>15-8 | i<br>v | Command/Status Flags :<br>Flags used for Command / Status transfers. This word<br>specifies no MIC function and can be used for software<br>defined functions and flags. |
| 1<br><br>2 | 8-15<br>7-0<br>0-14<br>15-1 | i<br>v<br>i<br>v | Target Address :<br>These bits define the lower 24bits of MC Mem Addr where<br>the MIC moved data to. This address field is either the<br>target address defined in the MCB or the FB Address<br>fetched from the MC device, depending on the MCB BUF field |
| 2 | 15<br>0 | i<br>v | Free Block Error (FER) :<br>This field defines whether the target address was really<br>used as the target address. Only valid if BF='1'.<br>0 = Target Address valid.<br>1 = Target Address being returned, unused address.<br>    Commanded Transfer contained an error and the<br>    Free Block is being returned. |
| 3 | 0-15<br>15-0 | i<br>v | Block Length :<br>The number of bytes which were moved during a completed<br>CT or were supposed to be moved for the CT. |

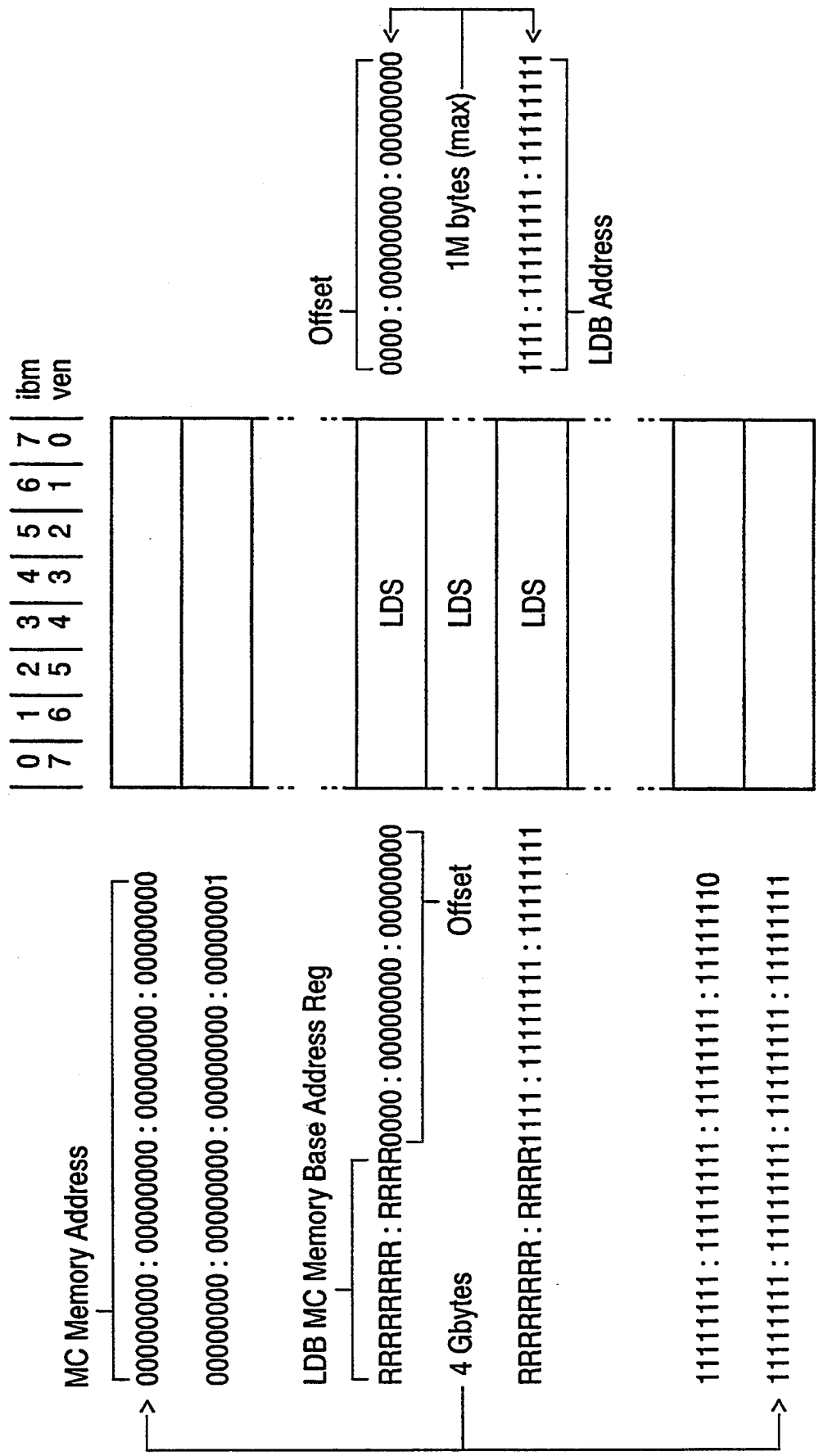

FIG. 34

|   | msb |  |  |  |  |  |  |  |  |  |  |  |  |  | lsb |
|---|---|---|---|---|---|---|---|---|---|---|---|---|---|---|---|
| ibm | 0 | 1 | 2 | 3 | 4 | 5 | 6 | 7 | 8 | 9 | 10 | 11 | 12 | 13 | 14 | 15 |
| ven | 15 | 14 | 13 | 12 | 11 | 10 | 9 | 8 | 7 | 6 | 5 | 4 | 3 | 2 | 1 | 0 |

| | | |
|---|---|---|
| Word 0 | 0 0 QBC | Queue Read Pointer (QRP) | Q RPS |
| Word 1 | Q Interrupt | Queue Write Pointer (QWP) | Q WPS |

| Word | Bits | Name: Description |
|---|---|---|
| 0 | 0 - 1  i<br>15 - 14 v | Reserved at a '0' level. |
| 0 | 2 - 3  i<br>13 - 12 v | Queue Byte Count (QBC):<br>Defines the number of bytes for a Queue entry.<br>00 - 4bytes (1K Q Entries)    10 - undefined<br>01 - 8bytes (512 Q Entries)   11 - 16 bytes (256 Q entries) |
| 0 | 4 - 13 i<br>11 - 2  v | Queue Read Pointer (QRP):<br>Defines the current value of the Queue Read Pointer.<br>For 4 byte Queues all 10-bits are valid, for 8 byte<br>Queues only the upper 9-bits are valid, and for 16<br>byte Queues only the upper 8-bits are valid.<br>Non-valid bits must be set to '0'. |
| 0 | 14 - 15 i<br>1 - 0   v | Queue Read Pointer Status (Q RPS):<br>Defines the current status for the Read Pointer.<br>00 = Pointer is available and valid.<br>01 = Pointer is temp. being used by another LPB device.<br>10 = The Queue is empty.<br>11 = The Queue is not enabled, Pointer is invalid. |
| 1 | 0 - 3   i<br>15 - 12 v | Queue Interrupt (QI):<br>Defines the interrupt used to indicate that a Queue<br>contains a Queue Entry.<br>0000 - Disabled            1000 - MC IRQ(0)<br>0001 - Reserved            1001 - MC IRQ(1)<br>0010 - Reserved            1010 - MC IRQ(2)<br>0011 - Reserved            1011 - MC IRQ(3)<br>0100 - LPB INT(0)          1100 - Reserved<br>0101 - LPB INT(1)          1101 - Reserved<br>0110 - LPB INT(2)          1110 - Reserved<br>0111 - LPB INT(3)          1111 - Reserved |
| 1 | 4 - 13 i<br>11 - 2  v | Queue Write Pointer (QWP):<br>Defines the current value of the Queue Write Pointer.<br>For 4 byte Queues all 10-bits are valid, for 8 byte Queues<br>only the upper 9-bits are valid, and for 16 byte Queues<br>only the upper 8-bits are valid.<br>Non-valid bits must be set to '0'. |
| 1 | 14 - 15 i<br>1 - 0   v | Queue Write Pointer Status (Q WPS):<br>Defines the current status for the Write Pointer.<br>00 = Pointer is available and valid.<br>01 = Pointer is temp. being used by another LPB device<br>10 = The Queue is full.<br>11 = The Queue is not enabled, Pointer is invalid. |

FIG. 36

| | msb | | | | | | | | | | | | | | | lsb |
|---|---|---|---|---|---|---|---|---|---|---|---|---|---|---|---|---|
| ibm | 0 | 1 | 2 | 3 | 4 | 5 | 6 | 7 | 8 | 9 | 10 | 11 | 12 | 13 | 14 | 15 |
| ven | 15 | 14 | 13 | 12 | 11 | 10 | 9 | 8 | 7 | 6 | 5 | 4 | 3 | 2 | 1 | 0 |

| | | |
|---|---|---|
| Word 0 | Reserved | Queue Read Pointer (QRP) | Q RPS |
| Word 1 | Reserved | Queue Write Pointer (QWP) | Q WPS |

| Word | Bits | Name: Description |
|---|---|---|
| 0 | 0-3 i<br>15-12 v | Reserved. |
| 0 | 4-13 i<br>11-2 v | Queue Read Pointer (QRP):<br>Defines the current value of the Queue Read Pointer. For 4 byte Queues all 10-bits are valid, for 8 byte Queues only the upper 9-bits are valid, and for 16 byte Queues only the upper 8-bits are valid.<br>Non-valid bits must be set to '0'. |
| 0 | 14-15 i<br>1-0 v | Queue Read Pointer Status (Q RPS):<br>Defines the current status for the Read Pointer.<br>00 = Pointer is available and valid.<br>01 = Pointer is temp. being used by another LPB device.<br>10 = The Queue is empty.<br>11 = The Queue is not enabled, Pointer is invalid. |
| 1 | 0-3 i<br>15-12 v | Reserved. |
| 1 | 4-13 i<br>11-2 v | Queue Write Pointer (QWP):<br>Defines the current value of the Queue Write Pointer. For 4 byte Queues all 10-bits are valid, for 8 byte Queues only the upper 9-bits are valid, and for 16 byte Queues only the upper 8-bits are valid.<br>Non-valid bits must be set to '0'. |
| 1 | 14-15 i<br>1-0 v | Queue Write Pointer Status (Q WPS):<br>Defines the current status for the Write Pointer.<br>00 = Pointer is available and valid.<br>01 = Pointer is temp. being used by another LPB device.<br>10 = The Queue is full.<br>11 = The Queue is not enabled, Pointer is invalid. |

FIG. 41

| MC I/O Address | msb | | | | | | | lsb | |
|---|---|---|---|---|---|---|---|---|---|
| | 0 | 1 | 2 | 3 | 4 | 5 | 6 | 7 | ibm |
| | 7 | 6 | 5 | 4 | 3 | 2 | 1 | 0 | ven |
| MIC CR MC I/O BA + 00000 ⟶ | Queue # | | | | Status | | ACK | AVL | |
| MIC CR MC I/O BA + 00001 ⟶ | 0 | 0 | 0 | 0 | 0 | 0 | 0 | 0 | |
| MIC CR MC I/O BA + 00010 ⟶ | 0 | 0 | 0 | 0 | 0 | 0 | 0 | 0 | |
| MIC CR MC I/O BA + 00011 ⟶ | 0 | 0 | 0 | 0 | 0 | 0 | 0 | 0 | |

| Location | Name: Description |
|---|---|
| CR MC I/O BA+ '00000' Bits 0-3 i 7-4 v | Queue #: (Read/Write) The number of the Queue being requested for a Queue Read Operation. Values of '0000' through '1111' are valid. |
| CR MC I/O BA+ '00000' Bits 4-5 i 3-2 v | Status: (Read Only) Return status on the Queue Read operation. 00 - Queue Read Data Ready 01 - Queue Read Data Not Ready 1X - Queue Read Data Error |
| CR MC I/O BA+ '00000' Bits 6 i 1 v | Acknowledge (ACK): (Read/Write) Used to clear the QRC register semaphore and make the MIC available for another Queue Read Operation. 0 = no effect (Write)     0 = valid (Read) 1 = clear semaphore (Write)  1 = invalid (Read) |
| CR MC I/O BA+ '00000' Bits 7 i 0 v | Available (AVL): (Read Only) This is the QRC Register Semaphore which indicates the availability of performing a Queue Read Operation. 0 = Operation temporarily unavailable, control of operation has already been obtained by another user. 1 = Operation available. |
| CR MC I/O BA+ '00001' through '00011' | Reserved at a '0' value. |

FIG. 42

| MC I/O Address | msb 0 7 | 1 6 | 2 5 | 3 4 | 4 3 | 5 2 | 6 1 | lsb 7 0 | ibm ven |
|---|---|---|---|---|---|---|---|---|---|
| MIC CR MC I/O BA + 00100 —> | Queue # | | | | QBC | | ACK | AVL | |
| MIC CR MC I/O BA + 00101 —> | 0 | 0 | 0 | 0 | 0 | 0 | 0 | 0 | |
| MIC CR MC I/O BA + 00110 —> | 0 | 0 | 0 | 0 | 0 | 0 | 0 | 0 | |
| MIC CR MC I/O BA + 00111 —> | 0 | 0 | 0 | 0 | 0 | 0 | 0 | 0 | |

| Location | Name: Description |
|---|---|
| CR MC I/O BA+ '00100' Bits 0-3 i 7-4 v | Queue #: (Read/Write) The number of the Queue being requested for a Queue Write Operation. Values of '0000' through '1111' are valid. |
| CR MC I/O BA+ '00100' Bits 4-5 i 3-2 v | Queue Byte Count (QBC): (Read/Write) The Queue Byte Count for Queue Write operations. 00 = 4 bytes    10 = reserved 01 = 8 bytes    11 = 16 bytes |
| CR MC I/O BA+ '00100' Bits 6 i 1 v | Acknowledge (ACK): (Read/Write) Used to clear the QWC register semaphore and make the MIC available for another Queue Write Operation. 0 = no effect (Write)         0 = valid (Read) 1 = clear semaphore (Write)  1 = invalid (Read) |
| CR MC I/O BA+ '00100' Bits 7 i 0 v | Available (AVL): (Read Only) This is the QWC Register Semaphore which indicates the availability of performing a Queue Write Operation. 0 = Operation temporarily unavailable, control of operation has already been obtained by another user. 1 = Operation available. |
| CR MC I/O BA+ '00101' through '00111' | Reserved at a '0' value. |

FIG. 44
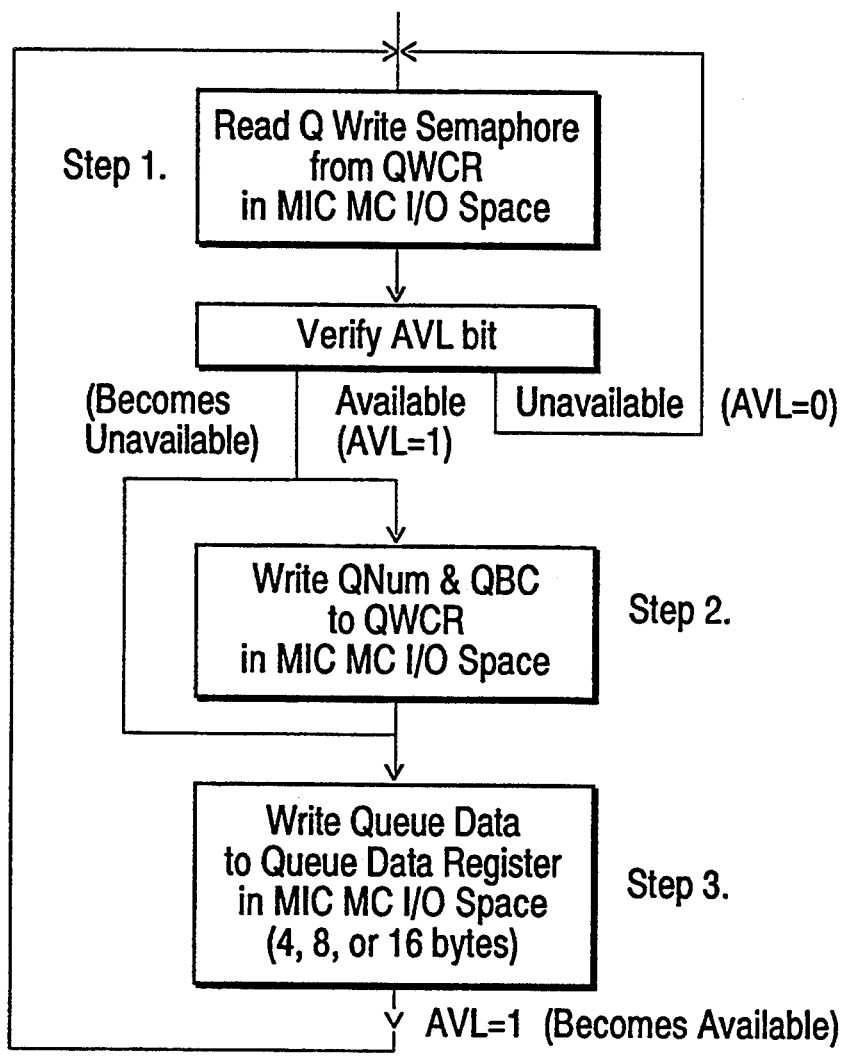
Abort/Clear Queue Write Operation
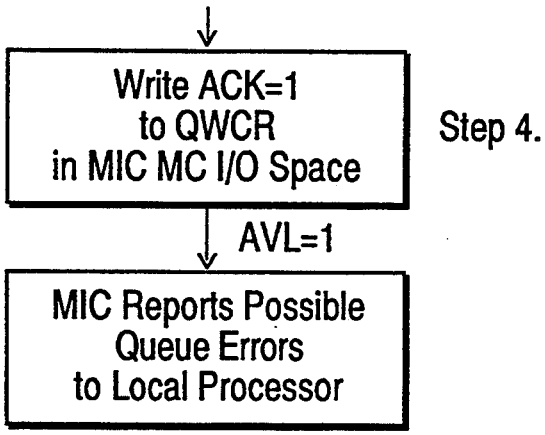

1-BIT TOKEN RING ARBITRATION ARCHITECTURE

BACKGROUND OF THE INVENTION

This invention relates generally to a method and apparatus for arbitrating control of a bus shared by a plurality of processors. More particularly, it relates to a token ring arbitration scheme which uses a 1-bit token to arbitrate between individual chips on the same adapter card.

It is well known in the art to share a data processing resource such as a data bus between a plurality of processors using arbitration to determine which processor has access to the resource at a given time. When arbitration is performed at the card level between a number of VLSI chips, a request/grant, e.g., an Intel 80186/8289 processor or multi-drop, e.g., MicroChannel (TM) arbitration or similar scheme is typically used.

While both of these architectures are well adapted for certain situations, they do have several disadvantages. Both of these methods require that either one of the bus members or another processor with logic external to all bus members be designated as the centralized point where the arbitration and error functions for the bus are accomplished. Additional logic external to each processor is also required, particularly to avoid monopolization of the bus by a single processor.

The expansion of the bus to accommodate more processors increases the amount of external arbitration control logic. Also, as the number of bus participants increases, so do the number of I/O channels dedicated to bus arbitration. For example, using the request/grant scheme, the arbitration controller's I/O count increases by two for each additional bus member. Likewise, the number of I/O signals required for the multi-drop arbitration depends on the number of members.

Where the number and type of bus participants are known, it is possible to accommodate the demands of these prior art arbitration techniques. However, when a new processor is being designed for a bus with an indeterminate number and type of bus participants, it would be advantageous to be able to dedicate a fixed, ideally low number of I/O signals to bus arbitration. Further, as the type of bus participants are unknown, it would also be desirable to limit the amount of control that any one processor can exert on the bus or fellow bus participants.

SUMMARY OF THE INVENTION

It is therefore an object of this invention to require a fixed number of I/O signals devoted to bus arbitration regardless of the number of bus participants on a given bus.

It is another object of this invention to eliminate the need for an external arbiter or external logic to control access to the bus by the bus members.

It is yet another object of this invention to prevent bus monopolization by any bus participant on a given bus.

It is a further object of this invention to improve the efficiency of the bus architecture by reducing I/O count and external logic as well as allowing the current user of the bus to remain on the bus until another bus member needs it.

These and other objects and features are accomplished by a 1-bit token ring arbitration scheme where a plurality of chips are coupled together in a ring. Each chip receives an arbitration in signal from the preceding member of the ring which is used to receive the token. Each chip transmits an arbitration out signal to the following member of the ring to send the token to the following member. In the preferred embodiment, the token appears as a 1 cycle active low pulse. Also coupled to each chip is a bidirectional signal representing an error signal. The error signal notifies all the bus participants that a ring error has been detected. Preferably, the number of cycles the error signal is held active, the more severe the error.

Finally, each chip on the bus also is coupled to a bidirectional request of bus (ROB) signal which notifies the chip holding the token that another bus member needs to use the bus. The ROB signal allows the current holder of the token to maintain control of the bus if it has further processing on the bus as long as no other bus member needs the bus. The chips may also include two timers. The first timer is called a Token Hold Timer which defines how long a processor can hold on to the token after receiving notification on the ROB line that another bus participant wants the bus. Only those bus participants with a high potential demand for the shared bus resources need a Token Hold Timer. The chips which require the bus for short periods of time such that they will not monopolize the bus do not need this timer. The second timer is called the Token Rotation Timer. Only one processor in the ring needs the Token Rotation Timer which defines the maximum time between the release of the token to return of the token by a given processor. It is used as a means to detect whether a lost token condition exists on the ring.

Typically, prior art token ring architecture is used to allocate time between stand alone processors on a complex bus such as a local area network which also passes the data between the processors. The token itself is also a complex entity including error recovery and timing data.

In the present invention, the token is a 1-bit signal on its own arbitration ring. The actual data is passed on a separate dedicated data bus.

BRIEF DESCRIPTION OF THE DRAWINGS

These and other objects, features and advantages of the invention will be more fully appreciated with reference to the accompanying figures.

FIG. 4 is a diagram of the external I/O pins to the micro channel interface chip in a preferred embodiment of the present invention.

FIG. 14 is a block diagram of the local data bus ring state machine.

FIG. 15A is a block diagram of the local data bus protocol boundary logic.

FIG. 23 depicts the fields within the micro channel interface chip command word.

FIGS. 24-27 depicts the fields within the micro channel interface chip control block.

FIG. 28 depicts the valid combination of micro channel interface chip control block flags in a preferred embodiment.

FIG. 29 depicts the fields of the micro channel interface chip status word.

FIG. 30 shows the fields of the micro channel interface chip post command.

FIG. 31 depicts the micro channel versus local data bus access memory map.

FIG. 34 shows the fields in a queue initialization register according to the present invention.

FIG. 36 shows a preferred layout of a queue pointer register.

FIG. 41 depicts the queue read control register.

FIG. 42 depicts the queue write control register.

FIG. 44 is a flow diagram of the micro channel queue write operation protocol flow.

DETAILED DESCRIPTION OF THE INVENTION

The following definitions will be helpful to the reader in understanding the following description.

| Term | Definition |
| --- | --- |
| Byte | A group of eight signal lines contained within a bus. |
| Bus Participants | Any device engaging in a data transfer or request of a bus. |
| Central Steering Logic | A group of system logic responsible for assisting devices in maintaining and controlling Micro Channel data bus width compatibility. |
| Device | A block of logic which drives or receives information onto or from a bus, interprets the information and/or performs a specified function. |
| I/O Slave | A slave device which is addressable within the I/O address space of the bus. |
| Master | A device which gains control of a bus with the intent of causing a data transfer to/from a slave. |
| Memory Slave | A slave device which contains memory within the bus addressable space. |
| Node | A device. |
| Queue | A sequence of stored data or Queue Entries awaiting processing. |
| Queue Entry | 4, 8, or 16 bytes of stored data which together define a task, control, or informational data to be processed at a later time. |
| Queue Read Pointer (QRP) | A pointer to the current sequential location of the next Queue Entry to be processed. |
| Queue Write Pointer (QWP) | A pointer to the current sequential location where a Queue Entry can be appended to a Queue. |
| Resource | A block of logic or device which makes itself accessible to a device for an information exchange. |
| Semaphore | A flag or indication of current status. |
| Slave | A device which provides or receives data during an operation under the control of a master. |
| Steering | Directing the bytes contained in a bus to another byte within the bus. |
| System Controller | A group of system logic responsible for Micro Channel arbitration, device selection, system memory refresh, unique functions, and interfacing with the system processor. |
| Transfer | An exchange of information between two devices. |
| Word | A group of 16 signals contained in a bus, two bytes. |

Figure 1:
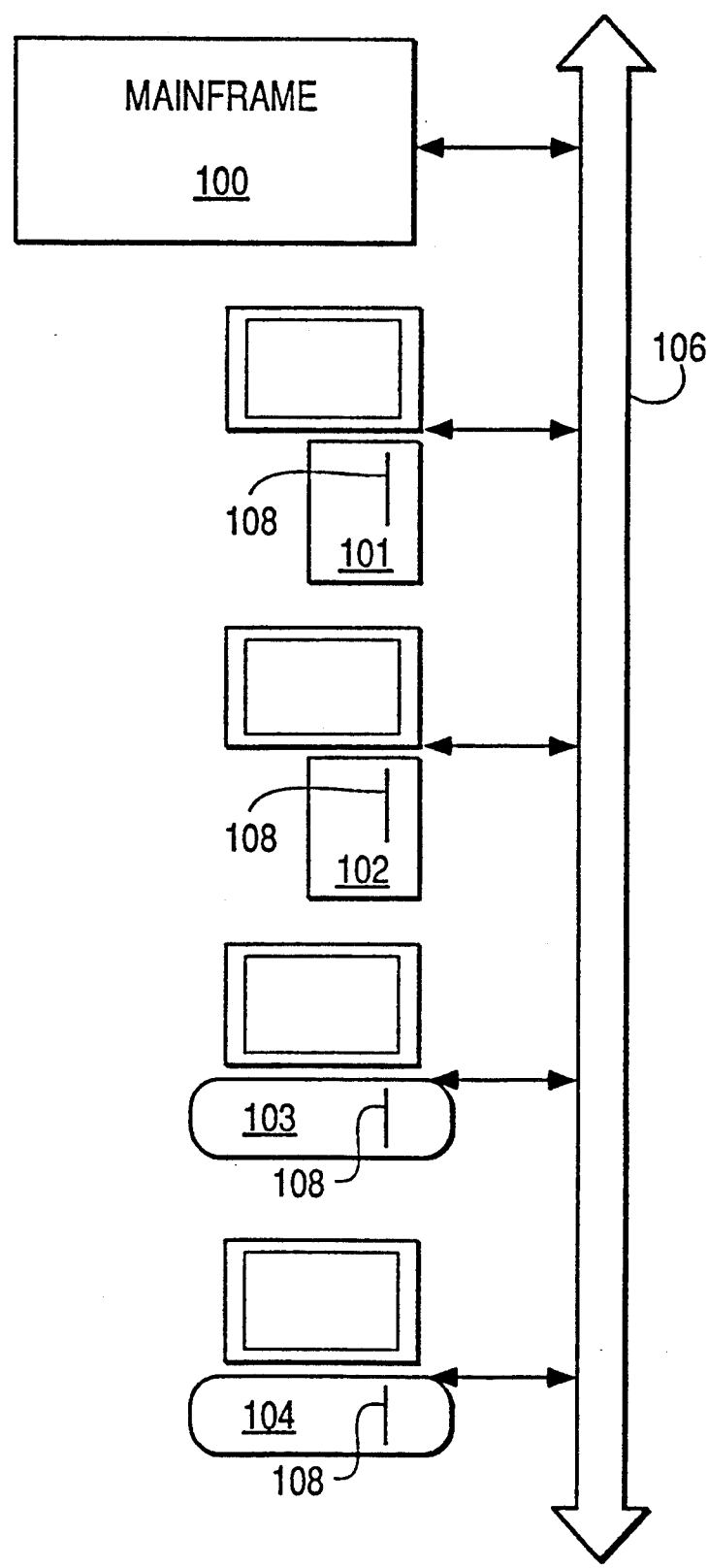
FIG. 1 is a representation of a local area network of personal computers, workstations and main frames.

FIG. 1 depicts a mainframe 100 such as an IBM mainframe following the 370 architecture connected to workstations 101 and 102 and personal computers 103 and 104 by means of a serial bus 106. In the preferred embodiment, the mainframe is an IBM mainframe following the 370 architecture such as the 3090, or ES/9000 (TM), the workstations 101 and 102 are IBM RISC System/6000's (TM) and the personal computers are in the IBM PS/2 (TM) family. The workstations 101, 102 and personal computers comprise well known components such as a system processor unit, ROM, RAM, one or more system busses, a keyboard, a mouse and a display. Further information can be found on the RISC System/6000 in IBM RISC System/6000 POWERstation and POWERserver Hardware Technical Reference—General Information Manual (SA23-2643), IBM RISC System/6000 POWERstation and POWERserver Hardware Technical Reference—Options and Devices (SA23-2646), IBM RISC System/6000 Hardware Technical Reference—7012 POWERstation and POWERserver (SA23-2660), IBM RISC System/6000 Hardware Technical Reference—7013 and 7016 POWERstation and POWERserver (SA23-2644) and IBM RISC System/6000 Hardware Technical Reference—7015 POWERserver (SA23-2645). Information on the PS/2 family can be found in Technical Reference Manual Personal System Model 50,60 Systems, Part No. 68X2224, Order No. S68X-2224 and Technical Reference Manual Personal Systems (Model 80), Part No. 68X2256, Order No. S68X-2256. A description of the serial bus architecture can be found in Serial I/O Architecture: PKD081102, Feb. 29, 1989. Both the RISC System/6000 and the PS/2 incorporate the Micro Channel Bus as their systems bus. The Micro Channel contains a 32-bit address bus, a 32-bit data bus, an arbitration bus and a variety of control signals. Further information can be found in the Micro Channel on Low-End Parallel Bus Architecture, Family 2: LEPB-ADS-0002-00-4-U7 and Personal System/2—Hardware Interface Technical Reference Architectures, Part No. 84F9808, Order No. X84F-9808-00. All the above references are available from the IBM Corporation.

Figure 2:
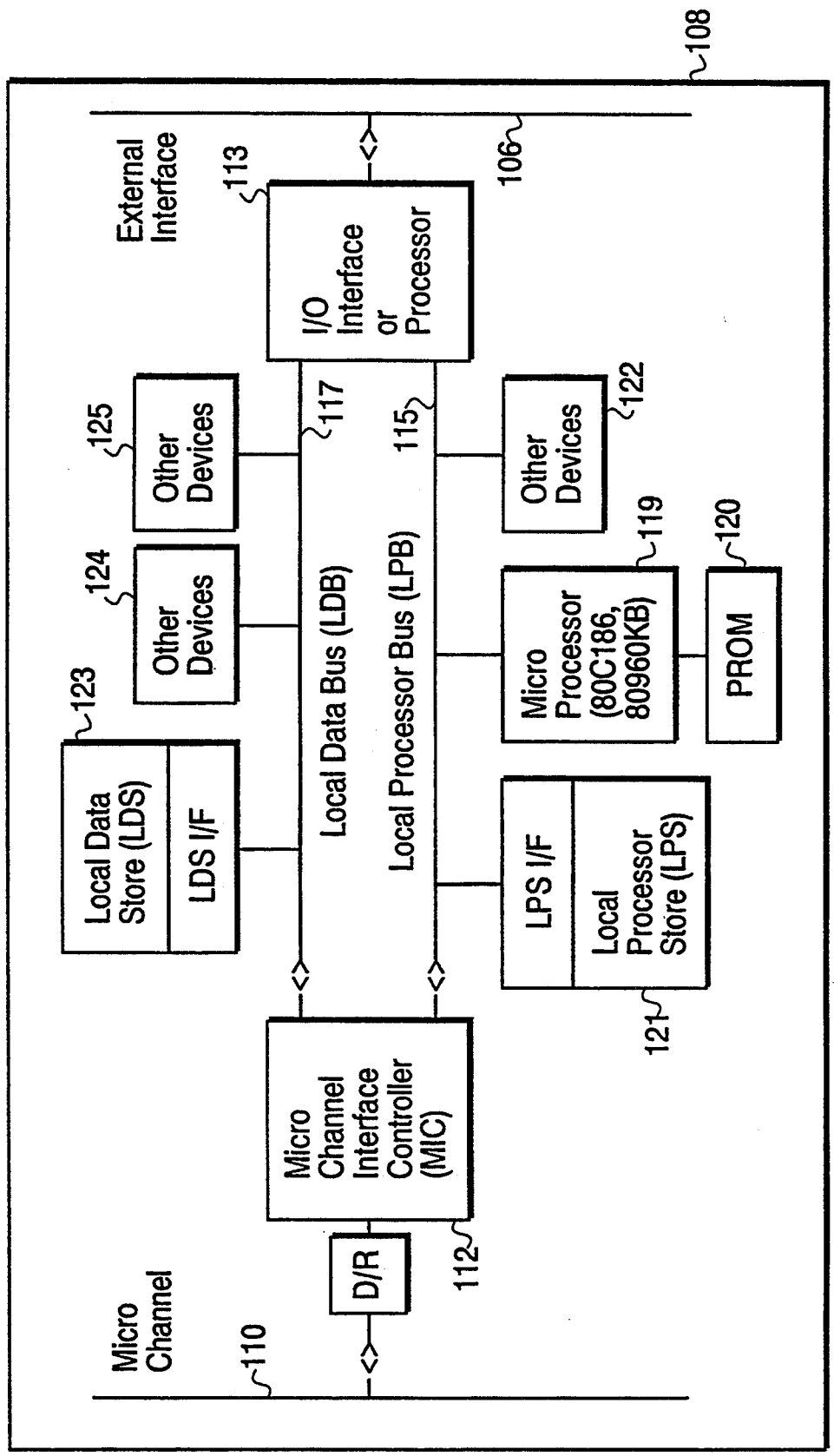
FIG. 2 is a block diagram of an interface according to the present invention which links a micro channel bus to an external fiber optic bus through a local data bus and a local processor bus.

All of the workstations and personal computers 101–104 interface with serial bus 106 by means of a Micro Channel to Serial Bus Adapter (MCSB) card 108. FIG. 2 shows a functional block diagram of the various components of the MCSB card 108. Serial bus 106 and Micro Channel Bus 110 are coupled to the serial interface 113 and the Micro Channel Interface controller (MIC) 112 respectively. The MIC chip 112 is a high performance interface between three busses: the Micro Channel, a general purpose microprocessor bus called the Local Processor Bus 115, and a dedicated data bus called the Local Data Bus 117. The purpose of the MIC 112 is to translate the protocol on these three busses and allow for quick and efficient data and control transfers between them. The MIC 112 is intended to be used on high speed I/O or processing adapters which require preprocessing, additional processing or data management functions before/after data can be moved to or sent by a device on the Micro Channel.

Serial interface 113 represents the serial input/output circuitry which includes optical digital signal conversion, clock recovery synchronization, serial to parallel conversion, optic decoding and coding and clock conversion. The MIC 112 and the serial interface 113 are joined by the Local Processor Bus 115 and local data bus 117. The Local Processor 119 is preferably an INTEL 80960 (TM) processor which provides the processing power for the Micro Channel to serial bus interface 108. The Local Processor 119 also includes programmable read only memory 120 (same or different chip). A Local Processor Store 121 is also coupled to the Local Processor Bus 115 and provides storage for the INTEL 80960 programs as well as storage for the MIC 112 logic. PROM 120 contains diagnostics and initialization code for the devices coupled the Local Processor Bus 115. Other devices 122 such as printers, modems or video monitors can be coupled to the Local Processor Bus 115. The local data bus 117 is used for the data as opposed to processing functions between the MIC chip 112 and serial interface 113. The MIC 112 and serial interface 113 share the local data store 123 which provides a buffer for data which initially comes from either the serial or Micro Channel Busses 106, 110. For example, some data might initially come in from the Micro Channel 110, the MIC 112 would initially store the data in local data storage 123. The MIC 112 would then notify the Local Processor 119 that data is present and the Local Processor 119 would start the serial interface 113 to move the Micro Channel data from the local data store 123 to the serial bus 106.

One preferred embodiment of the Micro Channel to Serial Adapter Card is described in commonly assigned copending application Ser. No. 07/693,834, and is entitled "Serial Channel Adapter" filed Apr. 30, 1991, which is hereby incorporated by reference. Other commonly assigned, copending applications related to the present invention include: "Micro Channel Interface Controller" by J. S. Fields, Jr., et al., filed Sep. 5, 1991, which describes the functions of the MIC 112, "Queue Pointer Manager", by G. L. Rouse, et al., filed Sep. 5, 1991, which describes the functions of the Queue Manager 143, and "Micro Channel Interface State Machine And Logic" by J. L. Swarts, filed Sep. 5, 1991.

Below is a summary of highlighted features/functions which the MIC 112 supports.

Micro Channel Interface Features
Master and Slave capability
10 MHz Streaming Data transfer rate
16/32/64-bit Streaming Data transfer widths
Bus Steering
Burst capability
Programmable Memory and I/O space utilization
Memory Address capability of 4G bytes
I/O Address capability of 64K bytes
Peer to peer capability
Fairness
Address and Data Parity
Up to 8 Interrupts
Access to Vital Product Data
Local Processor Bus Interface Features
Intel 80C186/80960KB compatible bus. Some external MSI logic may be required depending on the specific implementation to guarantee proper interfacing with the microprocessor.
Master and Slave capability
Hardware Queue Management capability
Memory Address capability of 1M bytes
Address and Data Parity
Local Data Bus Interface Features
100M bytes/sec burst transfer rate
Master capability
Address capability of 1M bytes
Programmable Read Wait States
Time shared bus arbitration
Address and Data Parity
Extensive error detection and logging
Self-Test capability
Internal Wrap capability 64 byte Data Buffering Micro Channel Interface Controller (MIC) Overview The MIC 112 allows data transfers to occur between the MC 110, LDB 117, and LPB 115. To accommodate the high speeds of the MC 110, the MIC 112 provides buffers 145 which improve overall throughput performance.

Figure 3:
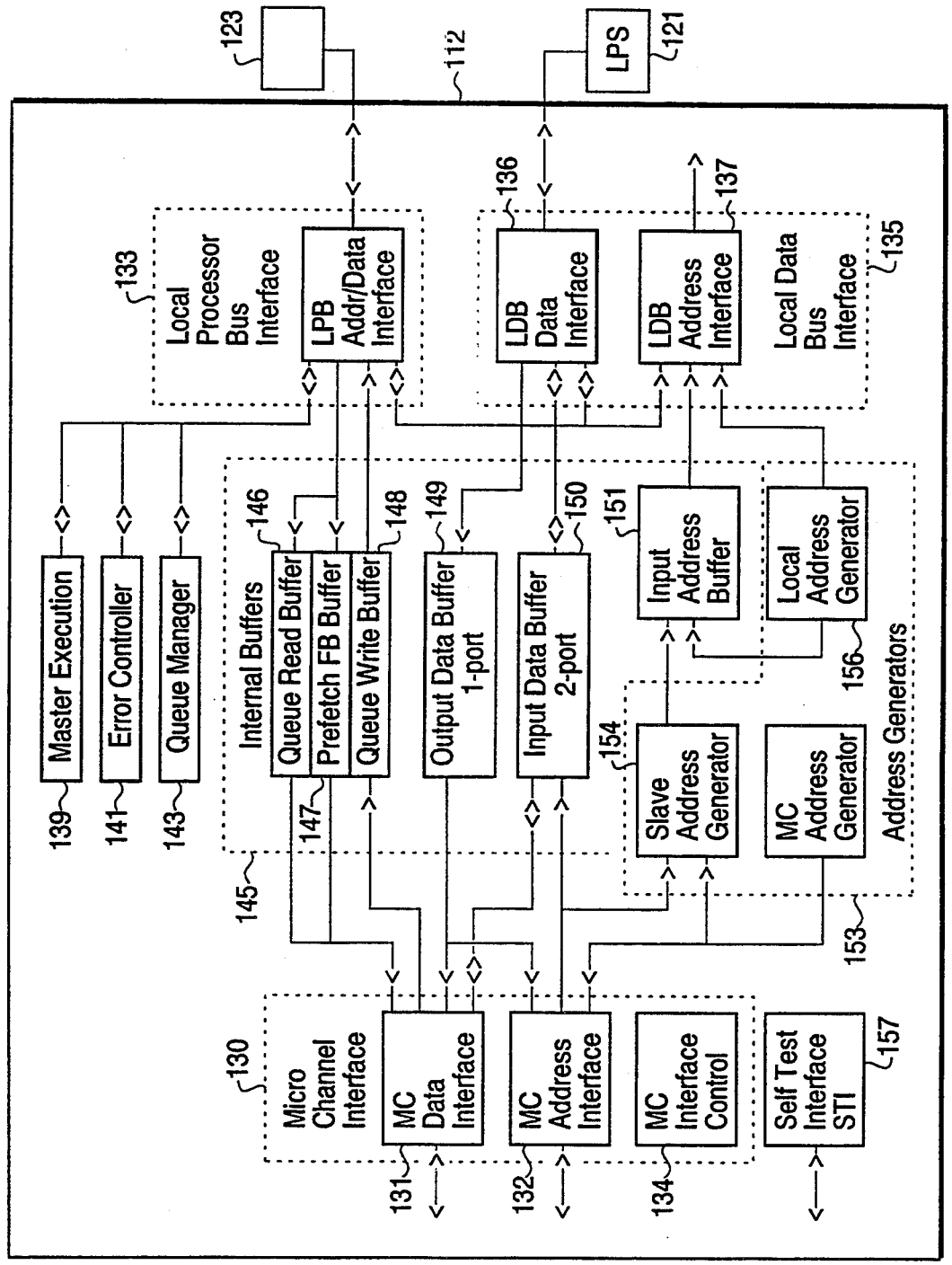
FIG. 3 is a block diagram of the micro channel interface chip.

In FIG. 3, the MIC 112 is partitioned into several functional units. Each of these functional units are dedicated to perform a special operation or task which will in some way interact with one or more of the other functional units. Each of the units contains a lower level of control and/or data logic specifically designed for performing its operation. Together, these units provide the MIC 112 with its interconnections between the MC 110, LDB 117, and LPB 115.

The MC Interface 130 is responsible for implementing the proper timing, control, and data interfacing required to connect the MIC 112 to the Micro Channel 110. The MC Interface 130 contains logic to synchronize, to interpret, and to control address, data, arbitration, parity, interrupt, and control handshaking signals with the other units within the MIC 112. The MC Interface 130 allows the operation of two MC modes, the Basic Transfer mode and the Stream Data Mode.

The Basic Transfer mode defines the default protocol of the MC 110. Most MC compatible devices have the ability to perform operations in this mode. While operating in this mode the MIC 112 can be defined by the following MC bus device types:

Intelligent Bus Controller
I/O Slave
Memory Slave
Setup Slave

When operating as an Intelligent Bus Controller the MIC 112 is considered to be a MC master. The MIC 112 only becomes a MC Master when a commanded transfer has been initiated. While operating as an I/O, Memory or Setup Slave the MIC 112 is considered to be a MC slave. The MIC 112 only becomes a MC slave when initiated by another device acting as a MC Master.

The Stream Data mode allows the MIC 112 to participate in high speed data transfers with other Stream Data mode MC devices. Stream Data mode provides significant performance enhancements for transfers of large blocks of data and automatic speed matching for clock synchronous data transfers. While in Stream Data mode the MIC 112 will operate as one of the following MC types:

Streaming Data Master
Streaming Data Slave

The MIC 112 operates as a Streaming Data Master only when initiated by a commanded transfer and operates as a Streaming Data Slave when initiated by another device acting as a Streaming Data Master. MC Data Interface 131 and MC Address Interface 132 are part of the MC interface and control the data and address information respectively. The Micro Channel Interface 130 also includes control code 134 which includes code used for capturing command and strobe signals of the Micro Channel, the synchronous state machine and data validation code.

The LPB Interface 133 is responsible for implementing the proper timing, control, and data interfacing required to connect the MIC 112 to the Local Processor Bus 115. The LPB Interface 133 contains logic to control the address, data, arbitration, interrupt, parity, error, and control handshaking signals. The MIC 112 can operate as a master or as a slave on the LPB 115. LPB Master operations can be initiated by tasks necessary to execute and complete a commanded transfer, a MC device, a reportable error, or maintenance of the Prefetch Free Block Buffer. Slave operations are controlled by devices on the LPB 115 requesting access to the LDB 117, the MIC's Queue Management function, or error and internal MIC 112 control and initialization registers.

The LDB Interface 135 is responsible for implementing the proper timing, control, and data interfacing required to connect the MIC 112 to the Local Data Bus 117. The LDB Interface 135 contains logic to control the address, data, arbitration, parity, error, and control signals. In the preferred embodiment, unlike the LPB 117 and MC 110, on the LDB 117, the MIC 112 only operates as a LDB Master. LDB Master operations are initiated by a commanded transfer, a MC device, or by a LPB device. However, when not a Master, the MIC 112 can monitor the LDB 117 and check for possible protocol or parity errors. The LDB Interface 135 can be divided in the LDB Data Interface 136 and LDB Address which can handle the data and address signals respectively.

The Master Execution Unit 139 is responsible for controlling and coordinating all commanded transfer activities between other units within the MIC 112. A list of detailed operations and tasks which the Master Execution Unit is capable of performing is shown below:

Monitors the Queue Manager 143 for pending commanded transfers.

Coordinates fetching of MIC Command Words (MCW) and MIC Control Blocks (MCB) with the LPB Interface 133.

Controls the initialization and loading of the Micro Channel Address Generator (MAG) 155, the Local Address Generator, and the Output Data Buffer (ODB) 149.

Controls when the MC Interface 130 fetches Free Blocks from other MC devices.

Coordinates the data transfer between the MC Interface 130 and LDB Interface 135.

Coordinates with the MC Interface 130 Queue Write operations for posting completion status to other MC devices.

Controls the posting of MIC Status Words (MSW), which indicate completion status of the commanded transfer and possible errors which may have occurred.

The Error Controller (EC) 141 monitors MIC internal activities for possible error situations or conditions. If an error occurs, the EC 141 is responsible for coordinating with the LPB Interface 133 posting of an Unsolicited Status Word (USW).

The Queue Manager 143 (QM) is responsible for controlling hardware pointers indicating the current locations of pending Command Words, Status Words, or Free Blocks and current locations where new Command Words, Status Words, or Free Blocks can be entered. In maintaining these pointers, queues of Command Words, Status Words, or Free Blocks can be stored in a FIFO like manner for later retrieval. The QM 143 is also responsible for indicating to either the MIC 112 or a LPB 119, 122 device whether a Queue contains pending data. The QM 143 has the ability to maintain pointers for 16 Queues located in the LPB Memory space 121 and controlling an assignable interrupt to each Queue. Also, the QM monitors pointer activity for possible errors and reports them to the LPB Interface 133 for later retrieval.

The MIC 112 contains a group of six internal buffers 145. These buffers are used to speed, match and coordinate data transfers between the MC, LPB, and LDB Interfaces 130, 133, 135.

The Output Data Buffer (ODB) 149 is a 16×36-bit, 1-port FIFO capable of holding 64 bytes of data and byte parity. The purpose of the ODB 149 is to buffer MC Master data from the MIC LDB Interface 137 to the MC Interface 133 or to the IDB for LDB wrap operations. The loading and unloading of the ODB 149 is controlled by the MIC LDB and MC Interface 135, 130 under the guidance of the Master Execution unit.

The Input Data Buffer (IDB) 150 is a 16×36-bit, 2-port FIFO, capable of holding 64 bytes of data and byte data parity. The purpose of the IDB 150 is to buffer data transfers during all MC Slave operations and MC Master read operations to and/or from the MIC LDB Interface 135 unit, as well as LDB wrap operations.

The Input Address Buffer (IAB) 151 is a 16×23-bit, 2-port FIFO. The purpose of the IAB 151 is to buffer addresses and control signals related to data stored in the IDB 150. Addresses buffered in the IAB 151 can be loaded from either the Slave Address Generator (SAG) 154 or the Local Address Generator (LAG) 156.

The Queue Read Buffer (QRB) 146 is a 8×18-bit, 2-port FIFO. The purpose of the QRB 146 is to buffer up to 16 bytes of Queue data and parity requested by a MC device. The LPB Interface 133 controls the writing of the QRB 146 under the management of the QM 143 when a request from the MC 110 is made. The QRB 146 can only be read when the MIC 112 is a MC Slave. Read access to the QRB 146 is controlled by the MIC MC Interface 130 using a semaphore and control register.

The Prefetched Free Block Buffer (FBB) 147 is a 8×18-bit, 2-port FIFO. The purpose of the FBB 147 is to maintain four 4 byte Free Block entries for quick access by a MC device. These Free Block entries contain the starting physical MC Memory address needed to access an available block of memory on the LDB 117. When a MC device has removed a Free Block entry from the FBB 147, the MIC 112 can fetch another FB entry from the MIC LPB Interface 133. In the preferred embodiment, the FBB 147 can only be read when the MIC 112 is a MC Slave.

The Queue Write Buffer (QWB) 148 is a 16×25-bit, 2-port FIFO. The purpose of the QWB 148 is to buffer data, parity, and control, which is designed for a Queue on the LPB 115 managed by the QM 143. Up to 32 bytes of Queue data can be buffered. In the preferred embodiment, the QWB 148 can only be written to when the MIC 112 is a MC Slave. Write access to the QWB 148 is controlled by the MC Interface 130 using a semaphore and control register. Read access to the QWB 148 is controlled by the MIC LPB Interface 133 and QM 143.

The MIC 112 contains three Address Generators 153 which provide most of the addressing requirements for data transfer between the MC and LDB Interfaces 130, 135.

The Slave Address Generator (SAG) 154 is used during MC Streaming Data Slave and LDB wrap operations. Its purpose is to provide addresses to the IAB 151 which correlate to the data being received by the MC Interface 130. These addresses are then used by the MIC LDB Interface 135. The SAG 154 can address up to 1M bytes of data.

The Micro Channel Address Generator (MAG) 155 is used during commanded transfer operations. The MAG 155 provides the MC Interface 130 with addresses needed for MC Master operations. While the MAG is capable of accessing 4G bytes of data, the MAG can only increment addresses within a 64K byte address range during a single commanded transfer. The MAG 155 also provides the SAG 154 with initial addresses during a LDB wrap operation.

The Local Address Generator (LAG) 156 is used during commanded transfers to address data destined to or sourced from the LDB Interface 135. While the LAG 156 can access 1M bytes of data, the LAG 156 can only increment addresses within a 64K byte address range during a single commanded transfer.

The Self Test Interface (STI) 157 provides a serial interface for diagnostic and debug operations. The STI 157 provides control and access to scan strings, registers, and clock controls within the MIC 112. The STI 157 can be accessed either directly via external I/O signals.

The definitions, protocols, electrical characteristics, and physical requirements of the external signal I/O, power, and ground pins are described in this section. Positive logic is used to describe the logic levels used in this document. All of the logic signal lines are TTL compatible. The functions of the external I/O pins of the MIC 112 are defined in this section. FIG. 4 illustrates a summary of the external signals which interface with the MIC 112.

MC Interface

This section defines the signal I/O used to interface the MIC 112 with the MC 110. All references to master and slave are for Micro Channel operations.

+A(0:31)i

+Address Bus Bits 0 through 31: These signal lines are used to address memory and I/O slaves attached to the MC 110 as well as select the MIC 112 for slave operations. The 32 address lines allow access of up to 4G bytes of memory. Only the lower 16 address bits are used for I/O operations and all 16 lines must be decoded by the I/O slave.

+APAR(0:3)i

+Address Parity Bits 0 through 3: These lines represent the odd byte parity of all address bits on the MC 110 during read and write operations. A master generates a parity bit for each address byte and the receiving slave performs the parity checking to ensure the integrity of the address. +APAR(0)i represents parity on +A (0:7)i, +APAR (1)i represents parity on +A(8:1-5)i, +APAR(2)i represents parity on +A(16:23)i, and +APAR(3)i represents parity on +A(24:31)i. These signals are also used during a 64-bit Streaming Data transfer and represent odd byte parity for data on the address bus.

−APAREN

−Address Parity Enable: This signal is generated by a master to indicate to a slave that the address parity signal lines are valid. This signal is driven active by a master when it places an address on the MC 110. During the 64-bit Streaming Data mode this signal is sourced by the device which is sourcing the data.

+D(0:31)i

+Data Bus Bits 0 through 31: These lines are used to transmit and receive data to and from a master and slave. During a Read cycle, data becomes valid on these lines after the leading edge of −CMD but before the trailing edge of −CMD and must remain valid until after the trailing edge of −CMD. However, during a Write cycle, data is valid before and throughout the period when the −CMD signal is active.

+DPAR (0:3)i

+Data Parity Bits 0 through 3: These signals represent odd byte parity on the Data Bus, +D (0:31)i. A parity bit is generated for each Data Bus byte. +DPAR(0)i represents parity on +D(0:7)i, +DPAR(-1)i represents parity on +D(8:15)i, +DPAR(2)i represents parity on +D(16:23)i, and +DPAR(3)i represents parity on +D(24:31)i.

−DPAREN

−Data Parity Enable: This signal is generated by the device sourcing the data to indicate that the data parity signal lines are valid.

−ADL

−Address Decode Latch: This signal is driven by the master as a convenient mechanism for a slave to latch valid address and status bits. Slaves can latch information with the trailing edge of −ADL.

−CD SFDBK

−Card Selected Feedback: This signal is driven by the MIC 112 as a positive acknowledgement of its selection by a master. This signal is not driven when the MIC 112 has been selected as a setup slave. This signal can be used to generate the −CD DS16 and −CD DS32 signal as well.

−SFDBKRTN

−Selected Feedback Return: This signal is driven by the system logic to return the positive acknowledgement from a slave to the master of its presence at the address specified by the master.

−DS 16 RTN

−Data Size 16 Return: This signal is driven by the system logic to indicate to a master the presence of a 16 bit data port at the location addressed.

−DS 32 RTN

−Data Size 32 Return: This signal is driven by the system logic to indicate to a master the presence of a 32 bit data port at the location addressed.

−BE(0:3)i

−Byte Enable Bits 0 through 3: These lines are used during data transfers to indicate which data bytes will be valid on the MC 110. −BE(0)i enables +D(0:7)i, −BE(1)i enables +D(8:15)i, −BE(2)i enables +D(16:23)i, and−BE(3)i enables +D(24:31)i. These signals are not valid for 8-bit or 16-bit Micro Channel Basic Transfer operations.

+MADE 24

+Memory Address Decode Enable 24: This signal provides an indication of usage of an unextended (24 bit) address on the MC 110. When active (high), in combination with an address, indicates that an unextended address space less than or equal to 16 MB is on the MC 110. When inactive (low), in combination with an address, indicates that an extended address space greater than 16 MB is on the MC 110. This signal is driven by all masters and decoded by all memory slaves, regardless of their address space size.

When the MIC 112 is a MC Master this signal is determined by the upper byte of the MAG 155. If the upper byte is equal to '00000000' then +MADE24 is active high.

−SBHE

−System Byte High Enable: This signal indicates whether the high byte of data is enabled when communicating with a 16-bit MC Slave.

+M/−IO

+Memory/−I/O Cycle: This signal distinguishes a MC Memory cycle from a MC I/O cycle.

−S0,−S1

−Status Bits 0 and 1: These signals provide the indication of the start and define the type of MC cycle.

−CMD

−Command: This signal is used to define when data is valid on the MC 110. The trailing edge of this signal indicates the end of a MC cycle.

+CD CHRDY

+Card Channel Ready: This signal allows a slave additional time to complete a bus operations. When activating this signal during a read operation, a slave promises that data will be valid on the bus within a time specified. A slave may also use this signal during a write operation if more time is needed to store the data from the bus.

+CHRDYRTN

Channel Ready Return: This signal is driven by the system logic to return the +CD CHRDY signal received from the slave to the master.

−SDEN

−Streaming Data Enable: This signal is used to enable the external MSI drivers when the MIC 112 has been selected as a MC Slave with Streaming Data capability.

−MSDR

−Multiplexed Streaming Data Request: This signal indicates whether a MC Slave, or the MIC 112 when selected as a MC Slave, has the capability to perform an 8-byte Streaming Data transfer.

−SDR(0:1)

−Streaming Data Request Bits 0 through 1: These signals provide information about the performance characteristics during Streaming Data mode. This information is used by the MIC 112 as a master to determine the maximum clocking rate of the slave device during a Streaming Data transfer.

−SD STB

−Streaming Data Strobe: This signal determines when data is valid during a Streaming Data transfer. The maximum clock rate of this signal is determined by the −SDR(0:1) lines and the Streaming Data Clock input signals.

+ARBI(0:3)i

+Arbitration Input bits 0 through 3: These signal lines are used to receive the arbitration level presented on the MC Arbitration Bus. The lowest priority ARB bus level has a hexadecimal value of 'F' and the highest priority ARB bus level has a hexadecimal value of '0'. ARB level of 'F' should be used for the default MC Master.

+ARBO (0:3)i

+Arbitration Output bits 0 through 3: These signal lines are used when the MIC 112 arbitrates for use of the MC 110.

+ARB /−GNT

+Arbitration/−Grant: This signal defines when an arbitration cycle begins and ends on the MC 110.

−BURST

−Burst: This signal is driven by an arbitrating Bus Participant to indicate to the System Controller the extended use of the MC 110 when transferring a block of data. This type of data transfer is referred to as a burst cycle. The signal is shared by all Bus Participants and can only be activated by the participant granted the MC 110.

−PREEMPT

—Preempt: This signal is driven by arbitrating Bus Participants to request usage of the MC 110 via arbitration. Any Bus Participant with a bus request will activate −PREEMPT and cause an arbitration cycle to occur. A requesting Bus Participant will remove its preempt upon being granted the MC 110.

−IRQ(0:3)

—Interrupt Request bits 0 through 3: These signals are used to indicate to the System Processor that an I/O Slave requires attention.

+IRQ_SEL/SS1_OUT

+Interrupt Request Select/Scan String 1 Output: This signal can be used by external logic to control which set of four MC Interrupt Request signals can be active. This signal can then effectively give the MIC 112 access to eight MC Interrupt Requests. This signal is set in a POS Register field. In addition, this signal is defined as the output of scan string 1 during LSSD test mode.

−CD SETUP

—Card Setup: This signal is used to individually select devices during a system configuration. When this signal is active, configuration data and the Device ID may be accessed.

−CHCK

—Channel Check: This signal is used to indicate a high priority interrupt to the System Controller that an exception condition, i.e. parity error, etc., has occurred on the MC 110. A field in a POS register defines whether this signal is synchronous or asynchronous.

+M/−S

+Master operation/−Slave operation: This signal gives an indication of the current Micro Channel operation that the MIC 112 is participating in. This signal can be used to control the direction and enabling of external Micro channel drivers and receivers.

+DO/−I

+Data Output Operation/−Input operation: This signal is used to indicate the direction of +D(0:31)i and +DPAR(0:3)i.

+AO/−I

+Address Output Operation/−Input operation: This signal is used to indicate the direction of +A(0:31)i and +APAR(0:3)i.

−DLOE

—Data Low Output Enable: This signal is used to indicate whether the lower two bytes of the MC data bus are active.

Local Processor Bus Interface

This section defines the signal I/O used to interface the MIC 112 with the LPB 115. All references to master and slave are for Local Processor Bus operations.

+ADDR/DATA (0:19)i

+Address/Data bus bits 0 through 19: This bus is used to address, read from, and write to Local Processor Store 121. This bus provides for addressing of up to 1M bytes.

+A/D PAR(0:2)i

+Address/Data Parity bits 0 through 2: These lines provide odd parity for +ADDR/DATA(0:19)i. +A/D PAR(0)i provide odd parity for the most significant 4-bits when address is present. +A/D PAR(1)i provide odd parity for +ADDR/DATA(4:11)i. +A/D PAR(2)i provide odd parity for ADDR/DATA(12:19)i.

−ALE

—Address Latch Enable: This signal is be used to externally latch the address on the +ADDR/DATA(0:19).

+R/W

+Read/Write: This signal is used to indicate the operation and direction of data on the LPB 115.

−DAV & +RDY

—Data Valid and +Ready: These two signals supply the MIC 112 with the necessary handshaking to determine whether data on the +ADDR/DATA(0:19)i bus is valid and/or has been accepted.

+M/−IO

+Memory/−Input/Output: This signal is used to determine access to Memory or I/O space on the LPB 115.

−BHE

—Byte High Enable: This signal determines when the high byte of a two byte word is active.

−LPB ERR

—Local Processor Bus Error: This signal indicates to the MIC 112 that an error condition has occurred on the Local Processor Bus 115. This signal is a receive only signal and its purpose is to end a MIC LPB Master access, which may be in a dead-lock state, i.e., a not ready condition.

−LPM/SS4_IN

Local Processor Master/Scan String 4 Input: This signal indicates whether the current user is a microprocessor or another LPB device 122. The purpose of this signal is to assist the MIC 112 in determining the correct timing and handshaking required during LPB slave operations. In addition this signal is defined as the input for scan string 4 during LSSD test mode.

−BUS REQ/SS3_OUT

—Bus Request/Scan String 3 Output: This signal indicates when the MIC 112 needs to use the LPB 115 for a LPB Master operation. In addition this signal is defined as the output for scan string 3 during LSSD test mode.

−BUS GNT/SS3_IN

—Bus Grant/Scan String 3 Input: This signal indicates when the MIC 112 has acquired ownership of the LPB 115 and can perform LPB Master operations. In addition this signal is defined as the input for scan string 3 during LSSD test mode.

−CSEL

—Chip Select: This signal is used to enable the MIC 112 for controlled LPB memory slave operations involving initialization register and accesses to LDB 117.

−INT(0:3)

—Interrupt Bits 0 through 3: These signals are used by the EC 141 and/or QM 143 to request service or attention by a LPB device.

Local Data Bus Interface

This section defines the signal I/O used to interface the MIC 112 with the LDB 117. As mentioned previously, in the preferred embodiment, the MIC 112 conducts only master operations on the LDB 117.

+ADDR(0:9)i

+Address bits 0 through 9: This bus is used to address LDB and is capable of accessing 1M bytes of data. This bus is a multiplexed address bus providing the ability to present an 8-bit high address and a 10-bit low address. Together the high and low address create a 256 4K byte paging address scheme. The −HALE signal is used to indicate when address is defined as the high address.

+APAR (0:1)i

+Address Parity bits 0 through 1: These signals indicate odd parity on +ADDR (0:9)i. +APAR (0)i indicates odd parity on −ADDR(0:1)i, and +APAR(1)i indicates odd parity on +ADDR(2:9)i.

+DATA (0:31)i

+Data bits 0 through 31: This bus is used to read from or write to data on the LDB 117.

+DPAR (0:3)i

+Data Parity bits 0 through 3: These signals indicate odd parity on each byte of the +DATA(0:31)i bus.

+R/−W

+Read/−Write: This signal indicates whether data is written to or read from the LDB 117. This signal is valid when either the high or the low address are valid.

−BE(0:3)i

−Byte Enable Bits 0 through 3: These signals indicate which bytes of the +DATA(0:31)i contain valid data. −BE(0)i enables +D(0:7)i, −BE(1)i enables +D(8:15)i, −BE(2)i enables +D(16:23)i, and −BE(3)i enables +D(24:31)i. These signals also indicate that +ADDR(0:9)i contain the least significant 10-bits of the LDB address.

−RARBO/SS2_OUT

−Ring Arbitration Out/Scan String 2 Output: This signal is used to pass the LDB arbitration token to the next device on the LDB 117. In addition, this signal is defined as the output for scan string 2 during LSSD test mode.

−RARBI/SS2$_{13}$ IN

Ring Arbitration In/Scan String 2 Input: This signal is used to receive the LDB arbitration token. In addition, this signal is defined as the input for scan string 2 during LSSD test mode.

−LDB ERR

−Local Data Bus Error: This signal indicates whether an error has occurred on the LDB 117. The current owner of the Ring Arbitration Token must terminate any transfer on the LDB 117 and cancel the Token when −LPB Error is active for more than 1 cycle. When this signal is active for only 1 cycle, a parity error has been detected and the ring remains operational.

−HALE

−High Address Latch Enable: This signal is used to validate +ADDR(2:9)i as the most significant 8-bits of a 1M byte LDB access.

−ROB

Request On−Bus: This signal is used to inform the owner of the LDB token that another LDB device 122 wishes to use the bus 117. This signal enables the THT and TRT timers described below.

Self Test Interface

The STI 157 provides access to the MIC's self test capabilities controlled by an external diagnostic device.

+A/B CLK

+A and B Clocks: These two clocks shall be used by the MIC's STI 157. The operating frequency of these two clocks will be a maximum of 6.25 MHz. These signals also define the Scan A and System B clocks for LSSD test mode.

+DIN/SS1_IN

+Data In/Scan String 1 Input: This signal provides the MIC STI with serial input information. In addition, this signal defines the input for scan string 1 during LSSD test mode.

+MODE

+Mode: This signal determines whether the STI is operating in an Instruction/Status mode or Scan mode.

−SEL

−Select: This signal is used to enable STI operations.

+DOUT/SS4_OUT

+Data Out/Scan String 4 Output: The signal provides serial output information from the STI. In addition, this signal defines the output for scan string 4 during LSSD test mode.

Miscellaneous

+SYS CLK

+System Clocks: These two lines provide the system clocks needed for the MIC 112. The operating frequency of these clocks is 25 MHz. Both signals receive equivalent clocks. These signals also define the LSSD B and C clocks during LSSD test mode.

SD CLK

+Streaming Data Clocks: These two lines provide the clocks needed for MIC Streaming Data Master transfers. Both signals receive equivalent clocks. These signals also define the LSSD B and C clocks during LSSD test mode.

−DI

−Drive Inhibit: This signals forces all MIC signal drivers to a tristated condition. This signal should only be used for LSSD test mode. During operational mode this signal should be pulled up to a '1' level.

+TI

+Test Inhibit: This signal sets the MIC 112 into LSSD test mode. All internal MIC registers receive system clocks during LSSD test mode. During operational mode this signal should be a '0' level.

+CI

+Clock Isolate: This signal defines whether the STI A Clock signal is to be used as a scan clock or operational clock. During operational mode this signal should be a '0' level.

+SG

+Scan Gate: This signal defines the component state, either shift or component, during LSSD test mode. During operational mode this signal should be a '0' level.

+SYS RESET

+System Reset: This signal can be driven by the System Controller to reset or initialize MC devices, also referred to as the MC +CHRESET. During a power-up sequence, this signal must be active for a specified minimum time of 1 usec. This signal may be logically OR with an adapter level reset.

Micro Channel Interface

The protocol for Arbitration, Basic Transfer, Streaming Data, System Configuration and Steering for the MC are described below.

Arbitration

Arbitration is the resolution of multiple bus requests, awarding use of the bus to the highest priority requestor. The Micro Channel arbitration scheme operates as a multi-drop (dot-OR) mechanism. This type of arbitration scheme allows for up to 16 participants, in an arbitration cycle, while only using four signal lines. +ARBI(0:3)i and +ARBO(0:3)i with assistance from some external drivers comprise the four signals needed for arbitration on the MC 110.

The MIC 112 requests service by activating the −PREEMPT signal. The system responds by raising the +ARB/GNT when the current bus owner completes its bus activity. The current bus owner must release control of the MC 110 no more than 7.5 usec after activation of the −PREEMPT signal. When the system activates +ARB/GNT the device with the highest priority gains control of the MC 110. A bus owner may use the −BURST signal to maintain control of the MC 110 for extended periods of time. If Fairness is enabled, the MIC 112 can re-request the MC 110 only when all other MC devices have had their first requests serviced.

Basic Transfers

Basic Transfer mode is the default mode for exchange of information between MC devices. A Basic Transfer begins when a MC master, usually the bus owner, asserts the status lines (−S0 and −S1) and +M/IO signals, indicating the type of operation to be performed on the MC. The MC master also asserts +A(0:31)i, −APAR(0:3)i, APAREN, MADE24, TR32, SBHE, and −BE(0:3)i if required for the type of transfer. Once the address bus is stable, the −ADL is asserted.

All devices on the MC monitor the signals which have been asserted by the MC master. When a device detects addresses within a predefined range, the device becomes the MC slave. The MC slave then asserts the −DS16, DS32, and −CD SFDBK signals as positive acknowledgement of its selection. These acknowledgement signals are received by the MC master as −DS16 RTN, DS32 RTN, and −SFDBKRTN and signify the type of MC slave and the readiness of the MC slave for the transfer.

During a write operation, the +D(0:31)i and +DPAR(0:3)i are asserted with the −CMD signal. During a read operation, data on the +D(0:31)i does not become valid until the MC slave is ready, +CHRDY active, to send the data to the MC master.

A MC Slave can extend a Basic Transfer cycle beyond 200 ns by asserting the +CD CHRDY signal. A MC master can also maintain ownership of the MC by asserting the −BURST signal. Termination of the Basic Transfer mode and ownership of the MC 110 by the MC master occurs when the −BURST and −CMD are inactive.

Streaming Data

Streaming Data mode begins as Basic Transfer mode does. The MC master supplies a single address, usually the starting address, in a range for which a MC slave will respond to. Addresses for 16, or 32-bit are aligned on four byte address boundaries. Addresses for 64-bit transfer are aligned on eight byte address boundaries.

When the selected MC slave sends its positive acknowledgement to the MC master, three additional signals are sent to the MC master to indicate the MC slaves ability of Streaming Data mode. Two of these signals, −SDR(0:1), determine the maximum rate at which the MC slave can operate in Streaming Data mode. The third signal, −MSDR, indicates the MC slaves ability to transfer data in the 64-bit Streaming Data mode. The −CMD signal is then asserted and held active until termination of the Streaming Data mode. The −SD STB and +CD CHRDY are used to indicate when data is valid during the Streaming Data transfer.

The Streaming Data mode transfer can be terminated by either the Streaming Data master or Streaming Data slave. A Streaming Data master can begin termination of the transfer by deactivating the −S0,−S1 signals, the Streaming Data slave responds with deactivating the −SDR(0:1)/−MSDR signals. The termination will be complete when the Streaming Data master deactivates −CMD. A Streaming Data slave can begin termination of the transfer by deactivating the −SDR(0:1)/−MSDR signals. The termination will be complete when the Streaming Data master deactivates −S0,−S1, and −CMD. −SDR(0:1) will become tristated after −CMD deactivates.

System Configuration

A System Configuration protocol is used to initialize and read the POS registers with the MIC 112 or any other MC device. During a System Configuration, the selected MC device becomes a Setup slave. The System Configuration protocol is similar to the Basic Transfer mode except for the following modifications:

- The MC device is selected using the −CD SETUP signal not by decoding of the address bus or arbitration.
- Only the three least significant address bits are used or decoded.
- Only I/O Read/Write operations are performed.
- The selected device does not assert the −CD SFDBK as positive acknowledgement.
- All transfers are single byte (8-bit) transfers, which occur only on the least significant byte of the data bus.
- A single configuration cycle is 300 ns.
- Parity is not supported.

MC Steering

To maintain bus width compatibility and flexibility the MIC 112 is able to operate in several bus width configurations. Transfers which involve moving data between the LDB 117 and the MC 110 have the capability of 64, 32, 16, and/or 8-bits depending on the other MC device involved in the transfer. Transfers which involve writing to or reading from Queues located in Local Processor Store 121 have the capability of 32, 16, and/or 8-bits. POS register transfers are on byte boundaries only. Transfers between MC devices utilize their maximum bus width capability whenever possible. The MIC 112 controls steering when operating as a master. The MIC 112 controls steering when operating as a Streaming Data slave with a Streaming Data master of lesser width. Once a Streaming Data transfer has begun, a new steering configuration is not possible until termination of the current Streaming Data transfer. Table 1 illustrates the MIC's steering responsibilities during valid MC Master transfers.

TABLE 1

| MIC Master Signals | | | Slave Signals | | | |
| --- | --- | --- | --- | --- | --- | --- |
| SBHE | +A 29:31)i | −BE (0:3)i | DS16 RTN | DS32 RTN | MSDR | Transfer Type/Description |
| 0 | 000 | 1111 | 0 | 0 | 0 | 8 byte transfer to 64 bit slave# |
| 0 | X00 | 1110 | X | X | X | 1 byte transfer to all slaves |
| 0 | X00 | 0000 | 1 | 1 | 1 | 1 byte transfer to 8 bit slave |
| 0 | X00 | 0000 | 0 | 1 | 1 | 2 byte transfer to 16 bit slave* |
| 0 | X00 | 0000 | 0 | 0 | X | 4 byte transfer to 32/64 bit slave* |
| 0 | X01 | 1101 | X | X | X | 1 byte transfer to all slaves |
| 1 | X10 | 1011 | X | X | X | 1 byte transfer to all slaves |

TABLE 1-continued

| | MIC Master Signals | | Slave Signals | | | |
|---|---|---|---|---|---|---|
| SBHE | +A 29:31)i | −BE (0:3)i | DS16 RTN | DS32 RTN | MSDR | Transfer Type/Description |
| 0 | X10 | 0011 | 0 | X | X | 2 byte transfer to 16/32/64 slave |
| 0 | X11 | 0111 | X | X | X | 1 byte transfer to all slaves |

Note:
All above transfers are executed in the Basic Transfer mode, except noted.
Capable of Streaming Data Operations only.
*Capable of both Basic Transfer and Streaming Data operations Interrupts The MIC 112 has the ability to source four programmable MC interrupts, with expansion capabilities of up to eight. These interrupts are used to inform the System Processor that a Queue contains job(s) or command/-status words for a device on the MC 110 or for use by the System Processor or an error has occurred. Each Interrupt may be shared by up to four Queues. When Queues share an Interrupt a readable register is available to assist other MC devices and/or the System Processor in determining the Queue which caused the Interrupt. An Interrupt may also be assigned to only one Queue.

Errors

The MIC 112 provides a Micro Channel Check capability. A Channel Check becomes active when the MIC 112 detects a parity error on MC Slave writes. The Channel Check can either be synchronous or asynchronous to the detection of the error. The MIC default is synchronous.

The synchronous Channel Check allows the current MC Master to receive immediate notice of a parity error detected by the MIC 112. Once the MC Master completes the transfer in progress the Channel Check signal becomes inactive.

The asynchronous Channel Check is similar to a synchronous Channel Check except that once the MC Master has completed the current cycle the Channel Check signal remains active.

In either case, the Channel Check bit within POS register remains active until the system has reset it. Resetting of a Channel Check condition is performed using the system configuration protocol.

Micro Channel Interface State Machine

To simplify chip designs, a synchronous method of capturing and validating data on the MC 110 can be used with minimal asynchronous clocking. By minimizing the use of asynchronous logic, the risks involved in an asynchronous design are reduced. Once the MC control signals and busses are synchronized, a state machine interface can determine the state of data and when data is valid on the MC 110. This task can be accomplished using three areas of logic design described in the following sections: Control and Data Signal Capturing and Synchronization, Interface State Machine, and Data Validation Decode logic.

Figure 5:
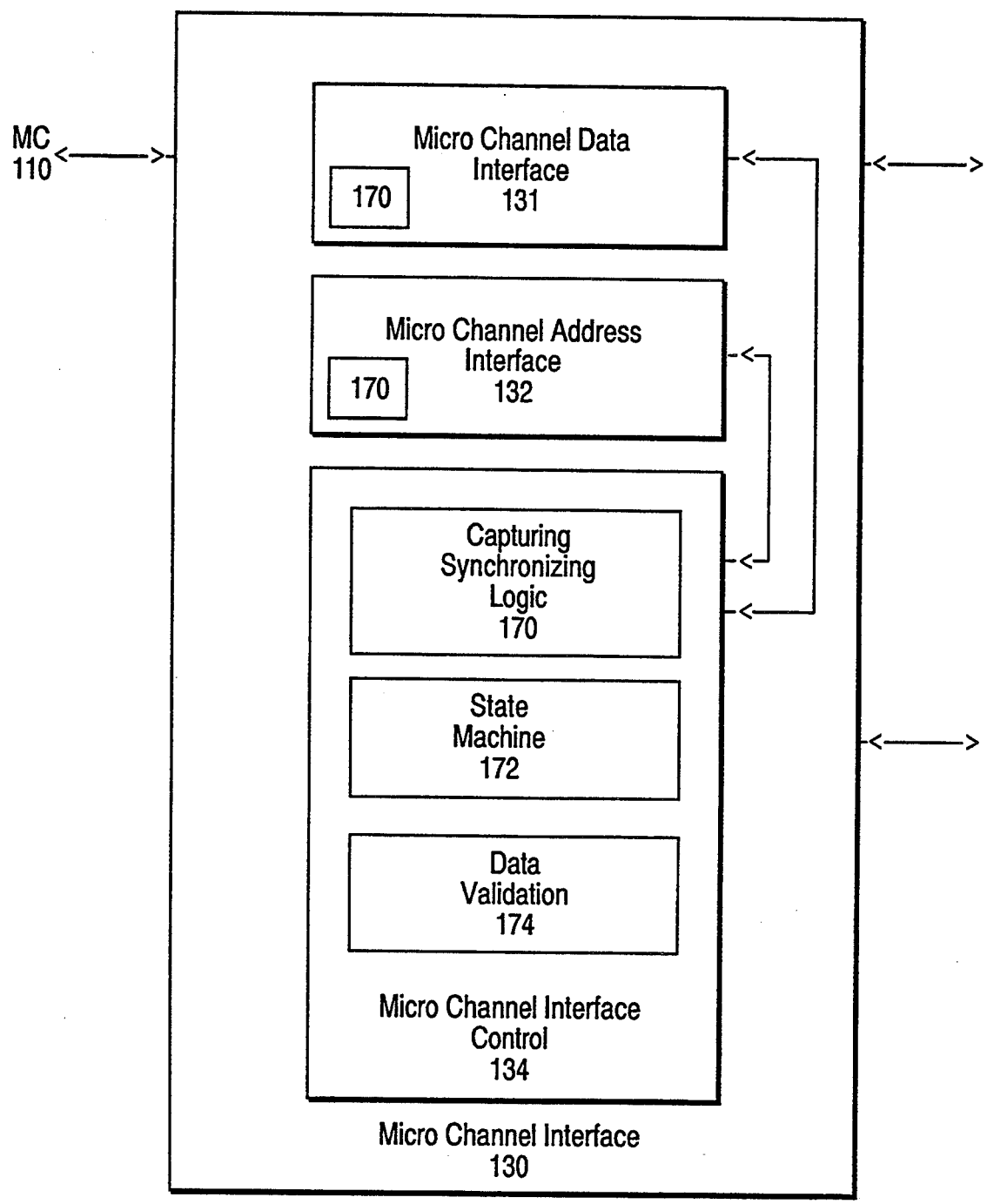
FIG. 5 is a block diagram of the micro channel interface according to the present invention.

In FIG. 5, a somewhat more detailed block diagram of the Micro Channel Interface 130 is depicted. As mentioned previously, the interface 130 includes the Micro Channel Data Interface 131, the Micro Channel Address Interface 132, and the Micro Channel Interface Control Logic 134. The Control and Data Signal Capturing and Synchronizing Logic 170 is largely located in the control section 134, but the logic devoted to capturing the data and address signals from the Micro Channel 110 are located in the data interface 131 and address interface 132 respectively. The Interface State Machine 172 is also part of the interface control section 134 and uses the synchronized signals from the capture logic 170 to derive a synchronous means of evaluating the state of the Micro Channel 110. Finally, the Data Validation Decode Logic 174 takes signals from the capture logic 170 and the state machine 172 to determine whether the asynchronously latched data and address signals captured from the Micro Channel 110 represent valid data in a synchronous manner.

To capture the asynchronous MC data and control, techniques consistent with the LSSD guidelines are employed. These techniques include the capturing of narrow bus strobes, sampling, and synchronizing. LSSD circuits follow the rules generally described in U.S. Pat. Nos. 3,761,695, 3,783,254 and 4,580,137. In addition, U.S. Pat. No. 4,580,137 which claims a latch circuit for synchronous and asynchronous clocking also contains an exceptionally complete review of the various aspects of LSSD latch design. While other LSSD compatible circuits may be employed to capture the MC control and data signals, the figures on the following pages illustrate the best logic known to the inventor for capturing the MC control and data signals.

For quick reference to FIGS. 6A through 6E, Table 2 contains the definitions of the signals portrayed in these figures.

Figure 6A:
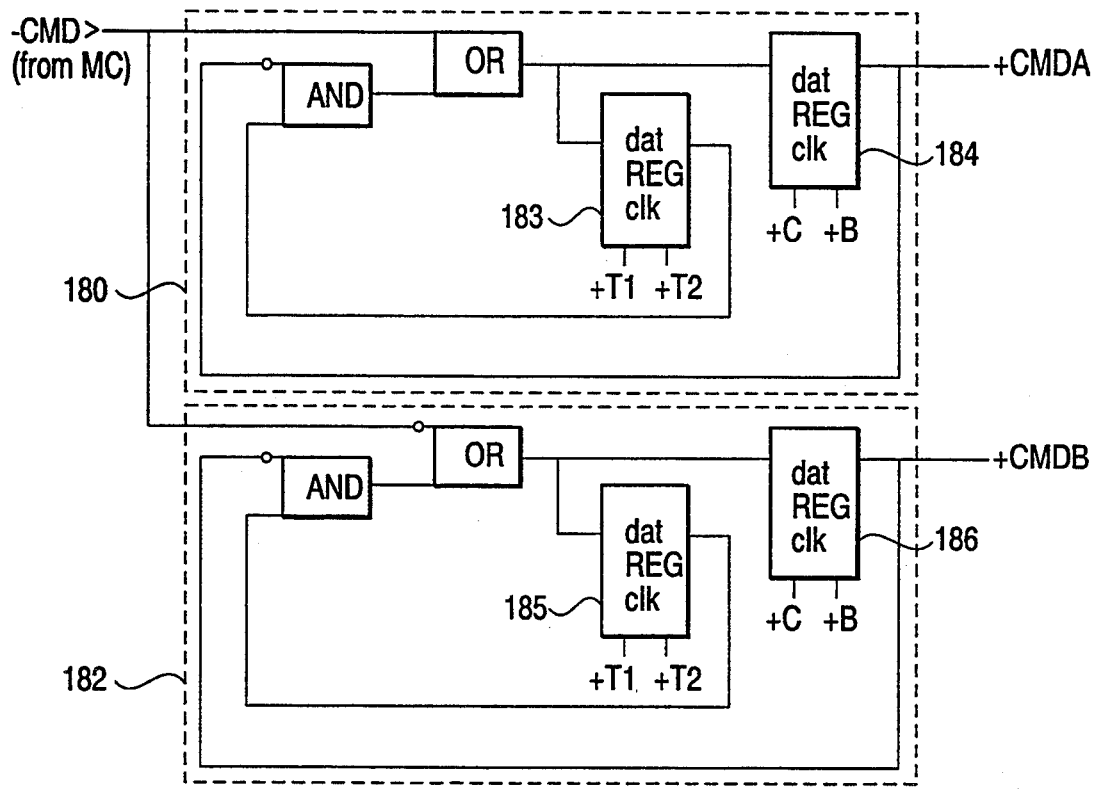
FIGS. 6A-6E depict the logic in the control and data signal capturing and synchronizing block in the micro channel interface of the present invention.

Referring to FIG. 6A, the logic for capturing the asynchronous data valid signal, −CMD, which is the Micro Channel signal which indicates when data is valid on the Micro Channel is shown. Two synchronous internal signals are generated by this logic: +CMDA, which indicates when an active high level signal was present on the −CMD signal, and +CMDB, which indicates when an active low level signal was present on the −CMD signal. Both the +CMDA and +CMDB signals are used in the state machine signals from the Micro Channel 110.

The circuit elements in the upper half of the diagram 180 which produce the +CMDA signal are essentially equivalent to those in the lower half 182 which produce the +CMDB signal with the exception that the −CMD signal from the Micro Channel 110 is inverted before being received by block 182. The circuit shown is useful for capturing a signal which is narrower than one system clock cycle of the internal clocks of the MIC 112.

In FIG. 6A, the registers 183, 184, 185, 186 are two latches in series, the first latch receiving the asynchronous signal and the first clock signal and the second latch receiving the output of the first latch and the second clock signal. In this way, the asynchronous signal is sampled in the first latch, waiting for any metastability to settle out, and then setting the value from the first latch into the second latch. The second latch contains the synchronized signal which can be used in the LSSD chip. If the −CMD signal were wider than the internal clock signals +C, +B of the MIC 112, only registers 184 and 186 would be necessary to provide synchronized signals +CMDA, +CMDB. However, it is more likely that the −CMD signal will be narrower, so registers 183 and 185 which are clocked by internal test clocks +T1, +T2 and their attendant AND, OR and feedback loops are necessary to capture the −CMD signal and its inverted signal and hold them until they can be synchronized by registers 184 and 186.

Figure 6B:
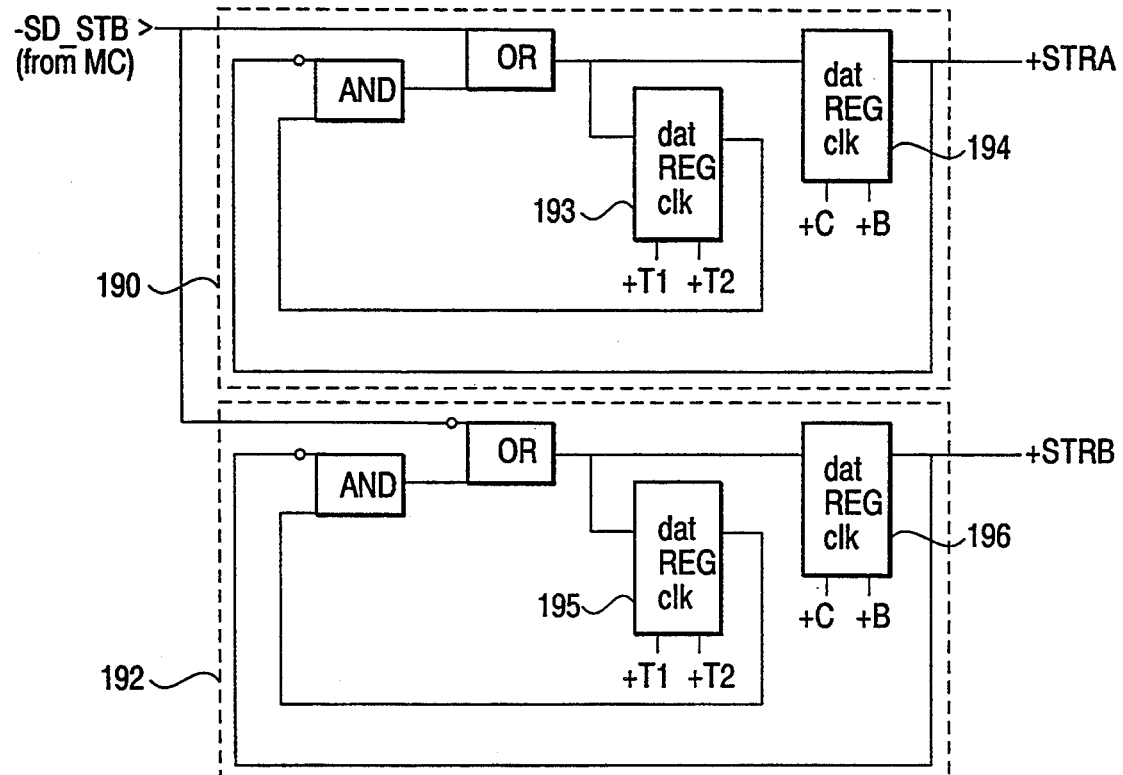

Referring to FIG. 6B, the logic for capturing the asynchronous streaming data signal, −SD_STB, from the Micro Channel 110 which is used to clock data during a streaming data transfer to the MIC 112. Two synchronous signals are produced: STRA, the internal chip signal which indicates when an active high level has been captured in the −SD_STB signal, and +STRB which indicates when an active low level has been captured on the −SD_STB signal. +STRA and +STRB are produced by registers 193 and 194 in block 190 and registers 195 and 196 in block 192 respectively. The logic is essentially equivalent as that depicted in FIG. 6A for the −CMD signal.

Figure 6C:
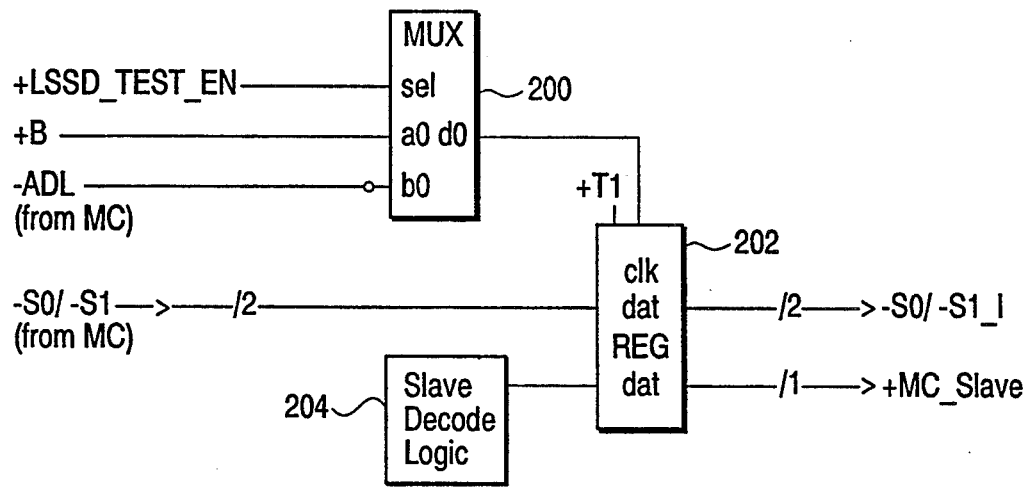

In FIG. 6C, the logic for producing the internal signals for the Micro Channel bus status, −S0/S1_I and that indicating the MIC 112 has been selected as a Micro Channel Slave, +MC_SLAVE. Both of these signals use the −ADL signal from the MC 110 via multiplexor 200 as the second "clock" signal in register 202 which results in the signals being asynchronously latched. This technique is used because there is not time to synchronize the −SDL and −S0/−S1 signals. Register 202 represents a simplification of the actual logic in that two separate registers are used to capture the −S0/−S1 and slave decode signals both of which comprise two latches, the first of which uses a test clock to sample the data waiting for any metastability to settle out, the second of which using the asynchronous −ADL signal as the "clock" signal. The Slave decode logic 204 uses the MC address bus, M/IO, and status signals to determine whether the device is being selected by the current MC Master. The +LSSD_TEST_EN and +B clock signals are used for LSSD test operations on the logic.

Figure 6D:
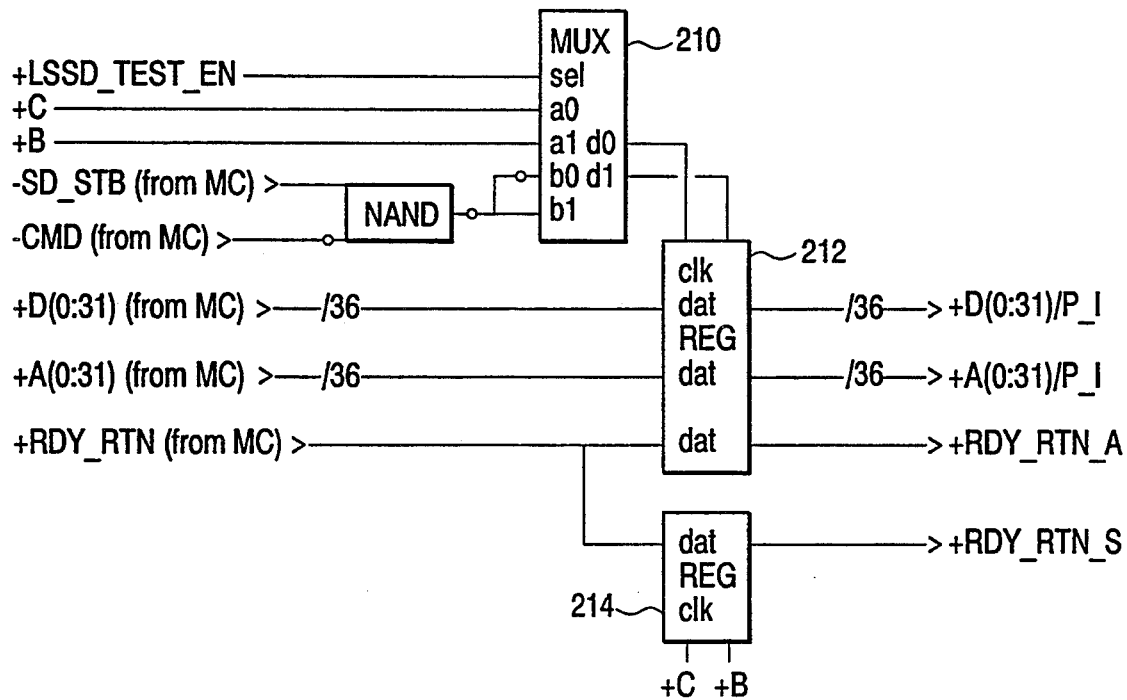

The logic for capturing the asynchronous data, address and +RDY__RTN signals from the Micro Channel 110 is portrayed in FIG. 6D. The −SD_STB and −CMD signals are passed through the multiplexor 210 to register 212 which produces asynchronously latched data, address and +RDY_RTN signals usable in the MIC 112. Similar to register 202 in FIG. 6C, register 212 is a simplification of three separate registers used for the three asynchronous signals from the MC 110. The logic also produces a synchronized signal corresponding to +RDY_RTN with register 214 using internal clocks +C, +B. Internal clock signals +C, +B and the +LSSD_TEST_EN signal are connected to inputs of multiplexor 210 to test the logic according to LSSD operations.

Figure 6E:
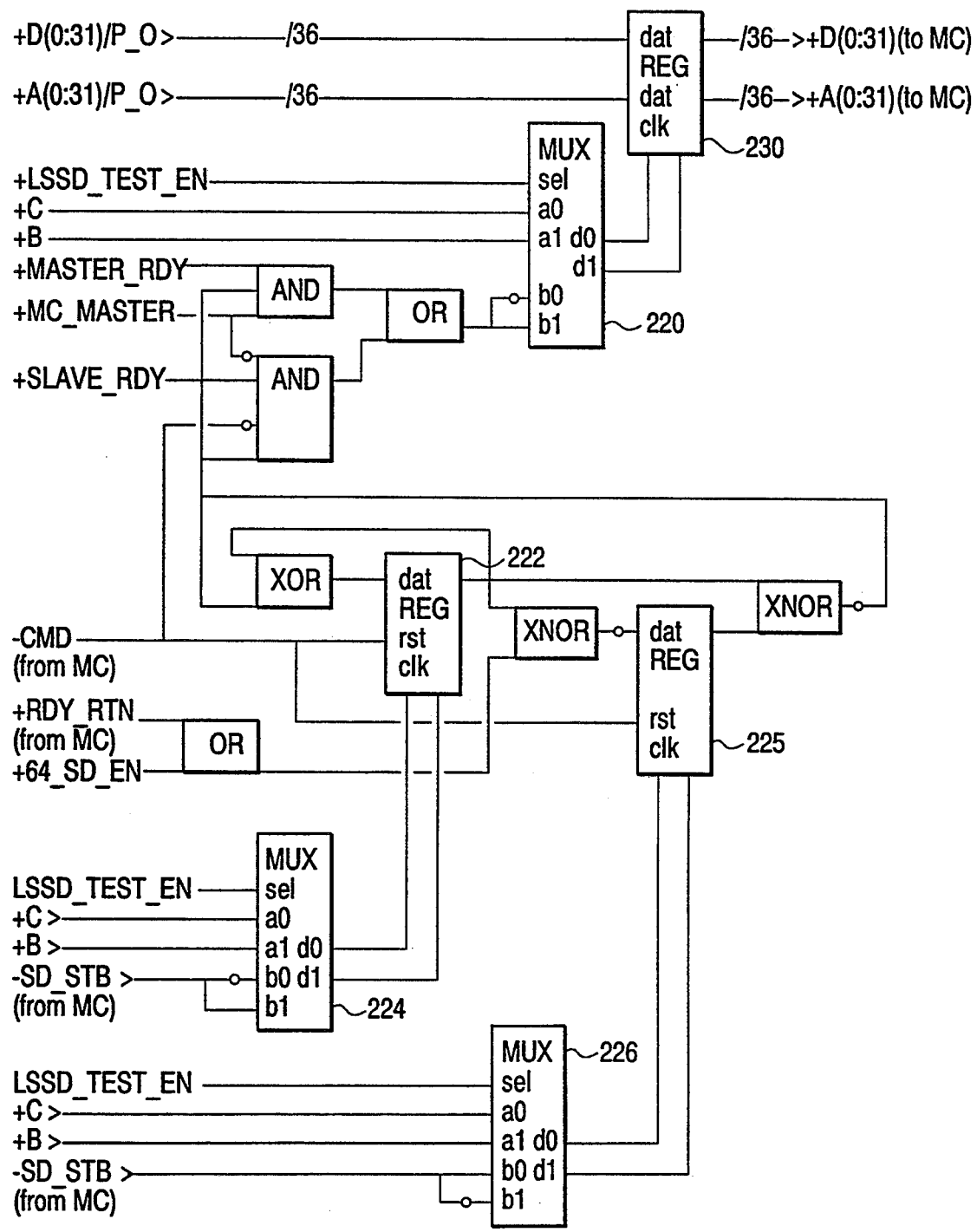

FIG. 6E depicts the logic for capturing data and address signals from the MIC 112 to the Micro Channel 110. Data and address are captured in Register 230 clocked by the remaining clock decode logic shown in FIG. 6E. Multiplexors 220, 224 and 226 provide selectability between operational clocking and LSSD test clocking for registers 222, 228 an 230. Registers 222 and 228 clocked operationally by SD_STB together with the three attendant XOR gates provide the proper clocking control and timing necessary to ultimately clock data and address into register 230 and onto the Micro Channel 110. During the idle times on the Micro Channel 110, −CMD provides a reset to registers 222 and 228 so that the control logic is set in a known state awaiting the next data transfer. The attending OR gate with +64_SD_EN and +RDY_RTN, provide additional control during a 64-bit Streaming Data Transfer and data pacing during a 16 or 32-bit Streaming Data Transfer. These transfer types are described in more detail in the low-end parallel bus architecture and Personal System/2. Hardware Interface Technical Reference Architecture documents cited above. Finally, the AND/OR gates providing input to multiplexor 220 allow selection by +MC_MASTER of separate ready controls during MC Master (+MASTER_RDY) and MC Slave (+SLAVE_RDY) operations completing the clock decode necessary to capture data and address into register 230.

TABLE 2

| Signal Name | Signal Definition |
|---|---|
| −CMD | The MC signal used to indicate when data is valid on the MC. |
| +CMDA | The internal chip signal which indicates when an active high level has been captured on −CMD signal. |
| +CMDB | The internal chip signal which indicates when an active low level has been captured on −CMD signal. |
| +C /+B | Internal system and LSSD clocks. +C control the L1 portion of the register and +B controls the L2 portion of the register. |
| +T1 / +T2 | Internal LSSD clocks. These clocks are held active during non-LSSD operations. +T1 controls L1 portion of the register and +B controls the L2 portion of the register. |
| SD_STB | The MC signal used to clock data during a Streaming Data (SD) transfer. This signal is sent by the MC Master and is received by the selected MC Slave device. |
| +STRA | The internal chip signal which indicates when an active high level has been captured on the −SD_STB signal. |
| +STRB | The internal chip signal which indicates when an active low level has been captured on the −SD_STB signal. |
| S0/−S1 | The MC signals used to indicate bus status. |
| −S0/−S1_I | The internal and asynchronously latched input status. |
| −ADL | The MC signal used to latch and valid MC address. |
| +LSSD_TEST_EN | This signal indicates when LSSD operations are active and selects the proper clocks for the data registers. |
| +D(0:31)/P | The MC 32-bit Data Bus plus byte parity. |
| +D(0:31)/P_I | The internal and asynchronously latched input data bus plus byte parity. |
| +D(0:31)/P_O | The internal synchronous output data bus plus byte parity. |
| +A(0:31)/P | The MC 32-bit Address Bus plus byte parity. |
| +A(0:31)/P_I | The internal and asynchronously latched input Address Bus plus byte parity. This bus is only valid for Streaming Data operations. |
| +MASTER_RDY | This signal indicates when the chip acting as a MC Master is ready to begin writing data words onto the MC. |
| +SLAVE_RDY | This signal indicates when the chip acting as a MC Slave is ready to begin placing read data words onto the MC. |
| +MC_MASTER | This signal indicates when the chip is a MC Master. |
| +MC_SLAVE | This signal indicates when the chip has been selected as a MC Slave. |
| +RDY_RTN | This signal is received by the MC Master and indicates the ready condition of the selected MC Slave. |

TABLE 2-continued

| Signal Name | Signal Definition |
|---|---|
| +RDY_RTN_A | The asynchronously latched +RDY_RTN signal, used internally to validate the data bus. |
| +RDY_RTN_S | The synchronously sampled and latched +RDY_RTN signal, used internally to determine the ready condition. |
| +64_SD_EN | This signal indicates when a 64-bit Streaming data transfer is in progress. |

Figure 7:
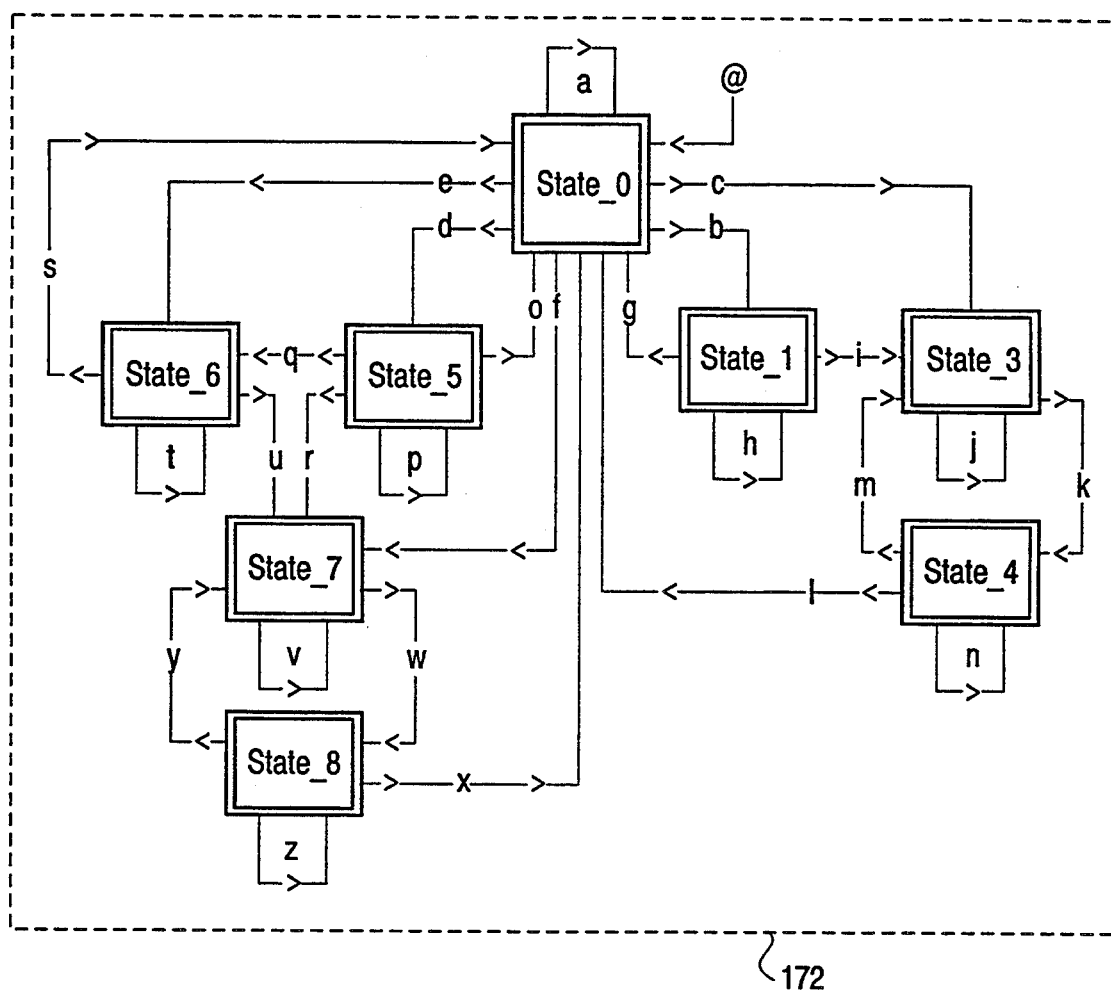
FIG. 7 is a representation of a state machine in the micro channel interface of the present invention.
Figure 8:
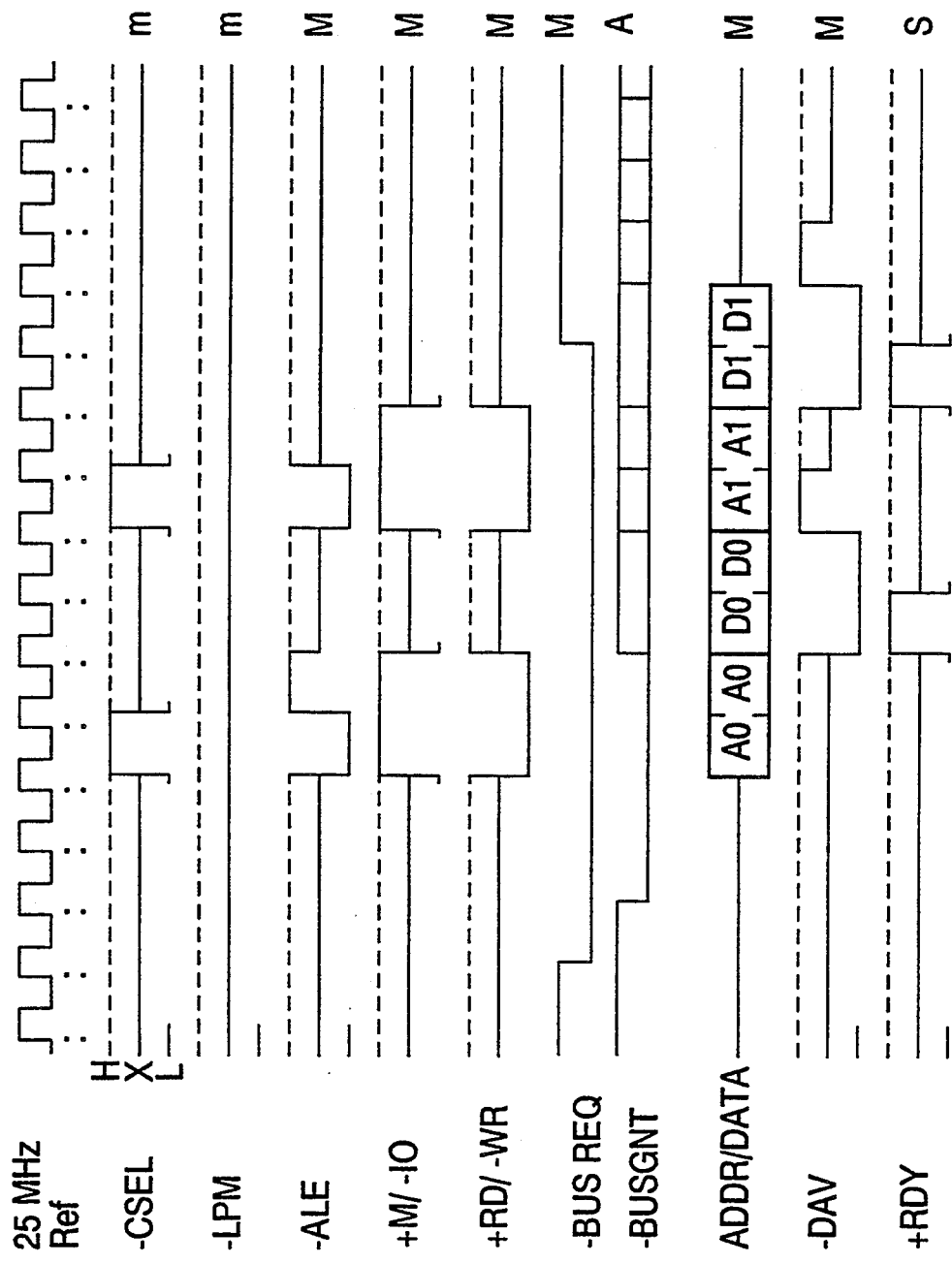
FIG. 8 depicts a timing diagram where two words are written on the local processor bus.
Figure 9:
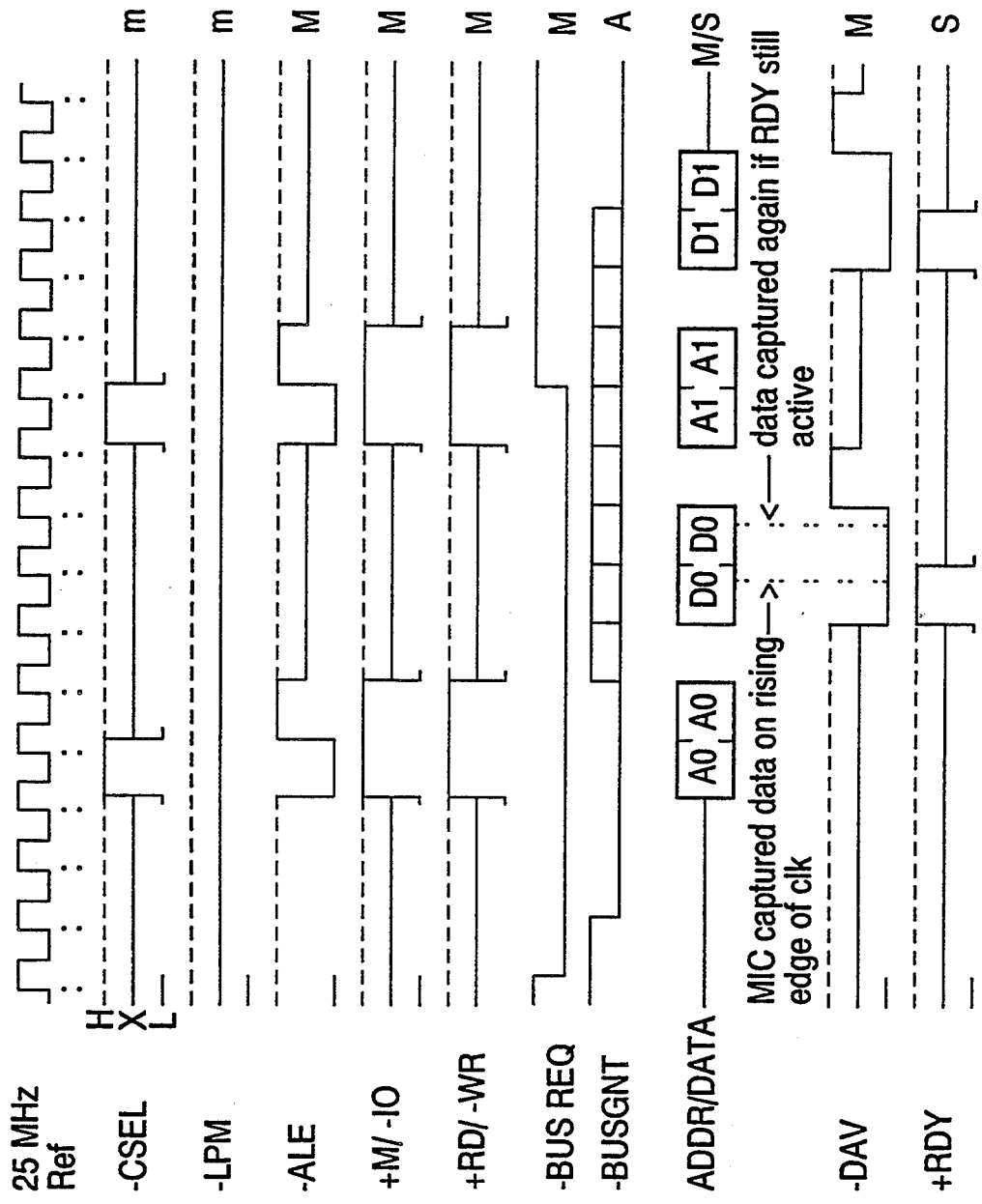
FIG. 9 depicts a timing diagram where two words are read from the local processor bus.
Figure 10:
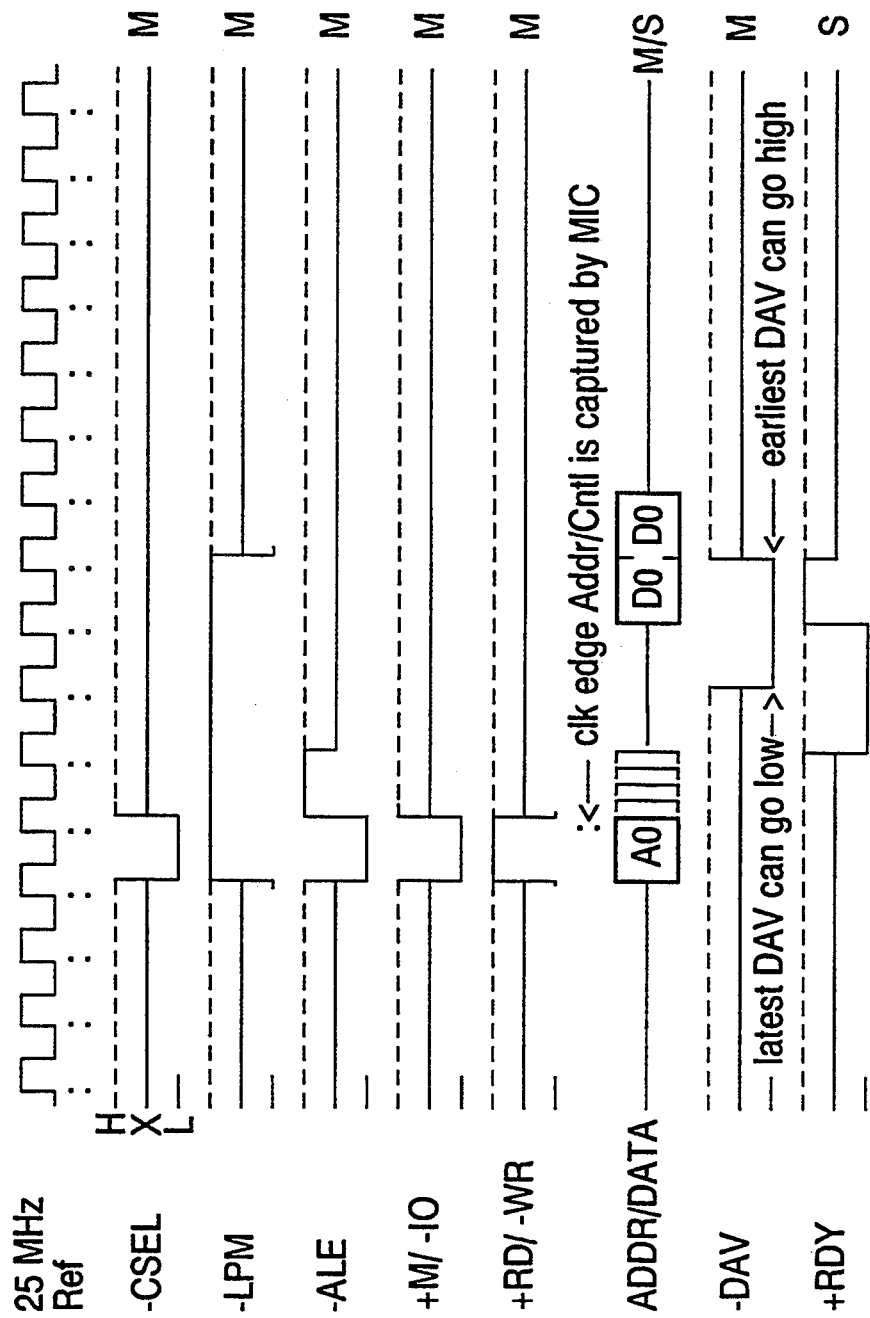
FIG. 10 depicts a timing diagram where a read operation takes place in the micro channel interface chip while it is in a slave timing mode with two 25 MHz wait states.
Figure 11:
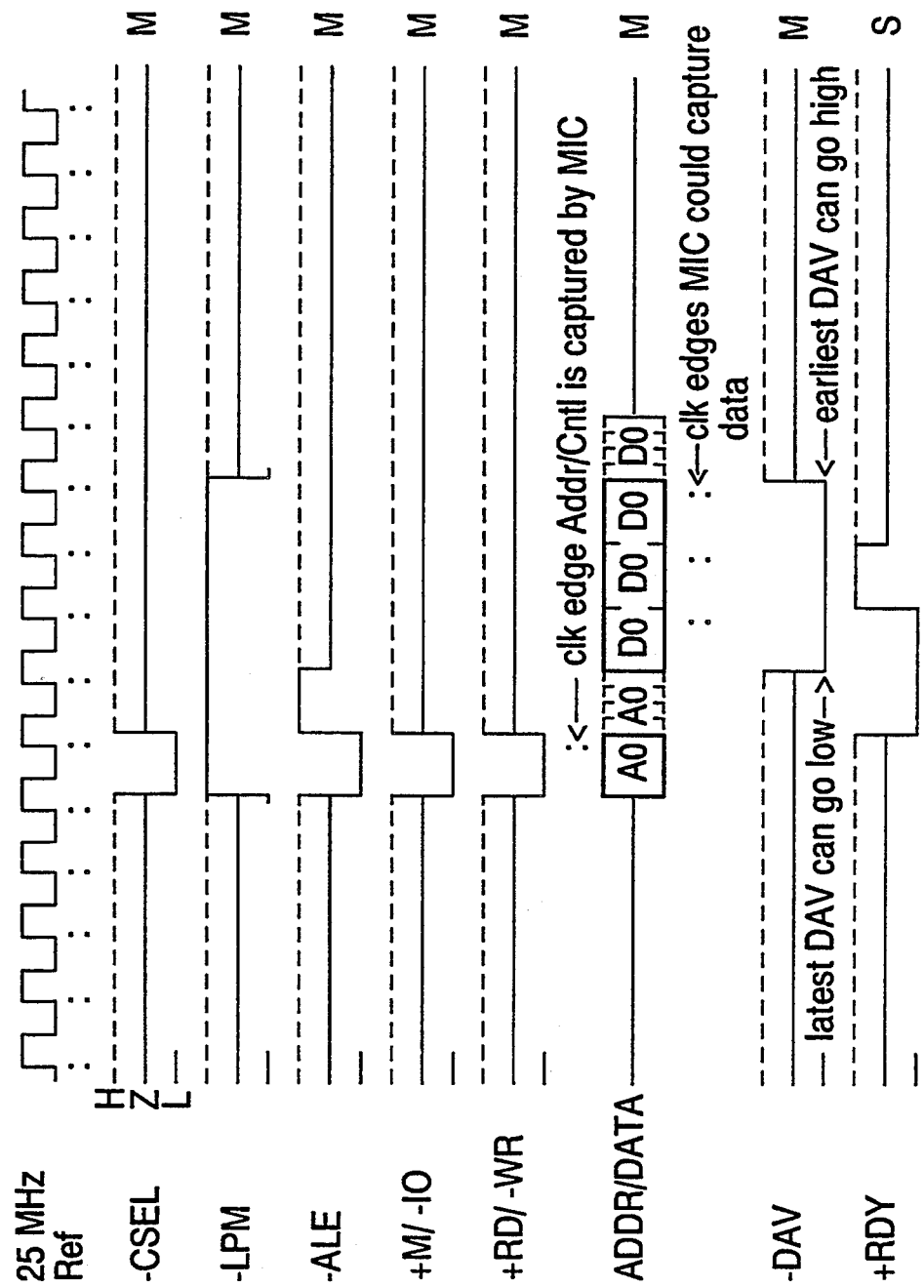
FIG. 11 depicts a timing diagram where a write operation takes place on the micro channel interface chip while it is in a slave timing mode with two 25 MHz wait states.

Once the proper Micro Channel 110 and internal signals have been generated, the current state of the Micro Channel 110 can then be determined using a synchronous state machine design. FIG. 7 illustrates the MC Interface State Machine 172. For quick reference to the state machine 172, Table 3 contains the State transition equations. The definitions of the states are contained in Table 4.

The state machine 172 begins in State_0 which means that the MIC 112 is not active on the Micro Channel 110.

If equation b in Table 3 is satisfied, the state machines goes from State_0 to State_1, which means that the −CMD signal on the Micro Channel 110 has gone active low and the chip will be receiving data from the Micro Channel 110 using either a basic or streaming data transfer. The −CMD signal is used to indicate when data is valid on the Micro Channel 110. If, on the other hand, equation c in Table 3 is satisfied, the state machine goes to State_3, which means that both the −CMD and the −SD_STB signals have gone active low and that MIC 112 will be receiving data from the Micro Channel 110 using a streaming data transfer. The −ST_STB signal is a Micro Channel 110 signal used to clock data during a streaming data transfer. The signal is sent by the master on the Micro Channel 110 and received by the slave device on the Micro Channel 110. If on the other hand, equation d is satisfied, the state machine goes from State_0 to State_5 which means that −CMD has gone active low and the chip will be presenting or has already presented valid data on to the Micro Channel 110. Also, the +RDY_RTN signal is in active low indicating that the Micro Channel 110 is in a not ready condition.

If equation e in Table 3 is satisfied, state machine goes from State_0 to State_6 which means that the −CMD signal has gone active low and the chip will be presenting or has already presented valid data on to the Micro Channel 110 and the +RDY_RTN signal is active high indicating that the Micro Channel 110 is ready for data transfer. The state machine will go from State_0 to State_7 if equation f is satisfied. In State_7, the −CMD and −ST STB signals have gone active low and data is presented by the MIC 112 on to the Micro Channel 110 for a streaming data transfer.

State_4 is reached from State_3 if equation k in Table 3 is satisfied. In State 4, the −ST_STB signal has gone active high and the chip is waiting for valid data to be latched in. State_8 is reached from State_7 when equation w in Table 3 is satisfied. In State_8 the −ST_STB signal has gone in active high and the chip is waiting for the next valid to be clocked out on to the Micro Channel 110. Other transitions and points of stability are described by the equations in Table 3 in conjunction with FIG. 7. For example, as long as equation a is satisfied, the state machine will remain in State_0 which means that the MIC 112 is not active on the Micro Channel 110. The state machine is used with standard components such as a register and associated logic for each of the eight states in the state machine. In the state machine, States_1, 3 and 4 define data states in which the MIC 112 will be receiving data from the Micro Channel 110 and States_5, 6, 7 and 8 define data states in which the MIC 112 will be transmitting data on the Micro Channel 110.

TABLE 3

State Machine State Equations

@ = Reset
a = State_0 & $\overline{b}$ & $\overline{c}$ & $\overline{d}$ & $\overline{e}$ & $\overline{f}$
b = State_0 & +CMDB & +$\overline{STRB}$ &
 [(+MC_SLAVE & −S0_I) / (+MC_MASTER & −S1_I)]
c = State_0 & +CMDB & +STRB &
 [(+MC_SLAVE & −S0_I) / (+MC_MASTER & −S1_I)]
d = State_0 & +CMDB & $\overline{RDY\_RTN\_S}$ &
 [(+MC_SLAVE & −S1_I) / (+MC_MASTER & −S0_I)]
e = State_0 & +CMDB & +$\overline{STRB}$ & +RDY_RTN_S &
 [(+MC_SLAVE & −S1_I) / (+MC_MASTER & −S0_I)]
f = State_0 & +CMDB & +STRB & +RDY_RTN_S &
 [(+MC_SLAVE & −S1_I) / (+MC_MASTER & −S0_I)]
g = State_1 & +CMDA & +$\overline{STRB}$
h = State_1 & $\overline{+CMDA}$ & +$\overline{STRB}$
i = State_1 & $\overline{+CMDA}$ & +STRB
j = State_3 & +$\overline{STRA}$
k = State_3 & +STRA
l = State_4 & +CMDA & +$\overline{STRB}$
m = State_4 & $\overline{+CMDA}$ & +STRB
n = State_4 & $\overline{+CMDA}$ & +$\overline{STRB}$
o = State_5 & +CMDA
p = State_5 & +$\overline{RDY\_RTN\_S}$ & $\overline{+CMDA}$
q = State_5 & $\overline{+CMDA}$ & +$\overline{STRB}$ & +RDY_RTN_S
r = State_5 & $\overline{+CMDA}$ & +STRB & +RDY_RTN_S
s = State_6 & +CMDA & +$\overline{STRB}$
t = State_6 & $\overline{+CMDA}$ & +$\overline{STRB}$
u = State_6 & $\overline{+CMDA}$ & +STRB
v = State_7 & +$\overline{STRA}$
w = State_7 & +STRA
x = State_8 & +CMDA & +$\overline{STRB}$
y = State_8 & $\overline{+CMDA}$ & +STRB
z = State_8 & $\overline{+CMDA}$ & +STRB & denotes a logical AND operation
/ denotes a logical OR operation
Note:
An inactive −CMD and an active −SD_STB combination is not valid per Micro Channel architecture. This means that the equation +CMDA & +STRB is not possible.

TABLE 4

State Definitions

State_0 = ¶ The chip is currently not active on the MC.
State_1 = ¶ The MC −CMD has gone active low and the chip will be receiving data from the MC using either a Basic or Streaming Data transfer.
State_3 = ¶ The MC −CMD and −SD_STB have gone active low and the chip will receive data from the MC using a Streaming Data transfer.
State_4 = ¶ The MC −SD_STB has gone inactive high and the chip is waiting for valid data to be latched in.
State_5 = ¶ The MC −CMD has gone active low and the chip will be presenting or has already presented valid data onto the MC. The MC +RDY_RTN signal is inactive low indicating a not ready condition.
State_6 = ¶ The MC −CMD has gone active low and the chip will be presenting or has already presented valid data onto the MC. The MC +RDY_RTN signal is active high indicating a ready condition.
State_7 = ¶ The MC −CMD and −SD_STB have gone active low and valid data is presented onto the MC for a Streaming Data transfer.
State_8 = ¶ The −SD_STB has gone inactive high and the chip is waiting for the next valid data to be clocked out.

Finally, decoding the state machine, data validation can be achieved in a synchronous manner. This will then allow processing of data without the use of any further asynchronous logic of timing. The decoding equations and definitions are listed below.

BTDAV=g & +RDY_RTN_A
SDDAV=[m / 1 ]& [+RDY_RTN_A / +64_S-D_EN]
SDGND=f / r / u / [y & (+RDY_RTN_A / +64_SD_EN)]

The BTDAV signal indicates that the chip has received and latched valid data during a MC Basic Transfer cycle. The +D(0:31)/P_I bus is now valid. The SDDAV signal indicates that the chip has received and latched valid data during a Streaming Data cycle. The +D(0:31)/P_I and +A(0:31)/P_I are now valid. The SDGND signal indicates that valid data has been transferred and taken on the MC during a Streaming Data transfer. New data can be fetched and presented on the +D(0:31)/P_O and +A(0:31)/P_O busses on the following clock cycle.

As shown above, the capturing logic, state machine, and decode logic together can provide a reliable method for interfacing with and determining the state of the Micro Channel as well as satisfying LSSD rules and requirements. In addition, internal chip designs are simplified by the minimal use of asynchronous logic and control within the chip.

Micro Channel Timing

Timing diagrams for Micro Channel Basic Transfer, Streaming Data, arbitration and parity timing functions can be found in Personal System/2—Hardware Interface Technical Reference—Architecture, Order No. 84F9808, Form No., S84F-9808-00, by the IBM Corporation and is hereby incorporated by reference.

Local Processor Bus Interface

The MIC 112 arbitrates for the LPB 115 by activating the −BUS REQ signal. Once the MIC 112 detects that the −BUS GNT signal has gone active (low), the MIC 112 will become the master and continue to assert −BUS REQ active.

Once the master, the MIC 112 will not release ownership until it detects: either −BUS GNT has gone inactive OR the MIC 112 no longer needs the bus. When the MIC 112 detects that it should give up ownership of the bus, −BUS REQ will become inactive (high). This indicates that the MIC 112 is currently performing its last access.

Once the MIC 112 has made its −BUS REQ inactive, the MIC 112 will not request the LPB 115 back until it detects that −BUS GNT has gone inactive. This allows no time restrictions on the external LPB arbitration logic to make −BUS GNT inactive relative to the MIC making −BUS REQ inactive.

Master Operations

When the MIC 112 gains ownership of the LPB 115 the MIC 112 becomes a LPB master. As a master, the MIC 112 is able to read/write data to and from the LPS. The MIC 112 as a LPB Master will always perform word (2 byte) accesses.

The MIC 112 begins master operations by supplying an address on the +ADDR/DATA(0:19)i. This address is then latched by the −ALE signal. Once the address is latched, the +ADDR/DATA(0:19)i bus can be used for the transfer of data. The +M/−IO signal determines whether the address is in the memory space or I/O space of the LPB 115. The +R/W signal determines the direction the data will flow on +ADDR/DATA(0:19)i. Data transfers only utilize the lower 16-bits of +ADDR/DATA(0:19)i. Odd parity for +ADDR/DATA(0:19)i is generated/received on +A/D PAR(0:2)i.

The −DAV and +RDY signals are used for handshaking and validation during the data transfer. −DAV, sourced by the LPB Master, becomes active when valid data exists on +ADDR/DATA(0:19)i bus. +RDY, sourced by the LPB Slave, is used to inform the MIC that a LP device is ready/not ready to receive data during a write or send data during a read.

LPB Slave Operations

The MIC 112 becomes a LPB slave when −CSEL is active and/or a predefined address has been decoded. When the MIC 112 is a slave, a LPB device 119, 122 has the ability to access additional resources, such as initialization registers, direct access to the LDB 117, and the Queue Printers. −ALE and +R/W become inputs controlled by the LPB device. −DAV becomes an input representing when valid data is to be written or when the master is ready to accept read data. +RDY becomes an output from the MIC 112 validating a write or read data to the LPB device. MIC Slave accesses to the Initialization and Control register must be on a word (2 byte) boundary. LDB window accesses may be on 1 or 2 byte boundaries.

Interrupts

The MIC 112 supplies four programmable interrupts, −INT(:3). These interrupts inform a LPB 119, 122 device that a queue which the MIC 112 is managing contains a job(s) or an error has occurred. The MIC 112 provides a readable register to indicate the status of jobs within the Queues. An interrupt is cleared by either removing all jobs from a Queue or clearing the error condition.

Errors

All errors detected by the MIC 112 on the LPB 115 are indicated by an interrupt. An error interrupt can be generated by a USW being posted to a Queue or if a Queue error occurs via the Queue error register.

The LPB Error signal is used to clear the MIC 112 of a hang condition. If the MIC 112 is a LPB Master and the slave device does not respond with a ready condition, then the LPB error should be used to allow the MIC 112 to terminate the current transfer. If the LPB Error signal becomes active then a USW is posted. The MIC 112 only receives the LPB Error signal, the MIC 112 never drives it.

Local Processor Bus Timing

FIGS. 8 through 11 illustrate LPB timing for slave and master operations. The following conventions were used in FIGS. 8 through 11 depicting the LPB Timing diagrams:

First, data was skewed in relation to the rising edge of the system clock to illustrate which edge the MIC 112 uses to send and receive data. When the MIC 112 drives the signal, the data is shown to change slightly after the rising edge of the clock. When the MIC 112 is receiving the signal, that data is drawn such that it is stable around the rising edge the MIC 112 will clock it on. Second, the right hand column of each timing diagram lists who is controlling the signal (M=master, S=slave, A=arbitration logic, and m=not driven by MIC 112 when master, controlled externally). Third, the dashed line represents a pull-up holding the signal high while it is not being driven. Fourth, with the exception of the −ALE which is always valid, any signals sent to the MIC 112 during an access is in a don't care state in those cycles where the dashed line appears. Any signal the MIC 112 controls during that access may require the pull-up to hold it active (i.e. +RDY). Fifth, ':' at the top of the diagrams represents the clocking edge for the MIC 112.

Local Data Bus Interface

Referring to FIGS. 2 and 3, the LDB interface 137 is a 100MB interface that is designed to handle high speed data transfers between LDS memory 123 and any device connected to the LDB 117. The data bus shall consists of 32 bits of data with 4 bits of odd byte parity. The address bus shall consist of 10 bits of address and 2 bits of odd parity. The address bus 137 allows for the access to an address range of 1MB by using a page address scheme that consists of an 8 bit high address (HA) followed by a 10 bit low address along with four byte enables.

Arbitration on LDB 117 is accomplished by the use of a one-bit token ring protocol. This protocol allows for multiple LDB devices, programmable time sharing among the LDB devices, minimal latency during passing of bus ownership, parity and protocol error detection, and error recovery. Also included is an error signal called LDB_Err and a request signal called LDB_ROB.

Figure 12:
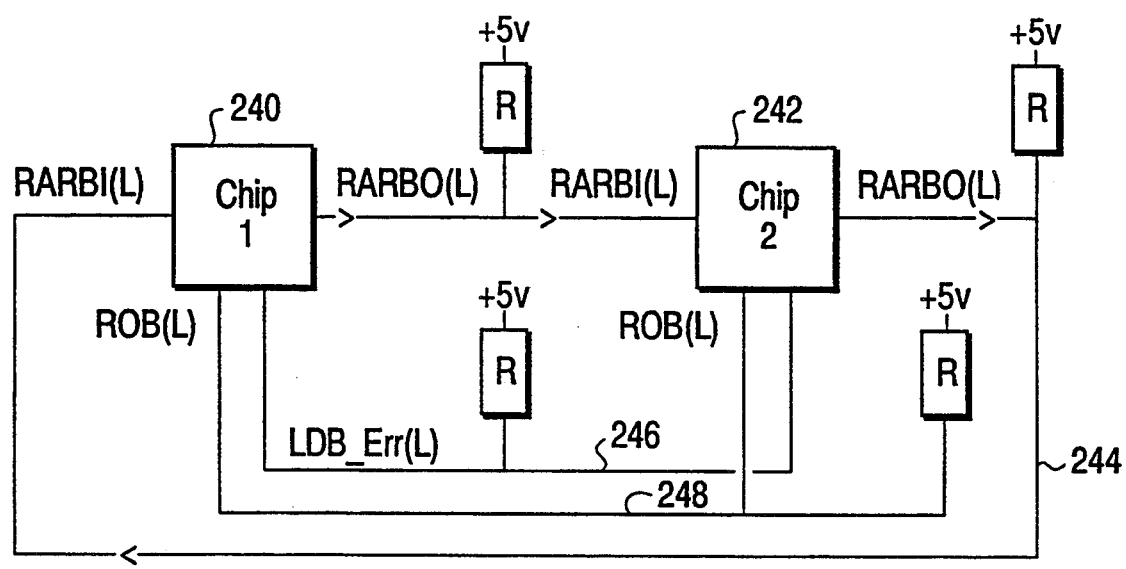
FIG. 12 is a block diagram of the protocol signal connections for a two chip ring.
Figure 13:
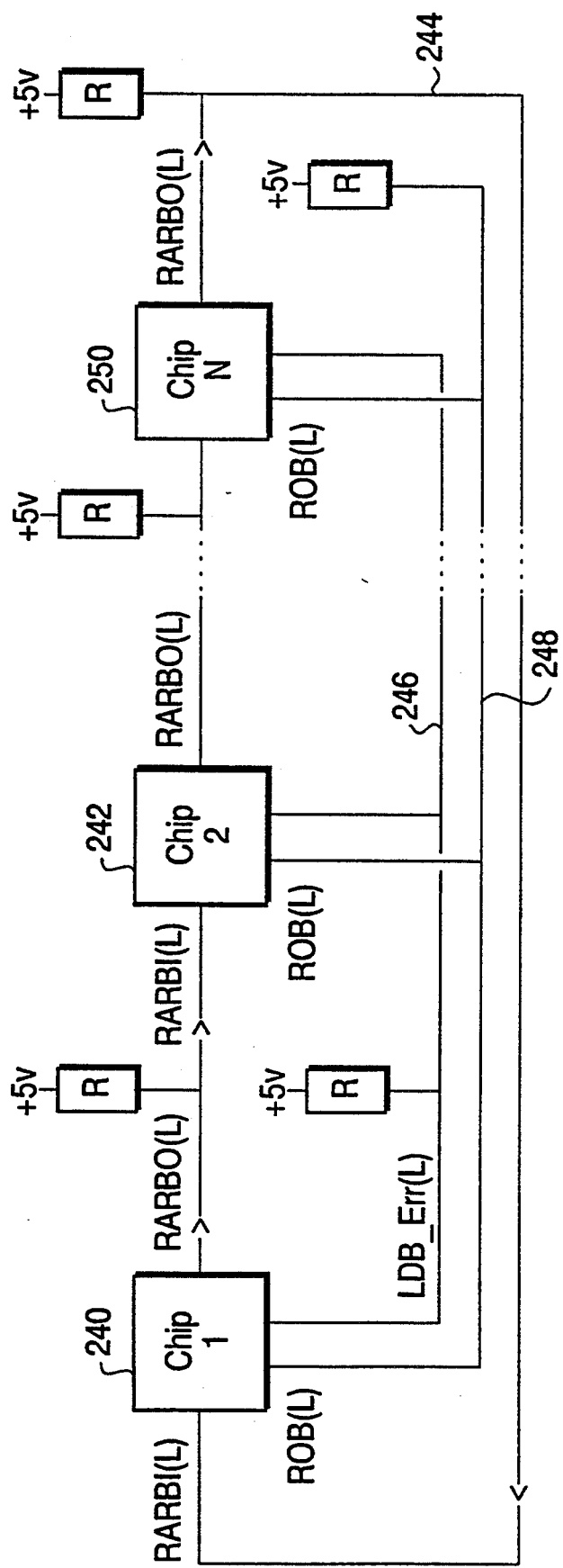
FIG. 13 is a block diagram of the protocol signal connections for a multi-chip ring.

Referring to FIGS. 12 and 13, several signals are used for the 1-bit token ring protocol used on the LDB 117. In FIG. 12, a two-chip ring is depicted. Chips 1 and 2, 240 and 242, depicted generally in the figure, are the MIC 112 and the Serial Interface 113 respectively. As shown in FIG. 13, the protocol connections can be extended for a multichip ring with the same number of I/O signal connections which allows other devices 124, 125 coupled to the LDB 117 to act as the LDB master.

To accommodate multiple users on the LDB bus 117, the protocol signals are coupled such that the RARBI and RARBO form a ring 244 for the token to rotate on while the LDB_ROB 248 and LDB_Err 246 signals are hooked to form a hardwired dot OR function. Unlike typical token rings, the ring 244 of the present invention is used for arbitration only. The lines dedicated to the LDB 117 are separate from those used for the ring 244 and ROB 248 and Error 246 signals.

Positive logic is used to define the active levels of the I/O signals. The RARBI(L) signal, or Ring Arbitration In signal, is an input to the chip which is used to receive the token when passed from another user on the ring. The RARBO(L) signal, or Ring Arbitration Out signal, is an output from the chip which is used to send the token to the next device on the ring. Both the RARBI and RARBO signals are passed on the ring 244. In the preferred embodiment, the token appears as a 1 cycle active low pulse. The LDB_ERR(L) signal 246 is a bidirectional signal which indicates that there is an error on the LDB 117. In the preferred embodiment, the driver type is open collector with a pull-up resistor external to the chip. This signal is to indicate to all ring participants that an error has been detected on the ring. The severity of the error is preferably indicated by the number of cycles the Bus Error signal 246 is held active. The Bus Error signal is active low.

The ROB(L) signal, or Request to Own the Bus signal, 248 is also bidirectional. In the preferred embodiment, the driver type is an open collector with a pull-up resistor external to the chip. The purpose of this signal is to notify the current device holding the token that another device is waiting to use the bus. The current holder of the token uses the ROB signal to enable its internal counter which indicates how long it can hold the token. All other devices use the ROB line on the LDB 117 to enable an internal counter which indicates how long it should take for the token to rotate around the ring.

Each ring member 240, 242 may contain two timers. These two timers allow for programmable bus arbitration latencies. The rate and implementation of these timers may be determined by the designer, system environment, and/or chip clock rate. The Token Hold Timer (THT) defines the maximum time that a device may hold onto the arbitration token. The Token Rotation Timer (TRT) defines the maximum time between the release of the token to receiving the token back.

The TRT may be defined as illustrated in the equation below:

$$TRT(X)\P = Q + 2N - THT(X) + \_THT(1) + \ldots THT(N)\_, \text{ where } N\P = 1$$

Q = Time delay constant determined by the environment.

2N = N is the number of chips in the 1-bit Token Ring. The multiplication factor of 2 represents the two registers in the token path per device, namely TokIn and TokOut.

X = The chip being designed.

With the use of the LDB ROB line, each chip can provide an enable for incrementing its THT and TRT timers. If the LDB_ROB signal does not become active, the token can be held by a chip accessing the bus for as long as it needs it because the THT timer is not enabled. Once the LDB_ROB line becomes active, the chip holding the token has until its THT timer expires before it must release the token.

Only those bus participants with high potential demand for the shared bus resource need the Token Hold Timer. The timer is not needed for the chips which will only hold on to the local data bus 117 for a short period of time. Also, only one ring member needs the Token Rotation Timer to detect the lost token condition on the ring 244.

As all bus members participate in the arbitration of access to the LDB 117, fairness is inherently provided. Further, the ROB signal 248 helps improve the efficiency of the LDB 117 as a processor not relinquish control unless another processor requires the resources well as preventing bus monopolozation.

The Ring state machine consists of 4 basic states: Ring Down (RD), Idle (Id), Token Master (TM), and the Error Detected (ED) state. Each LDB ring device should follow the state transitions shown in FIG. 14. The LDB ring state machine controls initial startup, arbitration, and error recovery. FIG. 15A also shows the boundary logic the MIC 112 uses to interface the ring state machine to the LDB control signals. All ring devices should have a two cycle delay from their RARBI to RARBO to ensure proper removal of the token when the ring goes down. Active levels of signals in the following figures are represented by a "(H)" or "(L)" suffix. Active and Inactive states of signals are represented by the lack of an overscore (active) or the presence of an overscore (inactive).

Figure 15B:
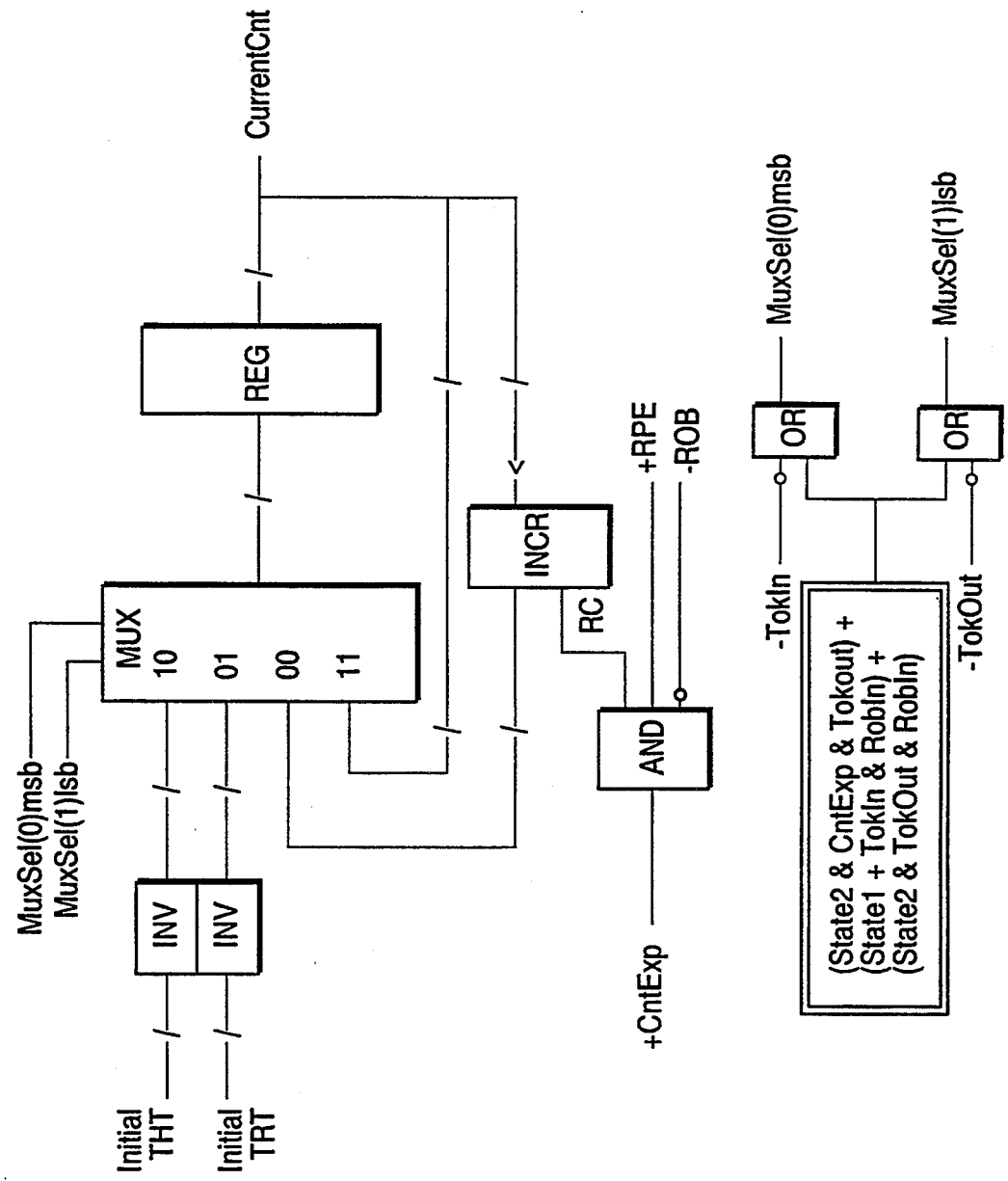
FIG. 15B is a block diagram of the TRT and THT logic, timers on the local data bus.

FIG. 15B illustrates the implementation of the logic for the two timers, the Token Hold Timer (THT) and the Token Rotation Timer (TRT). Every high demand bus member must have the THT to determine how long after the ROB signal is received it can maintain control of the bus. At least one bus member must have the TRT to detect a lost token condition on the ring. The CurrentCnt signal is loaded with the inverse the THT or the TRT. When enabled, it counts up until it contains all 1's and generates a carry out. As shown, the signals to the multiplexer are controlled by the states and other signals generated by the state machine and associated logic in FIGS. 14 and 15A.

System reset is required to initialize all devices into the Ring Down state. Prior to the ring start up, each device should have its TRT and THT values initialized. Once all members of the LDB 117 have been initialized, one chip on the ring must be made the Ring Master. The Ring Master is responsible for initiating a new token when the ring is down and all LDB 117 error conditions have cleared. Once the token is initiated onto the ring, it will be received and passed by each device until it makes one full revolution. This initial revolution will bring all chips into a Idle State. There should never be more than one token rotating around the LDB ring. In one preferred embodiment, the MIC 112 is the Ring Master.

Once in the Idle State, a device is free to activate the LDB_ROB line in an effort to gain ownership of the LDB 117 by capturing the token. Once a device detects the token, the device should transition to the Token Master State. If, while waiting in the Idle State the TRT expires, that device should activate the error signal and transition to the Error Detect State.

Once a device enters the Token Master State, it can either pass the token on to the next device or hold onto it. If the device holds onto the token, it is free to access LDS 123. While in the Token Master State, the device should increment its THT whenever it detects the LDB_ROB signal is active. Once this timer expires, the Token Master must finish its access, release the token, and go back to the Idle State.

An LDB ring device enters the Error Detect state whenever that device detects that there has been an error in the LDB protocol. The two basic conditions that will cause this transition are a lost token, i.e., TRT expires, or the detection of a 2nd token on the ring. If either of these conditions exist, that device should activate the LDB_Err signal for at least two consecutive cycles which will send all the LDB devices into the Ring Down State.

All ring devices will enter a Ring Down state upon detecting that the LDB_Err signal has gone active for at least two consecutive cycles. In this state, each device will discard any tokens that they receive while the Bus Error line is still active. Once the Bus Error line goes inactive, the device enabled as the Ring Master should re-initiate the token to start the ring back up.

The local processor that is handling error recovery has the capability of controlling the restart of the ring after it goes down. If the processor wants the ring to automatically restart once the error has cleared, it should leave one device in the ring initialized as the Ring Master. If the processor wants to prevent the automatic restart, it should first activate one device as the Ring Master for initial start up, and then deactivate that device as the Ring Master.

Upon detecting an error, a device can notify the other ring devices that an error has occurred by activating the Bus Error line. Any device not activating the LDB_Err signal can determine the severity of the error by detecting the number of consecutive cycles the Bus Error signal is active. There are two categories of errors defined on the LDB: 1) non-recoverable, 2) recoverable.

Non-recoverable errors are errors that require the ring to be brought down and restarted due to protocol errors such as a lost token or the detection of two tokens on the ring. The non-recoverable error conditions are detected when the Bus Error line is active for at least two consecutive cycles. A few examples of non-recoverable errors include a lost token. Once the token has been passed to the next device on the ring, the TRT value is loaded into a counter. This counter should be enabled when the LDB_ROB signal is active. If the token does not return by the time the TRT counter has expired, the device should activate the LDB_Err signal for at least 2 cycles signifying a non-recoverable error. Another non-recoverable error is when a device finds two tokens: If a second token is detected while a device is holding the token, the device should activate the LDB_Err signal for at least two cycles signifying a non-recoverable error.

Recoverable errors are errors which have not damaged the protocol on the ring, thereby not requiring the bus to be brought down and restarted. Recoverable errors should be detected by a device that is in the Idle State and is monitoring the LDB data transfer of the current Token Master.

The MIC 112 will monitor other devices for two types of recoverable errors: Address parity errors on a read operations, and byte enables (BE(0:3)) being active while HALE is active. The MIC 112 will activate the LDB_Err signal while in the Idle State for each recoverable error it detects from the Token Master. This may cause the MIC 112 to activate the LDB_Err signal for at least two consecutive cycles should the Token Master continue to perform accesses that have either of these errors.

Upon detecting the LDB_Err(L) active for one cycle the Token Master has the option of continuing or releasing the token to the next device. If the Token Master detects the LDB_Err active for 2 consecutive cycles, it must finish its LDB access and enter the Ring Down State.

The purpose of the LDB_ROB signal is to give the current Token Master an indication as to whether a 2nd ring device is waiting for access to the LDB 117 or LDS 123. This signal should be used by the Token Master to enable its THT and by the devices in the Idle State to enable their TRT signal.

There is no restriction on what cycle a device activates and deactivate the LDB_ROB line as it transitions through the ring state machine and in fact the signal can be permanently tied to ground. This of course would not provide the most efficient use of the bus, since a device may be forced to give up the token when no other devices needed the bus.

The following guidelines can be used for activating LDB_ROB which will make the most efficient use of LDS 123. These are also the rules the MIC 112 uses in its preferred embodiment. Once a device determines it needs the LDB 117 and the token is not currently in its boundary in register (TokIn(L)), it should drive the LDB_ROB signal active in the following cycle. If the token was currently in the boundary in register then the device should capture the token and not drive the LDB_ROB signal active. Once a device which is currently activating the LDB_ROB signal receives the token in its boundary in register (TokIn(L)), it should stop driving the LDB_ROB signal in the following cycle. The LDB_ROB signal may remain active due to a 2nd device. Once a device in the Token Master state is forced to release the token due to its THT expiring, it may cause the LDB_ROB signal to go active the cycle after the token was in its boundary out register (RARBO active) if it wants to gain the token back.

Figure 16:
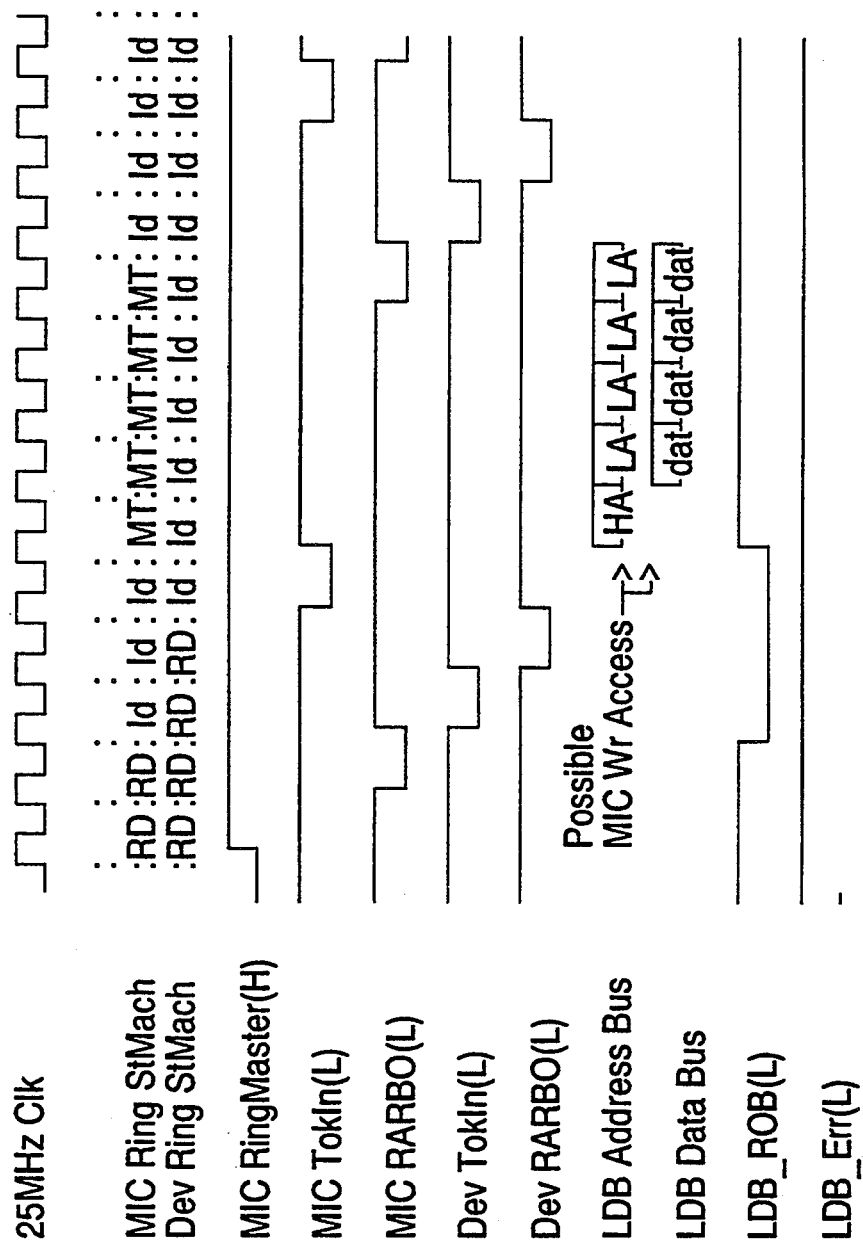
FIG. 16 is a timing diagram of the local data bus start-up with immediate access to the micro channel interface chip.

FIG. 16 shows the timing of the MIC 112 starting up the ring on the LDB 117 with another device from the Ring Down state. In this example, the MIC 112 is the Ring Master and also performs an LDB access as soon as the bus is up. Note that the token should rotate once around the ring before any device should capture it in order to gain access to the LDB 117.

Whenever the LDB Err line goes active for at least 2 consecutive cycles, it is the responsibility of each device to detect the old token and discard it once in the Ring Down State. This window of time in which each device discards the old token must be followed by each device so that each device can determine the difference between the old token that was stripped and the new token which brings the ring back up. The window for stripping the token while in the Ring Down state is defined in the equation for Take Token in FIG. 15A.

The earliest point in which the Ring Master can inject the new token on the ring is included in the equation for the Inj_Token(L) signal in FIG. 15A. It is preferred that one device have the capability of becoming the Ring Master. If multiple devices have the capability of issuing a token, then two tokens could be put on the bus if software mistakenly initialized the ring 244 to have two Ring Masters. This condition would be detected but possibly after two devices both tried to drive the LDB 117.

LDB Data Transfers

Once a LDB device has gain ownership of the LDB 117 by becoming the Token Master, it is free to transfer data to and from the LDS 123 until it gives up its ownership. Each device on the LDB 117 can access the Local Data Store 123 using the following signals: ADDR(0:9), APAR(0:1), DATA(0:31), DPAR(0:3), −HALE, +R/W, and −BE(0:3).

Addressing on the LDB 117 uses a paging scheme that involves an 8-bit high address (HA) and a 10-bit low address (LA) sent across the ADDR(0:9) bus which allows for addressing of up to 1 Mega Bytes. The HA only needs to be sent when a new 4MB segment is to be accessed.

Whenever a device puts out a HA on the ADDR(0:9) bus, the HALE(L) should be active, the R/−W should be valid, the byte enables BE(0:3)(L) should be inactive, the data bus should be tri-stated, and all 10 bits of address should be driven with good parity even though only the least significant 8 bit of the HA are used.

Whenever a device puts out a LA on the interface, the HALE(L) should be inactive, the R/−W should be valid, at least one of the BE(0:3)(L) should be active, the DATA(0:31) should contain the write data with good parity if it a write, and all 10 bits of address should be driven with good parity.

Figure 17:
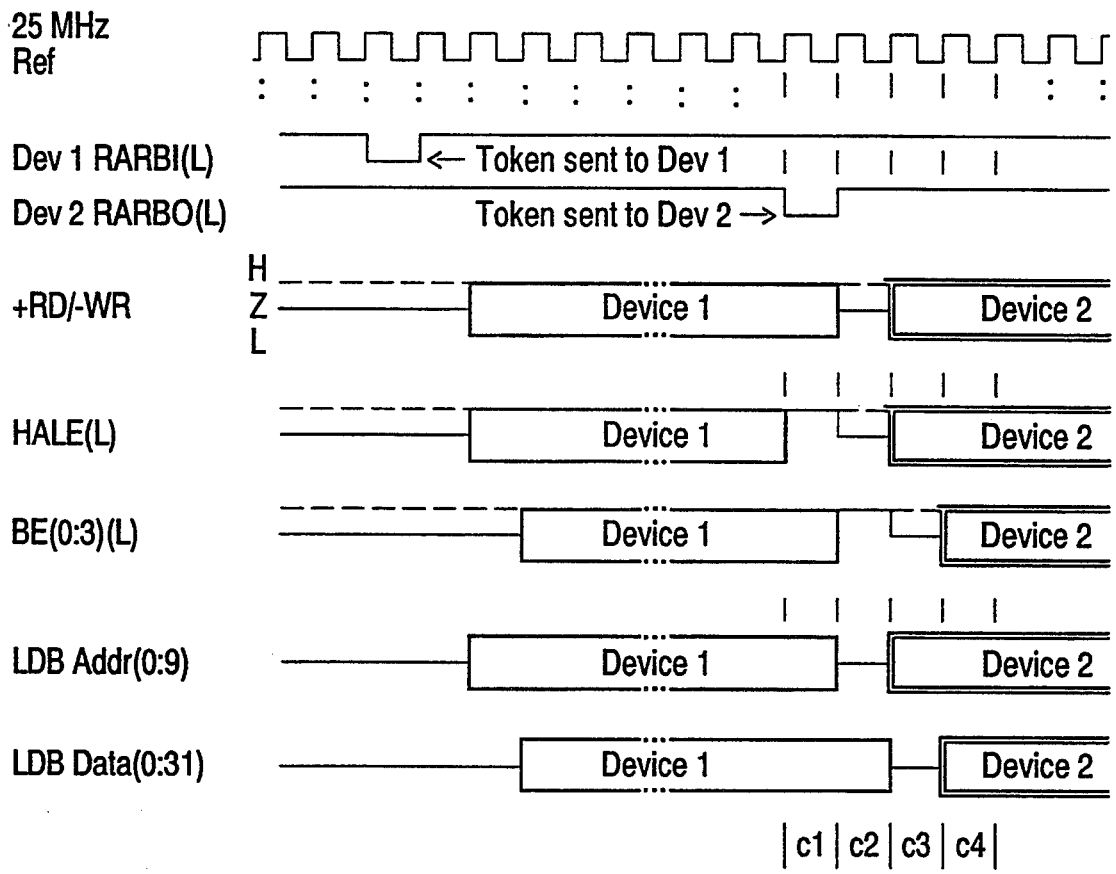
FIG. 17 is a timing diagram for driving the local data bus signals.

To enable LDB devices to exchange ownership of the LDS 123 without interfering with each others accesses, the following relationship should exist between the cycle the token is captured and released, and the cycle in which the LDB address, data and control signals are driven and released as shown in FIG. 17. This relationship will provide for one dead cycle on the LDB 117 during the exchange of ownership.

The MIC 112 shall maintain maximum LDB bandwidth by making efficient use of LDB 117 as the LDB master and minimizing the bus latency during the exchange of ownership with another device. It is recommended that all devices on the LDB 117 follow the timing relationship of the MIC 112 to preserve the maximum bandwidth of the LDB 117. The timing specified together with the rule for putting out the HA relative to detecting the token will ensure that the latency in passing the ownership of LDB 117 is minimized while always keeping one dead cycle on all shared LDB 117 signals during the exchange. The MIC 112 determines its last access by checking the state of the THT and LDB_ROB when it is preparing to put a LA on the interface the following cycle.

The MIC 112 shall not stop the token from propagating onto the next device unless it has an immediately need for LDS 123.

If the MIC 112 needs to take the token in order to access LDS 123, the MIC 112 shall drive its HA on the interface the cycle after it detects the token in.

When the MIC 112 is the LDB master, it shall release the token relative to its last bus operation in such a manner that it minimizes bus latency when passing the ownership to the next device.

Figure 19:
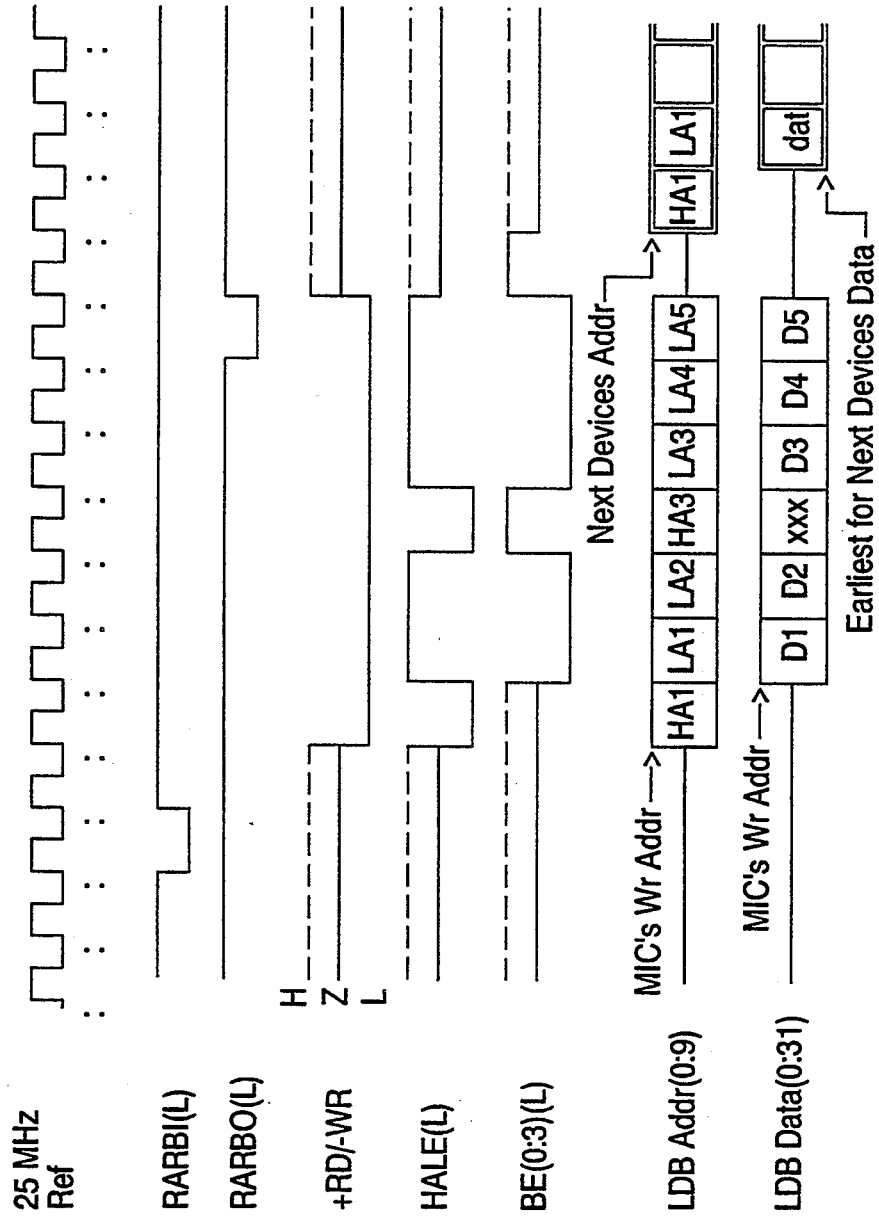
FIG. 19 is a timing diagram of the local data bus depicting a micro channel interface chip write of five words.
Figure 20:
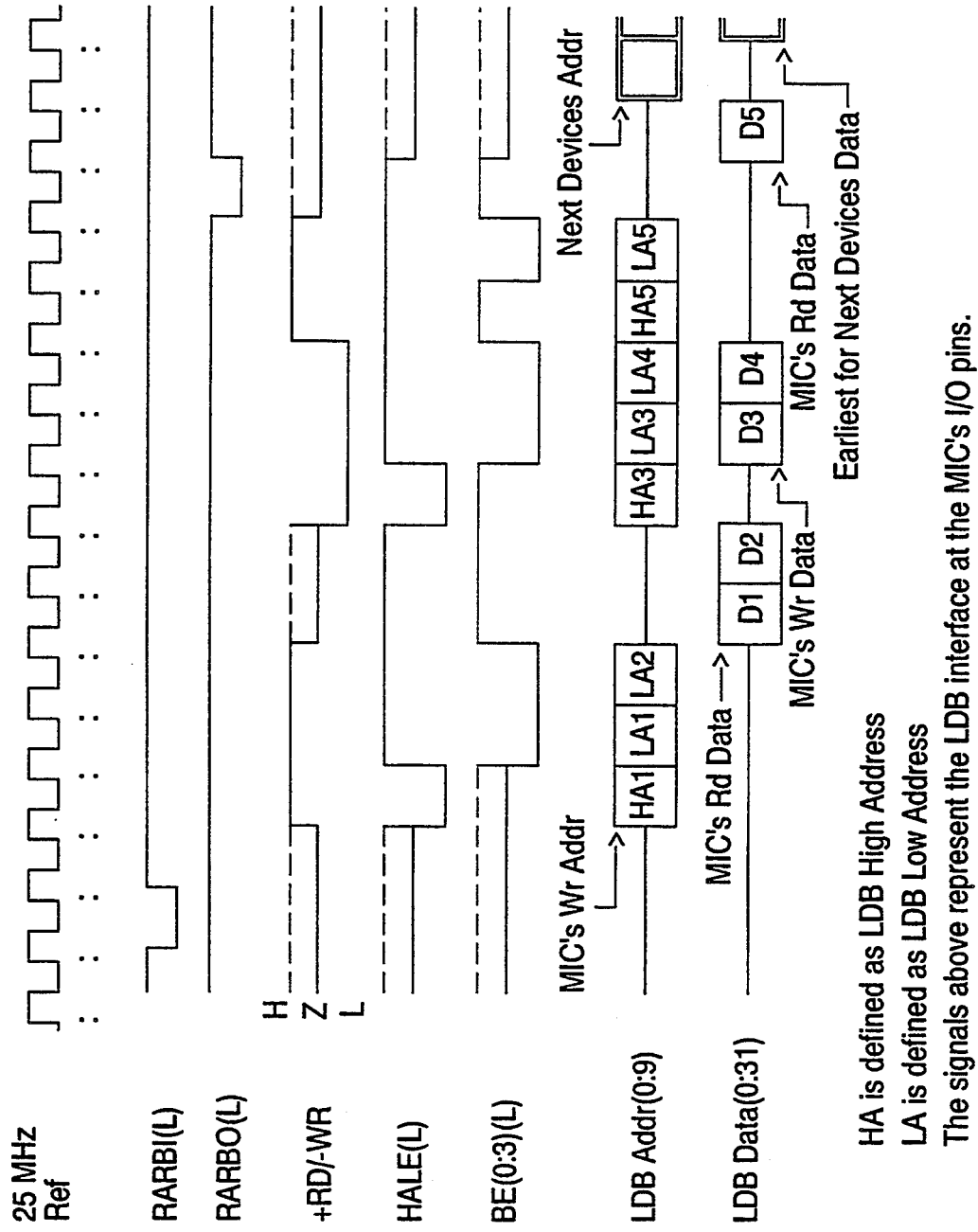
FIG. 20 is a timing diagram of the local data bus depicting a micro channel interface chip read of two words, write of two words and read of one word.

When the MIC 112 is a master and the last operation is a write, the MIC 112 will have the token on the interface in the same cycle the last write LA is on the interface as shown in FIG. 19.

When the MIC 112 is a master and the last operation is a read and the MIC 112 is programmed for 0 wait states, the MIC 112 will have the token out on the interface one cycle after the last read LA is on the interface as shown in FIG. 16.

When the MIC 112 is a master and the last operation is a read and the MIC 112 is programmed for 1 wait states, the MIC 112 will have the token out on the interface one cycle after the last read LA is on the interface. When the MIC 112 is the LDB master, it preferably drives HALE(L) and the BE(0:3)(L) inactive (high) before tri-stating them. This means that the pullups on the module are not required to pull these signals back inactive in one cycle but just for holding then inactive once the MIC releases them.

After a HA has been driven with the R/−W signal high, an LDB master read access is triggered when an LA is sent with at least one BE(0:3) active and the R/−W line high. The master can pipeline its reads by sending a series of read LA.

The MIC 112 was designed to perform LDB 117 reads with either 0 or 1 wait state. This enables the MIC 112 to be used in various applications that use RAMs with different access times. The number of wait states the MIC 112 will perform should be set during initialization by writing MIC LPB memory register x1006 (DBW, bit 13). If the MIC 112 is programmed for 0 wait states, then it will put its LA on the interface for one 25 MHz cycle and expect the read data to be on the LDB interface 133 two cycles later. If the MIC 112 is programmed for 1 wait states, then it will put the same LA on the interface for two 25 MHz cycles and expect the read data to be on the LDB 133 interface three cycles after that read access' first LA appeared on the interface. For both 0 or 1 wait state reads, the MIC 112 will pipeline read operations. FIG. 16 shows the MIC 112 timing for an LDB read operations with 0 wait state. When MIC 112 performs LDB Reads no wait states:

An initial HA will be put out the cycle after the MIC 112 clocks in the token (RARBI(L)=L) when starting an access.

A series of one or more LAs will always follow starting the cycle after a HA.

One HA may be inserted in between a series of LAs each time the MIC 112 needs to access a different 4KB segment.

The MIC 112 will release the token whenever its Token Hold Timer expires or it no longer needs to access LDS 123.

For reads, the MIC 112 will release the token to the next device (RARBO(L)=L) one cycle after it drives its last address.

The MIC 112 will always drive HALE(L) and BE(0:3)(L) inactive before tri-stating these signals. This enables a slow pullup to be used on the module to hold these signals inactive.

Once an HA has been driven with the R/−W signal low, an LDB master write access is triggered when a LA is sent with at least one BE(0:3) active and the R/−W line low. The write data and the LA should both be on the interface at the same time. The 0 and 1 wait state feature mentioned above for reads does not effect the timing for writes. As in the case of reads, the master can pipeline a series of write LAs along with the write data.

Figure 18:
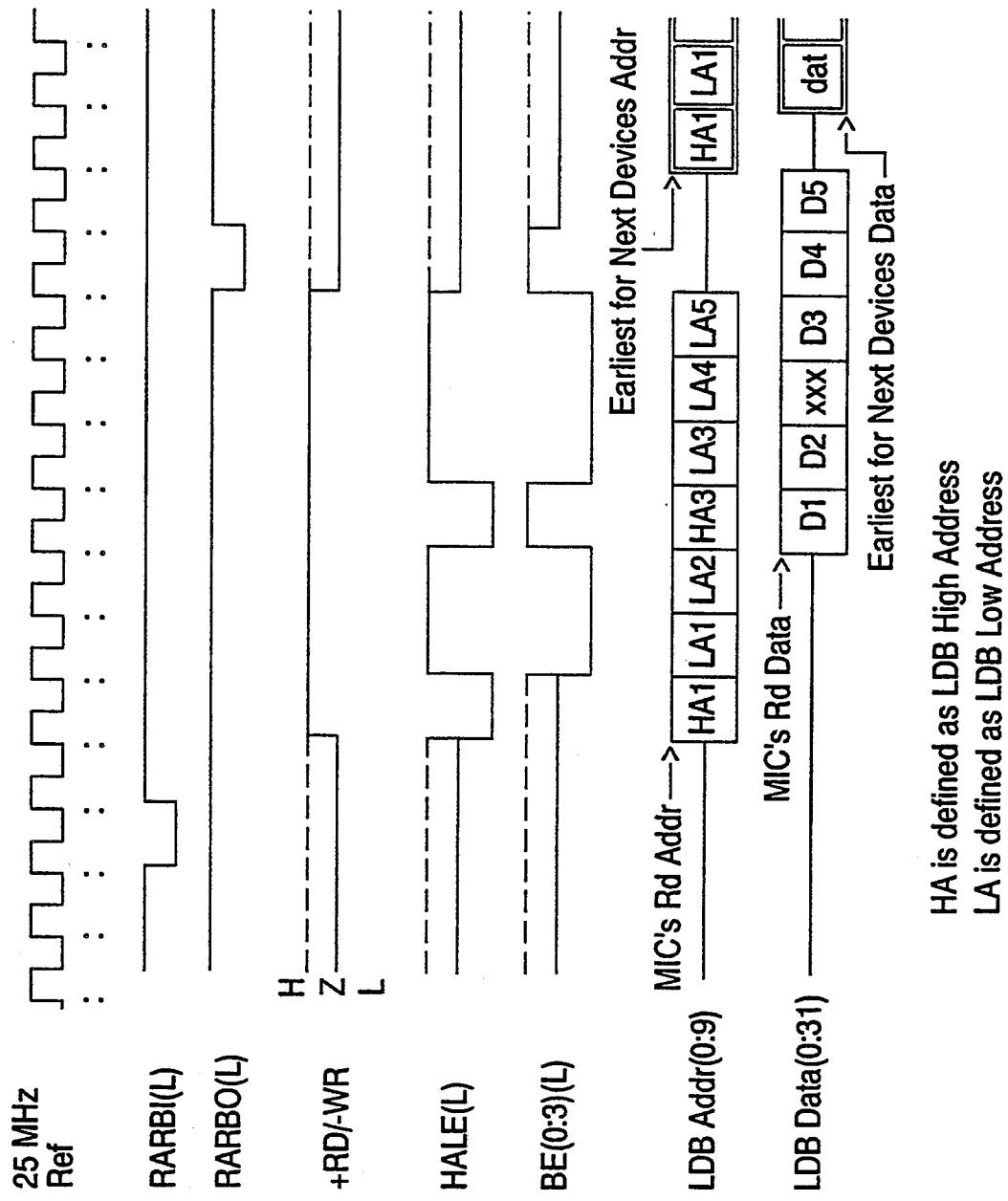
FIG. 18 is a timing diagram of the local data bus depicting a micro channel interface chip read of five words with no wait states.

FIG. 18 shows the MIC timing for LDB write operations. As shown, when MIC 112 performs LDB Writes:

An initial HA will be put out the cycle after the MIC clocks in the token (RARBI(L)=L) when starting an access.

A series of one or more LAs will always follow the cycle after an HA.

One HA may be inserted in between a series of LAs each time the MIC 112 needs to access a different 4KB segment.

The MIC 112 will release the token whenever its Token Hold Timer expires or it no longer needs to access LDS 123.

For writes, the MIC 112 will release the token to the next device (RARBO(L)=L) the cycle it drives its last address.

The MIC 112 will drive HALE(L) and BE(0:3)(L) inactive before tri-stating these signals. This enables a slow pullup to be used on the module to hold these signals inactive.

The LDB master during its ownership can switch from a read to a write access. To switch, the master's write LA must be on the interface at least 4 cycles after the last read LA appears as shown in FIG. 19. This will allow enough time for the read data to be received before the master drives its write data. Also shown in FIG. 19, a new HA was sent before the first write LA. The sending of this new HA is optional but does not cause any added latency since the master needed to wait for the read data to be received.

A master during a single token holding period can follow a write access with a read access. As the write LA and the corresponding write data are on the bus at the same time, the master could put out a read LA in the following cycle. In some alternative LDS memory designs, following a write LA with a read LA may cause the memories and the MSI write register pipeline to both drive momentarily while switching directions. For this reason, the MIC 112 preferably follows a write LA with a new read HA and LA when switching from a read to a write even if the new HA is the same as the old HA. This sending of the new HA will only cost one cycle when the old HA matches the new HA.

FIG. 19 shows the LDB timing when the MIC 112 switches from a read to a write and from a write to a read on LDB bus. When MIC 112 switches from a Read to a Write or Write to a Read on LDB 117:

One HA will always be inserted when the MIC 112 switches the direction of the access even though the new HA may be the same as the previous one.

Before switching from a write to a read, the MIC 112 will check the token hold timer to make sure it has time to reverse the bus. When switching from a read to a write the token hold timer is checked as normal since no added latency is added when switching in this direction.

The MIC 112 will release the token (RARBO(L)=L) based on the last access it performs either a read or a write.

The MIC 112 will always drive HALE(L) and BE(0:3)(L) inactive before tri-stating these signals. This enables a slow pullup to be used on the module to hold these signals inactive.

The LDB bus 117 architecture supports an error line that can be used to notify all the devices on the ring that an error has been detected. This line should be activated when either of two types of error occur: 1) non-recoverable, detected when the LDB Err line is active for at least 2 cycles; 2) recoverable errors, detected when the LDB Err line is active for just 1 cycle.

The MIC 112, when master of the LDB 117 checks for the condition of two tokens being present by determining if a 2nd token is detected once it has captured the original token. Upon detecting this condition, the MIC 112 will activate the LDB_Err line (for at least 2 cycles) until it has put a USW onto the error queue.

The MIC 112 as master of the LDB 117 also has a programmable bit accessible from the LPB 115 which enables or disables the MIC 112 to check recoverable errors. As a master, this programmable bit will cause the MIC 112 to check parity on its write data when the data is in the MIC's boundary register. On reads, the MIC 112 will check parity on the read data it receives along with the state of the error line. If the MIC 112 detects that the LDB ERR line was active on the interface the same cycle the read data was on the interface, an error was detected on the read address that was associated with this read data.

If the MIC 112 has been set up to LDB reads with one wait state, the MIC 112 will detect that an address error has occurred when either the LDB Err line was active in the cycle read data was valid or if in the previous cycle, the LDB_Err line was active. This is possible as the read low address was on the bus for two cycles.

The MIC 112, when not the Bus Master, will be in bus monitor mode when. In this mode, the MIC 112 checks for a lost token condition. This condition, which is detected when the TRT timer expires, will cause the MIC 112 to take down the LDB 117 by activating the LDB_Err line for at least 2 cycles until it puts a USW on the error queue. The MIC 112 uses the same programmable bit used to check recoverable errors as a master. In Table 5, a description of the recoverable errors detected by the MIC 112 when in bus monitor mode and the resulting actions taken are listed.

TABLE 5

| Recoverable errors the MIC checks for as bus monitor (Idle State) | MIC action |
|---|---|
| Read and APE on LA | activate error line for 1 cycle such that it is active 2 cycles after address was on interface put USW on error queue |
| Read and APE on HA | activate error line as described in previous case for each LA that follows HA until a new HA is detected or all BEs are inactive (master finished). put USW on error queue |
| Read and DPE | error line is NOT activated |
| Write and APE on LA or HA | error line is NOT activated put USW on error queue |
| Write and DPE | error line is NOT activated put USW on error queue |
| Read and at least one BE(0:3) active while —HALE active | activate error line for one cycle such that it lines up with first LAs read data |
| Write and at least one BE(0:3) active while —HALE active | error line is NOT activated put USW on error queue |

HA - high address, detected by monitor when HALE is active
LA - low address, detected by monitor when any of —BE(0:3) are active
APE - address parity error
DPE - data parity error The software and programming interfaces to the MIC 112 are listed in Table 6 and 7. Table 6 illustrates bus master operations which can be programmed, controlled and/or performed by the MIC 112. Table 7 illustrates slave operations on the MC 110 and LPB 117 which allow accesses to the programming interfaces of the MIC 112.

TABLE 6

| MIC Operation | Bus Operation | Transfer Path |
|---|---|---|
| Writing LDB Data | MC Mem Write | MC IDB LDB |
| Reading LDB Data | MC Mem Read | LDB IDB MC |
| Writing QRC Reg | MC I/O Write | MC QRC Reg |
| Reading QRC Reg | MC I/O Read | QRC Reg MC |
| Writing QWC Reg | MC I/O Write | MC QWC Reg |
| Reading QWC Reg | MC I/O Read | QWC Reg MC |
| Writing QD Reg | MC I/O Write | MC QWB LPB |
| Reading QD Reg | MC I/O Read | LPB QRB MC |
| Reading FBL | MC I/O Read | FBB MC |
| Reading JP Reg | MC I/O Read | JP Reg MC |
| Writing POS Reg | MC I/O Write | MC POS Reg |
| Reading POS Reg | MC I/O Read | POS Reg MC |
| Reading Cntl Reg | LPB Mem Read | Cntrl Reg LPB |
| Writing Cntl Reg | LPB Mem Write | LPB Cntrl Reg |
| Reading Queue Init | LPB Mem Read | QM LPB |
| Writing Queue Init | LPB Mem Write | LPB QM |
| Reading Queue Cntl | LPB I/O Read | QM LPB |
| Writing Queue Cntl | LPB I/O Write | LPB QM |
| Reading LDB Data | LPB Mem Read | LDB LPB |
| Writing LDB Data | LPB Mem Write | LPB LDB |
| Reading STI/Scan | STI Read | STI Ext Dev |
| Writing STI/Scan | STI Write | Ext Dev STI |

TABLE 7

| MIC Operation | Bus Operation | Transfer Path |
|---|---|---|
| Write Memory Data | MC Mem Write | ODB MC |
| Read Memory Data | MC Mem Read | MC IDB LDB |
| Write I/O Data | MC I/O Write | ODB MC |
| Read I/O Data | MC I/O Read | MC IDB LDB |
| Writing QWC Reg | MC I/O Write | Master Exe MC |
| Reading QWC Reg | MC I/O Read | MC Master Exe |
| Writing QD Reg | MC I/O Write | Master Exe MC |
| FBL Fetch | MC I/O Read | MC Master Exe |
| Write Memory Data | LPB Mem Write | MIC LPB |
| Read Memory Data | LPB Mem Read | LPB MIC |
| Write Memory Data | LDB Write | MIC LDB |

TABLE 7-continued

| MIC Operation | Bus Operation | Transfer Path |
|---|---|---|
| Read Memory Data | LDB Read | LDB MIC |

Commanded Transfers

Commanded transfers are master operations performed on either the MC 110, LPB 115, or LDB 117. This section describes in more detail, operations described in Table 7. The MIC 112 contains sufficient intelligence to control the data transfers without CPU intervention.

MC Commanded Transfer

Figure 21:
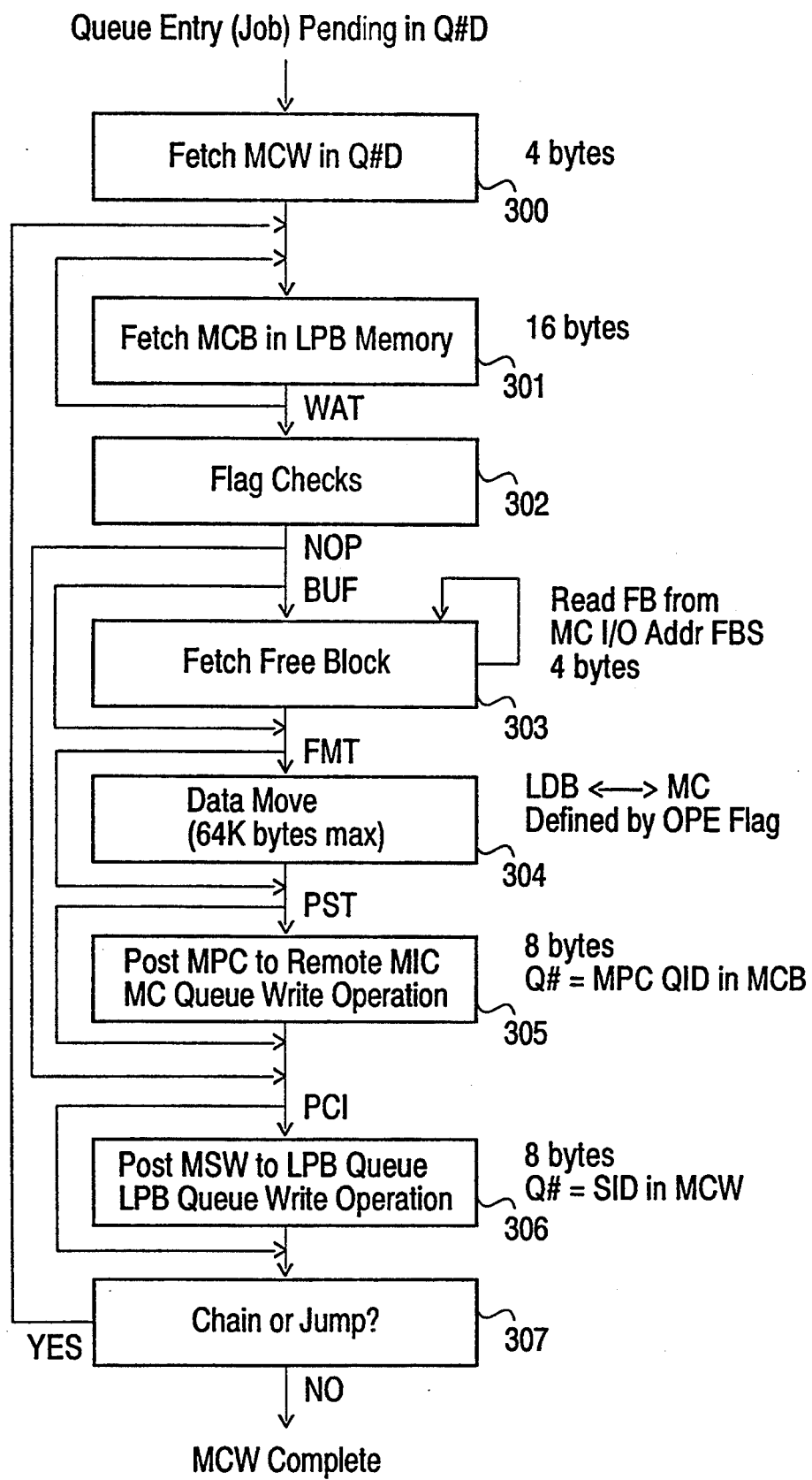
FIG. 21 is a flow diagram of the master execution process.

Commanded Transfers on the MC 110 are initiated via a MIC 112 Command Word (MCW). MCWs are located in one of the Queues which the MIC 112 is managing. Queue #D is defined as the MIC's Command Queue (MCQ) dedicated to MCWs. As shown in FIG. 21, when the MCQ contains an entry, the QM unit within the MIC interrupts the Master Execution unit to fetch a MCW in step 300. The MCW defines the source LPB device step 301 initiating the Commanded Transfer and the LPB Memory Address where the MIC Control Block (MCB) can be found. The MCB defines flags step 302, source address step 303, and target address information step 304 for the Commanded Transfer. Once the Commanded Transfer, defined by the MCB, has been completed, status of the transfer can be posted to a Queue existing on the LPB 115 step 306 and/or to a Queue existing on another MC device step 305. The status posted to a Queue existing on the LPB 115 is called the MIC Status Word (MSW). The MSW defines any errors which may have occurred in step 307 during the Commanded Transfer and the MCB used for the transfer. The status posted to a Queue existing on another MC device is called the Micro Channel Post Command (MPC). The MPC defines the source device, flags, and target address of the transfer.

Figure 22:
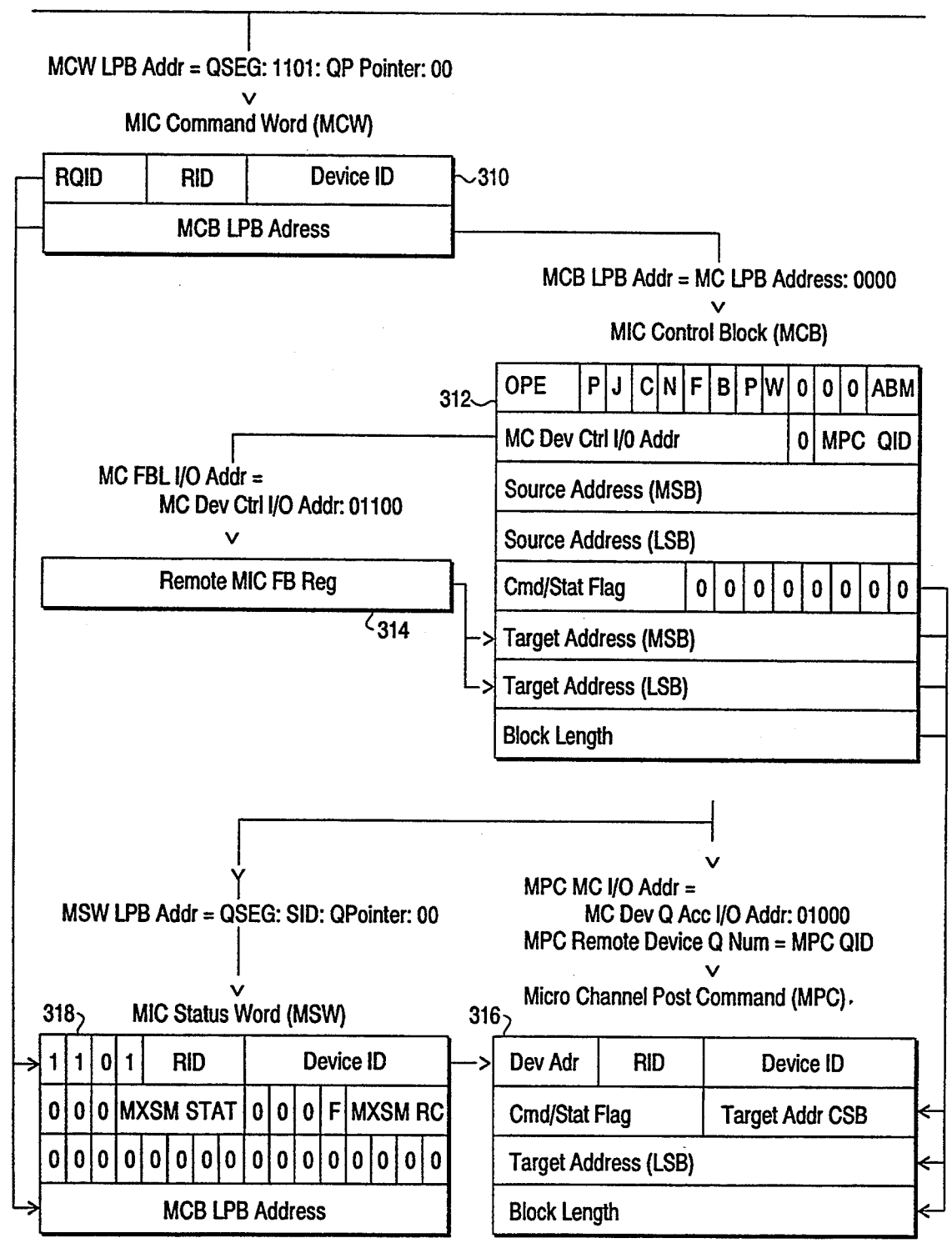
FIG. 22 is a block diagram depicting the relationship between the command word, the control block, the status word and the post command for the micro channel interface chip.

Table 7 illustrates a high level flow diagram of a Master Execution or Commanded Transfer operation described above. Flags, described in more detail in MIC Control Block below, define the direction of the diagram. Commanded Transfers (FIG. 22) illustrates the relationship between the MCW 310, MCB 312, MSW 318, MPC 316 and remote MIC free block register 314 during a MC Commanded Transfer.

MIC Command Word

The MCW consists of four bytes of information which exist in the MCQ. The MCQ is define as Queue #D and can hold up to 1K MCWs. FIG. 23 illustrates the fields within a MCW. The following section describes each field and its function.

MIC Control Block

The MIC 112 supports a fixed length MIC Control Block (MCB) of 16 bytes. The MCB must exist in the LPB Memory Address space defined by the MCW. FIGS. 24 through 27 illustrate the MCB in detail. In general, the execution of the MCB is governed by the flags contained in the first word of the MCB. FIG. 28 illustrates the valid combinations of MCB flags.

MCB Notes

Below lists some notes on utilization of the MCB fields.
1. The Source and Target Address fields MUST be defined on a 4 byte boundary, except when NOP='1' or FMT='1'. A 4 byte boundary means that the least significant two bits of the Source and Target Address fields MUST equal '00'.
2. The Byte Count field MUST be equal to 1, 2, 3, or 4*n, where n=0 to 16K.
3. A byte count value equal to 0, indicates a transfer of 64K bytes.
4. A byte count value MUST be chosen so that the Source and Target Address plus the Byte Count field does not exceed or cross a 64K byte address boundary. Only the lower 16-bits of address are allowed to increment, if a byte count causes the 16-bits of address to produce a ripple carry then the upper bits are not modified and the address will wrap.
5. The MPC QID should not be equal to 'D' if the MC device receiving the MPC is another MIC 112.

MIC Status Word

The MIC 112 has the ability to build status after the completion of a Commanded Transfer. If the PCI bit in the MCB is set or an error occurs during the Command Transfer, the MIC 112 will post the Queue indicated by the MCW RQID field with an eight byte MSW. The receiving Queue must have a byte count defined as eight bytes. The MSW provides a report of any errors which may have occurred during the command operation. If an error occurs during a chained operation then the chain is terminated with status being built indicating the address of the errored MCB. FIG. 29 illustrates the fields of the MSW.

Micro Channel Post Command

The MIC 112 has the ability to build status and Post a MC device after the completion of a Commanded Transfer. If the PST bit in the MCB is set the MIC 112 will post status to a Queue which exists on another MC device. This other MC device may be another MIC 112 or MC device which can receive, understand, and/or translate the MPC message and protocol. The Queue being posted is determined by the MPC QID field in the MCB. The posted status is called the Micro Channel Post Command (MPC). The MPC contains eight bytes of data indicating the source ID, target address, and byte count related to the data which was moved during the Commanded Transfer. FIG. 30 illustrates the MPC and defines its fields.

LPB Commanded Transfers

Commanded Transfer on the LPB 115 can be initiated from the Master Execution unit, the QRB, the QWB, the FBB, or from a reportable error within the MIC 112. The Master Execution unit uses the LPB 115 to fetch MCWs and MCBs, or to post MSWs. The QRB uses the LPB 115 to fetch Queue entries which a MC device is requesting as part of a Queue Read Operation. The QWB uses the LPB 115 to write entries to a Queue loaded from the MC 110 via a Queue Write operation. The FBB uses the LPB 115 to fill FB entries which have been removed by devices on the MC 110. The LPB 115 also allows the MIC 112 to post unsolicited errors to a Queue managed by the MIC 112.

LDB Commanded Transfers

All MIC 112 operations on the LDB 117 are commanded transfers. These transfers can be initiated by the Master Execution unit, the IDB, or the LPB Interface. All operations on the LDB 117 are simple reads and writes. The MIC 112 does not have any programmable registers on the LDB 117.

Device Initiated Transfers

Device initiated transfers are slave operations performed on either the MC 110 or LPB 115. This section describes in more detail, operations described in Table 6.

The MIC 112 allows access from the MC 110 or LPB 115 to the LDB, Queues and Control Registers. These accesses are performed in the Memory or I/O address spaces that exist on the MC 110 and LPB 115. The MIC 112 decodes the MC 110 or LPB address and performs the slave operation related to the selected address.

LDB Access

The MIC 112 supports direct access to the LDB 117 from either the MC 110 or the LPB 115. In both cases, the MIC 112 allows access to the LDB 117 by monitoring the MC 110 and/or LPB 115 for addresses which are within a predefined range. For simplicity, figures which illustrate a LDB address indicate a full byte address. The MIC 112 does not implement byte addressability in this way. Instead, the lower two address bits are not driven and are replaced by using four byte enables, BE(0:3), to allow for full byte addressability during LDB 117 accesses. Since the MIC 112 only allows up to 10-bits of the LDB address to be driven at once, the LDB address is split or multiplexed into two parts; a high address and a low address. The high address contains the upper 8-bits of the full LDB address. The low address contains the next 10-bits of address. The byte enables, BE(0:3), provide the remaining byte controls necessary for a complete 1M byte LDB address.

Access from MC

For the MC 110 to access LDB 117, a predefined address range is assigned within the MC Memory space. This range of addresses is defined by a base address plus an offset. The LDB MC base address is defined by the LDB MC Memory Base Address register. The LDB MC Memory Base Address register can be found in POS 3 and 4 Sub-Address '0101'. The LDB MC Memory Base Address together with an offset allow any MC device direct memory access to the LDB memory space. The amount of memory space accessible from the MC 110 is determined by the LDB Size field in POS Reg 3 Sub−Address '0000'. The LDB Size field limits the offset the MIC 112 will decode. LDB memory space can be defined as 128K, 256K, 512K, or 1M bytes. See "MIC Programmable Option Select (POS) Registers" for more details about the LDB MC Memory Base Address registers and LDB Size fields. FIG. 31 illustrates the MC Memory map for LDB 117 accesses and the byte address relationship between the MC 110 and LDB 117. Note: The MC +M/−IO signal must be equal to '1' for LDB 117 accesses.

LDB Access from LPB

Figure 32:
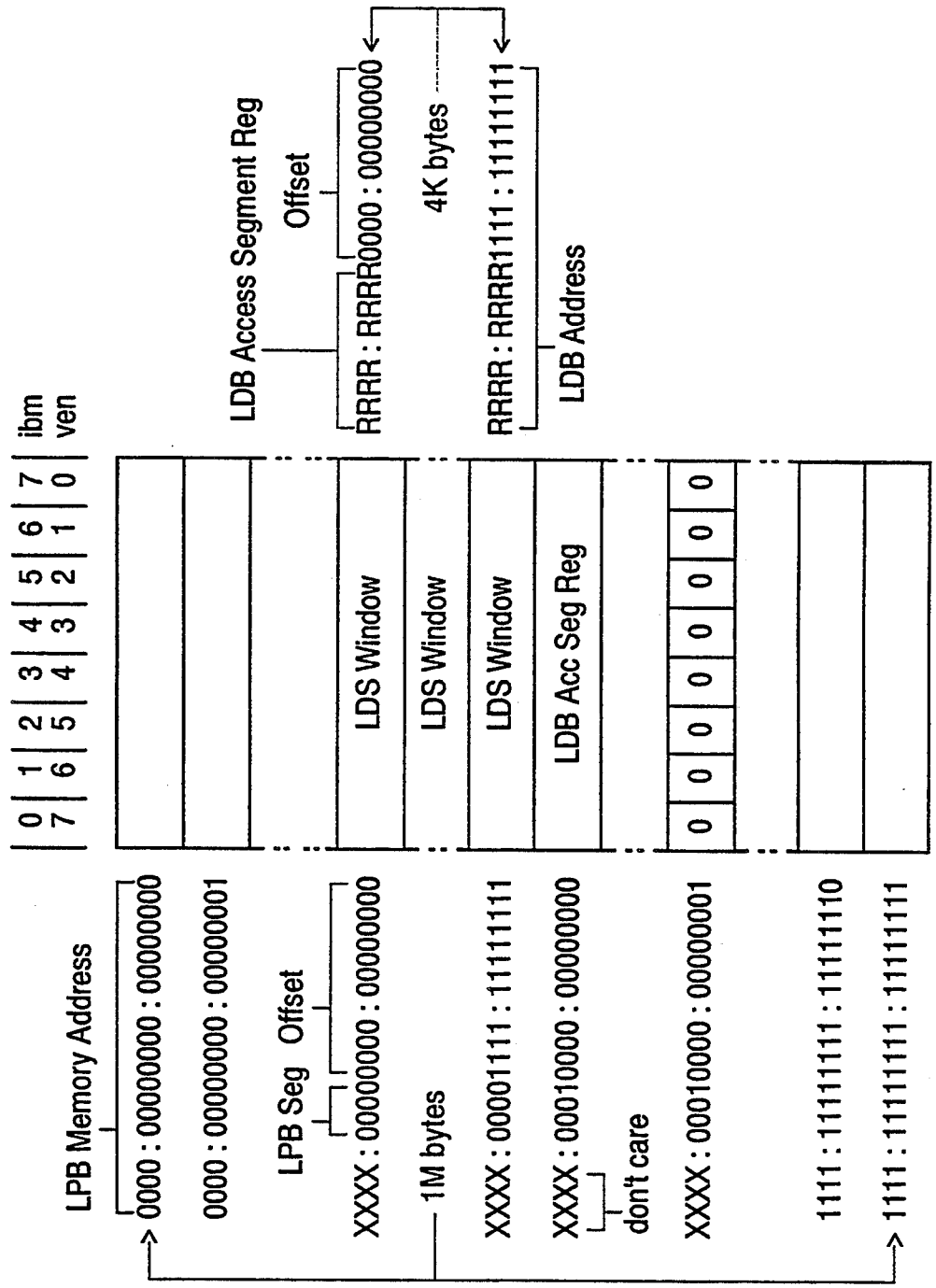
FIG. 32 depicts the local processor bus to local data bus access memory map.

For the LPB 115, accessing the LDB 117 requires a paging type method. The paging method requires the LPB device to load a segment register which defines one of 256 4K byte windows within LDB 117 to be accessed. The LPB 115 to LDB Access Segment Register is defined at LPB Memory Address, 'X1000'. Once the segment has been initialized, an offset address within the LPB Memory Address space 'X0000' through 'XOFFF' defines a point within the 4K window. FIG. 32 illustrates the LPB Memory map for LDB Accesses and the byte address relationship between the LPB 115 and LDB 117.

Queues

The MIC 112 provides hardware support for managing 16 4K byte Queues stored within a 64K byte segment of LPS. MIC Queue management includes maintenance of the Queue Read and Queue Write Pointers, Queue status, Queue Entry size, and assigned interrupt levels for each enabled Queue. All Queue maintenance information and control is contained within the MIC's Queue Manager (QM). Access to this Queue maintenance information can be achieved in two different ways; direct or controlled. Access to the Queue themselves can be achieved from either the LPB 115 or MC 110.

Direct QM Access

Direct access to all Queue maintenance information is achieved only from the LPB Memory space. Direct access allows the LP to initialize and manipulate the Queue maintenance information. Each of the 16 Queues requires a 4 byte register, within the MIC 112, to hold the Queue maintenance information. These registers are called the Queue Initialization Registers (QIR). The LPB address location of the QIRs is determined by the following;

QIR LPB Memory Address=XXXX;QIR Segment;Queue Number;QIR Byte where XXXX=don't care. See note.
  where QIR Segment='0001000100'
  where Queue Number='0000' through '1111'
  where QIR Byte='00' through '11'

Figure 33:
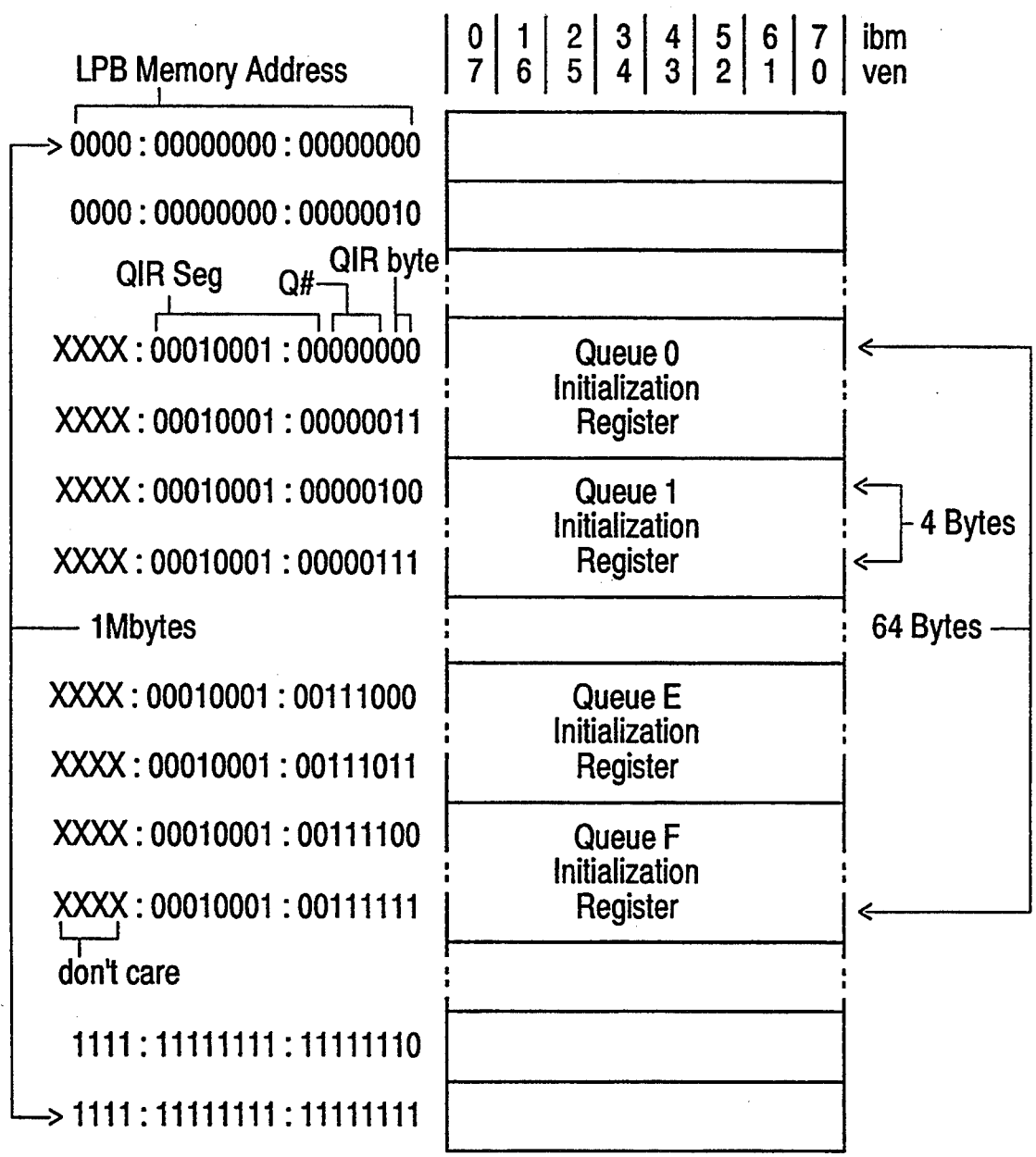
FIG. 33 depicts the local processor bus memory map showing the queue initialization registers.

FIG. 33 illustrates the relative LPB memory location of the QIRs, accessible via a direct access. FIG. 34 illustrates and describes in detail the 4-byte generic layout the QIR accessible via a direct access.

Controlled QM Access

Figure 35:
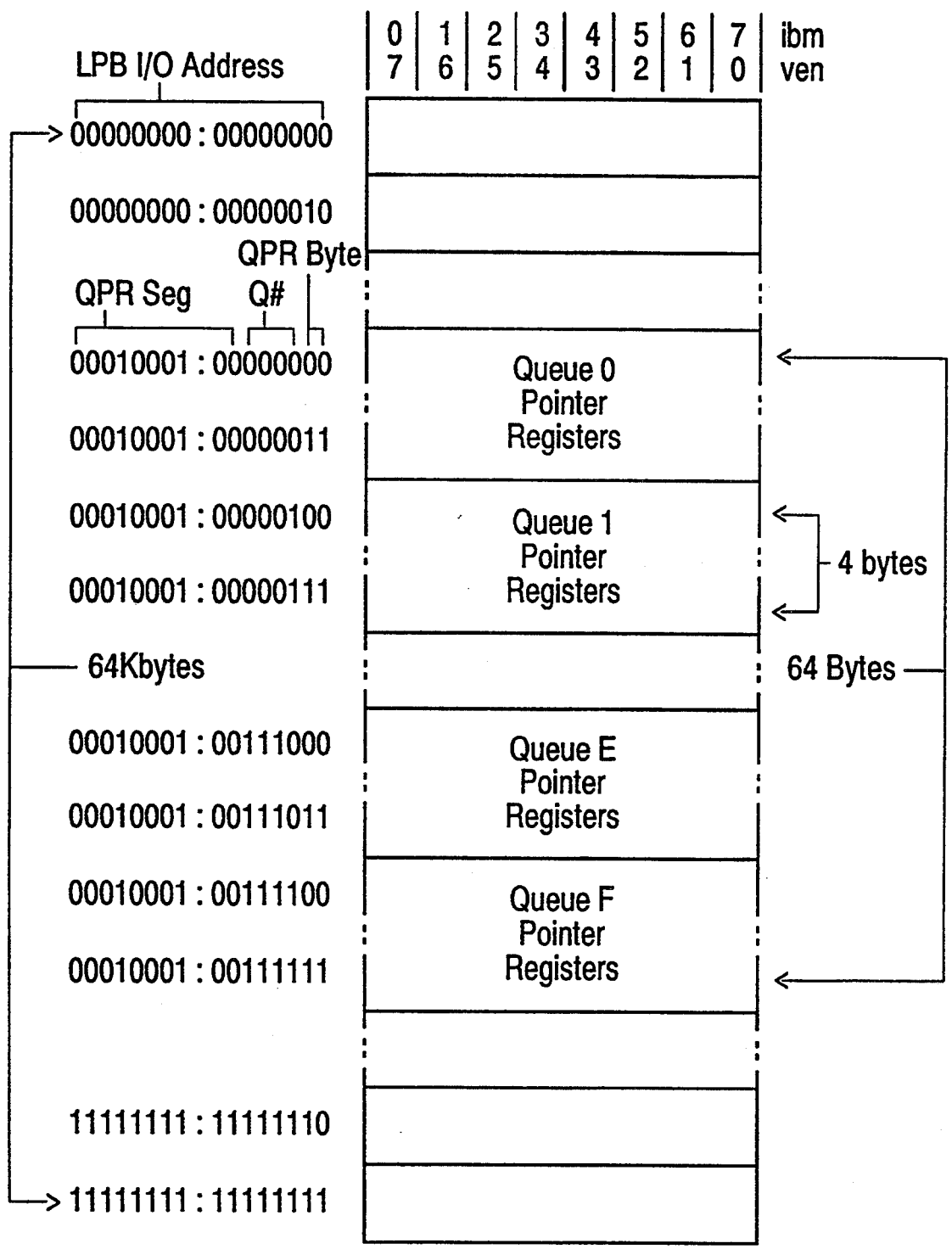
FIG. 35 depicts the local processor bus I/O map showing the queue pointer registers.

Controlled access to Queue maintenance information is achieved only from the LPB I/O space. Controlled access is used during operational modes to allow any LPB device access to some of the Queue maintenance information contained within the QIR. With this data a LPB device can determine the location and status of any Queue or current active Queue entry and can add or remove a Queue entry from any Queue. In addition, the MIC 112 uses a controlled access to update Queue maintenance information, such as pointer and interrupt status. The Queue maintenance information accessible via a controlled access is a subset of the same information available in the QIR. This subset of information is contained within two 2 byte registers called the Queue Pointer Registers (QPR). The LPB device only needs to access one of these 2 byte registers depend on whether a Queue entry is to be added or removed from a Queue. FIG. 35 illustrates the relative LPB I/O space location of the QPR available to any LPB device via a controlled access. FIG. 36 illustrates the generic layout of one of the QPR available via a controlled access.

Queue Access from the LPB

Figure 37:
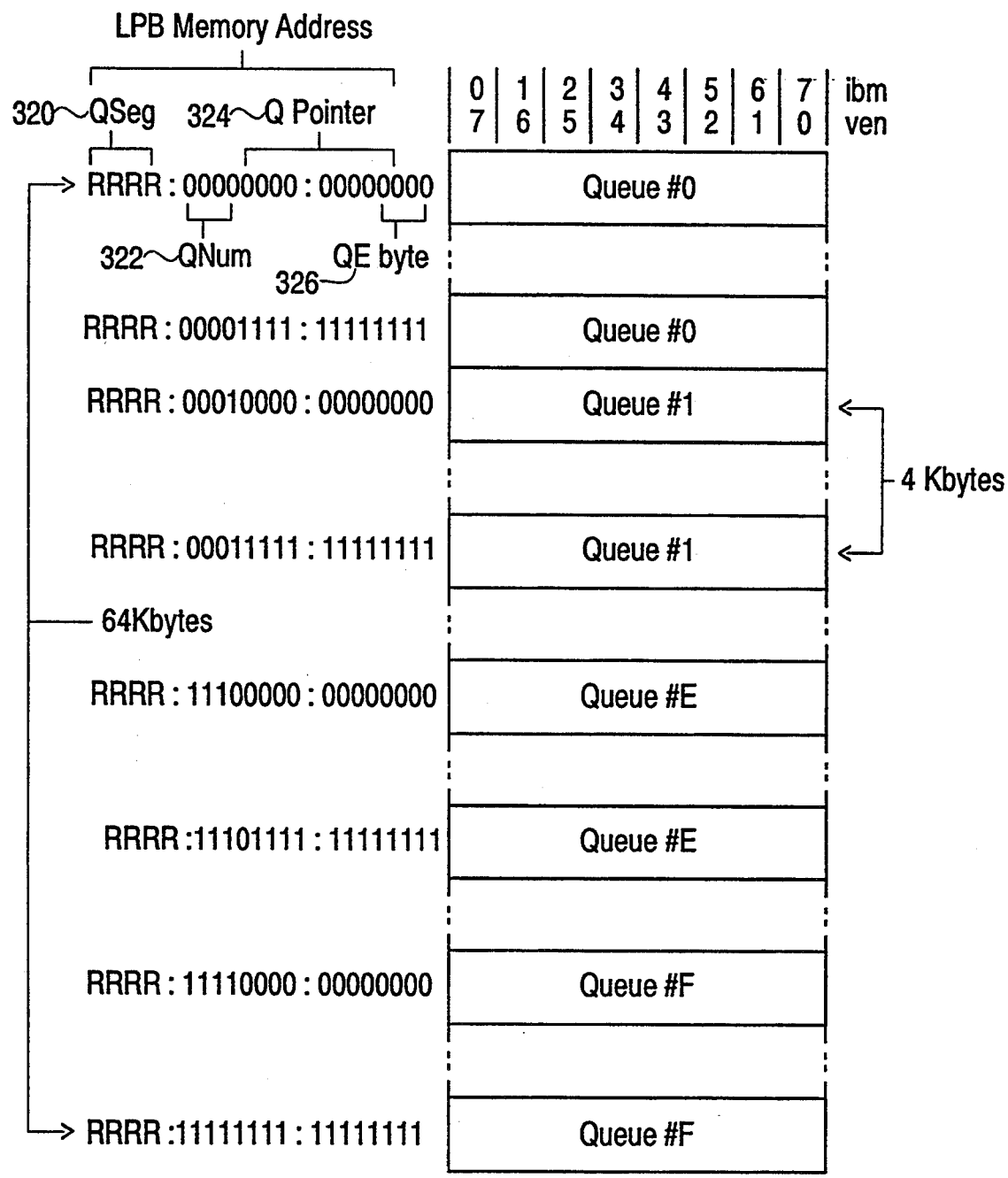
FIG. 37 depicts the relative addresses of queues within the local process bus.

From the LPB 115, the Queues within the LPB Memory space can be indirectly accessed by using the QPR within the LPB I/O space. A LPB device directly accesses the Queues by obtaining one of the two Queue Pointers from the MIC 112 for the requested Queue. The QRP is read from the MIC 112 if a Queue Entry is to be removed from a Queue. The QWP is read from the MIC 112 if a Queue Entry is to be added to a Queue. The Queue Pointers contain part of the physical LPB Memory address of the Queue to be accessed. The remaining part of the physical address can be obtained from the Queue number and from a LPB Queue Segment. FIG. 37 illustrates the Queues and their relative address within LPS and the LPB Memory address. The LPB memory address is composed of Q Seg 320, Q Num 322, Q Pointer 324 and QE byte 326 which forms a 20-bit word. The two least significant bits are used as the status bits.

LPB Queue Access Protocols

Figure 38:
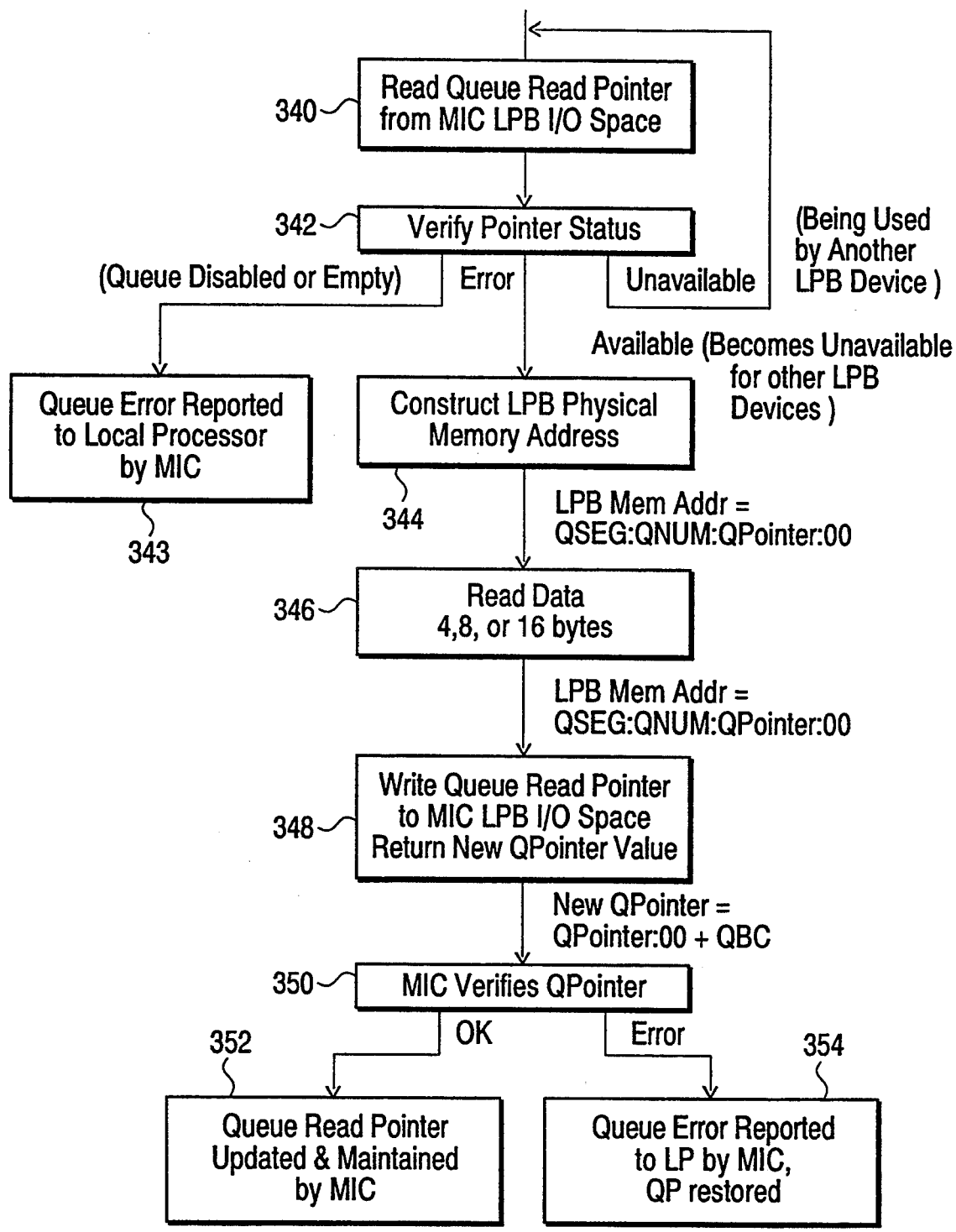
FIG. 38 is a flow diagram of the local processor bus queue read operation protocol flow.
Figure 39:
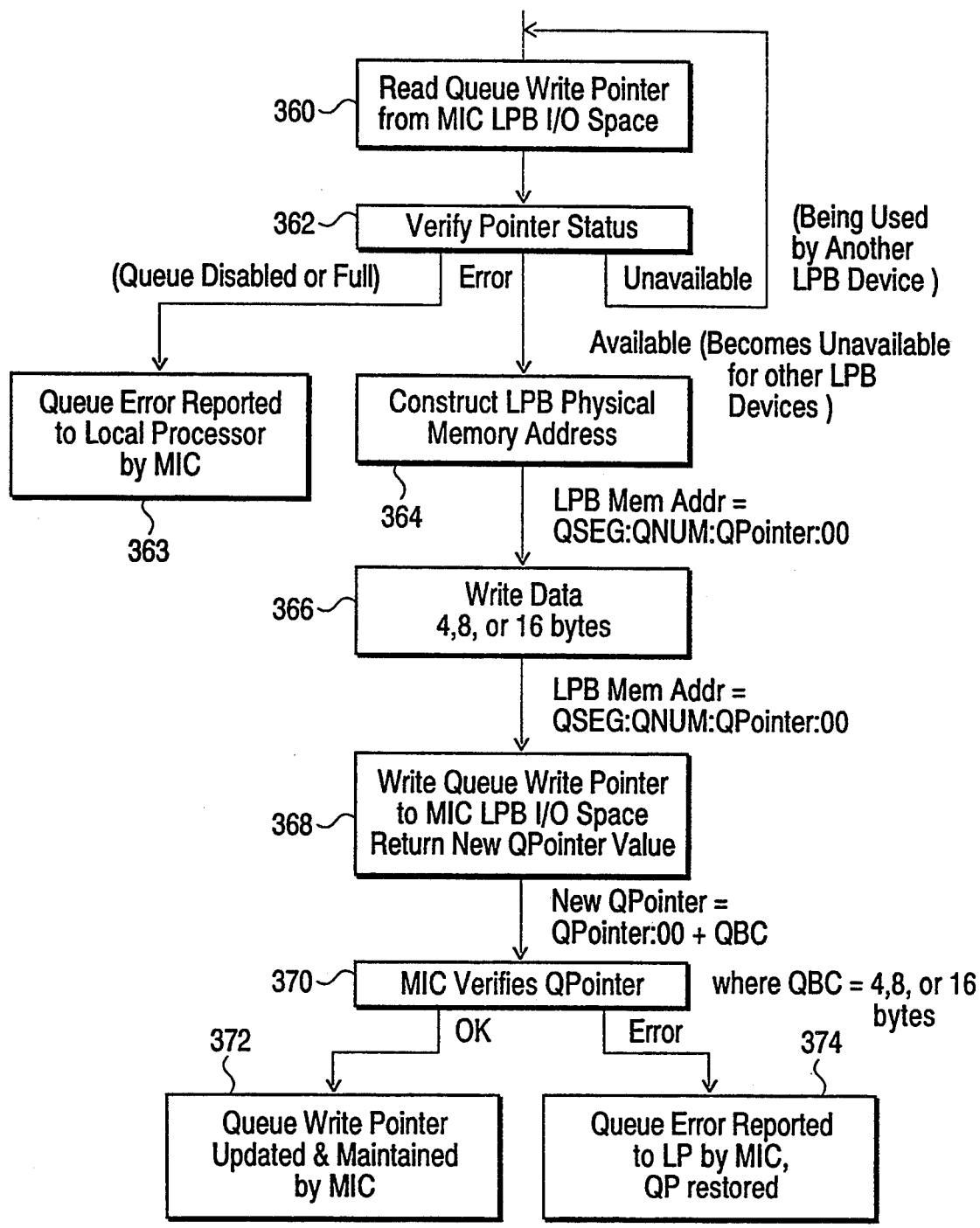
FIG. 39 is a flow diagram of the local processor bus queue write operation protocol flow.

FIGS. 38 and 39 describe the control protocol flows for a LPB Queue Read and Queue Write accesses. These flows illustrate the steps required by all LPB devices which utilize the MIC Queue management support. Also, the MIC 112 being a LPB device as well, is designed to implement these required steps to access a Queue.

A queue read operation is shown in FIG. 38 where a read queue pointer is received from the MIC LPB I/O space at the first step in start of a read operation as depicted by block 340. The next step shown by block 342 is to verify the pointer status. The pointer status is determined by looking at the two least significant bits of LPB memory address. If an error is indicated, the queue error is reported to the local processor by the MIC 343. If the queue is not available, that it is being used by another LPB device, a retry is instigated. If the queue is available, the LPB physical memory address is constructed as shown by block 344. The LPB memory address is equal to the queue segment concatenated with the queue pointer followed by the status bits. Once the address is known, the data is read either in increments of 4, 8 or 16 bytes depending upon how the queue was initially set up. Once the data is read, a new read pointer is written to the MIC 112 in block 348 and the new queue pointer value is returned. The MIC 112 verifies the queue pointer with a CPU reading to see if the queue read pointer is okay, as shown in block 352 where the queue read pointer is updated and maintained by the MIC 112. If an error is determined as shown in block 354, the queue error is reported to the local processor by the MIC 112 and the queue pointer is restored to its original value.

In a like manner, a queue write is performed as shown in FIG. 39 wherein the queue write pointer is read from the MIC local processor bus as depicted by block 360. Checking the status bits verifies that the pointer is available as shown in block 362. When an error is detected, a queue error report is sent to a local processor by the MIC 112 as depicted by step 363. Once the queue is available, the LPB physical memory address is constructed in step 364. The memory address is equal to the queue segment plus the queue number plus the queue pointer concatenated with the status bits. The data is written as within LPS and the LPB Memory address. The LPB memory address is composed of Q Seg 320, Q Num 322, Q Pointer 324 and QE byte 326 which forms a 20-bit word. The two least significant bits are used as the status bits.

LPB Queue Access Protocols

FIGS. 38 and 39 describe the control protocol flows for a LPB Queue Read and Queue Write accesses. These flows illustrate the steps required by all LPB devices which utilize the MIC Queue management support. Also, the MIC 112, being a LPB device as well, is designed to implement these required steps to access a Queue.

A queue read operation is shown in FIG. 38 where a read queue pointer is received from the MCI LPB I/O space at the first step in start of a read operation as depicted by block 340. The next step shown by block 342 is to verify the pointer status. The pointer status is determined by looking at the two least significant bits of LPB memory address. If an error is indicated, the queue error is reported to the local processor by the MIC 343. If the queue is not available, that is being used by another LPB device, a retry is instigated. If the queue is available, the LPB physical memory address is constructed as shown by block 344. The LPB memory address is equal to the queue segment concatenated with the queue pointer followed by the status bits. Once the address is known, the data is read either in increments of 4, 8 or 16 bytes depending upon how the queue was initially set up. Once the data is read, a new read pointer is written to the MIC 112 in block 348 and the new queue pointer value is returned. The MIC 112 verifies the queue pointer with a CPU reading to see if the queue read pointer is okay, as shown in block 352 where the queue read pointer is updated and maintained by the MIC 112. If an error is determined as shown in block 354, the queue error is reported to the local processor by the MIC 112 and the queue pointer is restored to its original value.

In a like manner, a queue write is performed as shown in FIG. 39 wherein the queue write pointer is read from the MIC 112 local processor bus as depicted by block 360. Checking the status bits verifies that the pointer is available as shown in block 362. When an error is detected, a queue error report is sent to a local processor by the MIC 112 as depicted by step 363. Once the queue is available, the LPB physical memory address is constructed in step 364. The memory address is equal to the queue segment plus the queue number plus the queue pointer concatenated with the status bits. The data is written as minimizes access latency for other shared memory bus users since the queue data entry transfers are performed with indivisible interruptible memory operations. Contrastly, a purely hardware solution performs queue entry data transfers with indivisible memory operations increasing the memory access latency for other bus users.

The present invention has the following advantages over a totally software managed queue structure in that the queue pointer manager increases performance per queue operations because it eliminates the need for software to update and verify the queue write and queue read pointers. It also eliminates the need for software for determining queue overflow, underflow and other error conditions. It eliminates the need for software to set/clear queue interrupts. These three functions are the most critical with respect to degradation of performance within a queue manager. Additionally, the queue pointer manager alleviates internal CPU or external memory resource usage since the present invention uses hardware to provide the necessary pointer array. Very little software code storage is needed, thereby reducing the pointer processing overhead. The queue pointer manager provides a built-in public queue capability where a given queue may be written or read by more than one processing entity. A public queue capability in a pure software solution requires a pointer array to be resident in a shared memory with a test and set function so that pointers can be accessed by multiple users in noninterfering fashion. This requires significant software processing and decreases queue operation performance.

Queue Access from the MC

Figure 40:
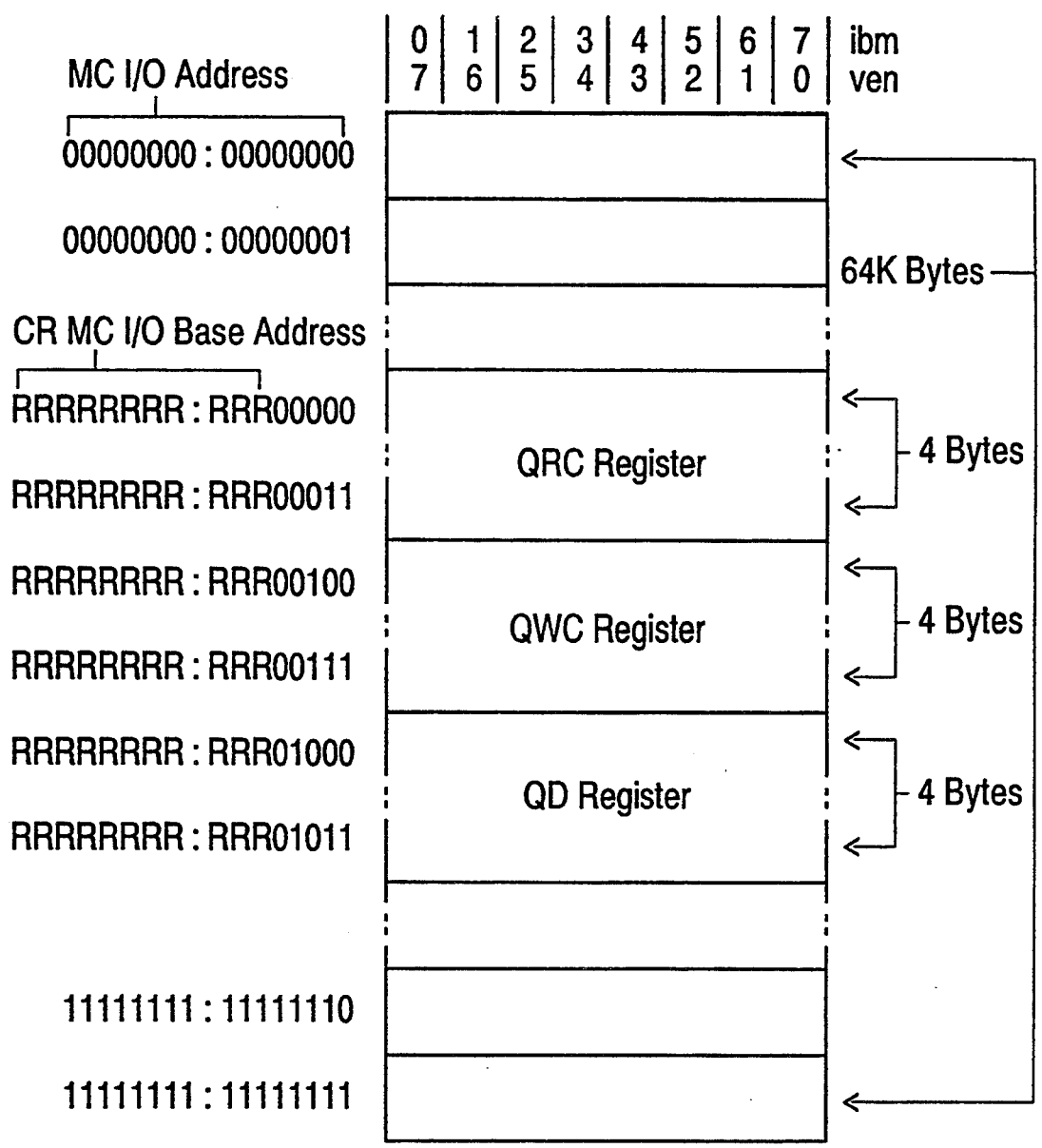
FIG. 40 depicts the queue read control register, the queue write control register and the queue data register mapped against their micro channel I/O addresses.

All MC devices, as well as the MIC 112 have access to the Queues which reside in LPS 123. For the MC 110, Queues are accessed indirectly via two control registers and a data register which reside within the MC I/O Address space. These registers are defined beginning at the address specified in the Control Register MC I/O Base Address. See "MIC Programmable Option Select (POS) Registers" for more details about the Control Register MC I/O Base Address register. The two control registers are defined as a Queue Read Control (QRC) Register and a Queue Write Control (QWC) Register. The data register is defined as the Queue Data (QD) Register. FIG. 40 illustrates these registers in the MC I/O Address space.

Queue Read Control Register

The QRC register is used to inform the MIC 112 which Queue a MC device wishes to read. The QRC register also informs the MC device of the current status of the Queue Read request and the status of the Queue Read Buffer (QRB). The QRB is used to buffer the data received from the requested queue in LPS. FIG. 41 illustrates the QRC Register in more detail and defines the QRC Register fields.

Queue Write Control Register

The QWC register is used to inform the MIC 112 which Queue a MC device wishes to write, as well as the Queue byte count. The QWC register is also used to indicate status of the Queue Write Buffer (QWB). The QWB is used to hold the data received from the MC 110 destined for the requested Queue in LPS. FIG. 42 illustrates the QWC Register in more detail and defines the QWC Register fields.

Queue Data Register

The QD register is used to access the QRB and the QWB. When the QD register is read, data from the QRB is be removed. When the QD register is written, data from the MC 110 is added to the QWB. The Queue Data Register is defined at MC I/O Address starting at MIC CR MC I/O Base Address +'01000' and ending at MIC CR MC I/O Base Address +'01011'. Byte Counts of 4, 8, or 16 bytes are valid for the QD Register. Since the actual I/O Address space is only four bytes, writing and/or reading of eight or 16 bytes in the MC Basic Transfer mode can be accomplished by performing two or four 4 byte transfers. The use of the MC Streaming Data mode can accomplish this task in one transfer operation.

MC Queue Access Protocol

Figure 43:
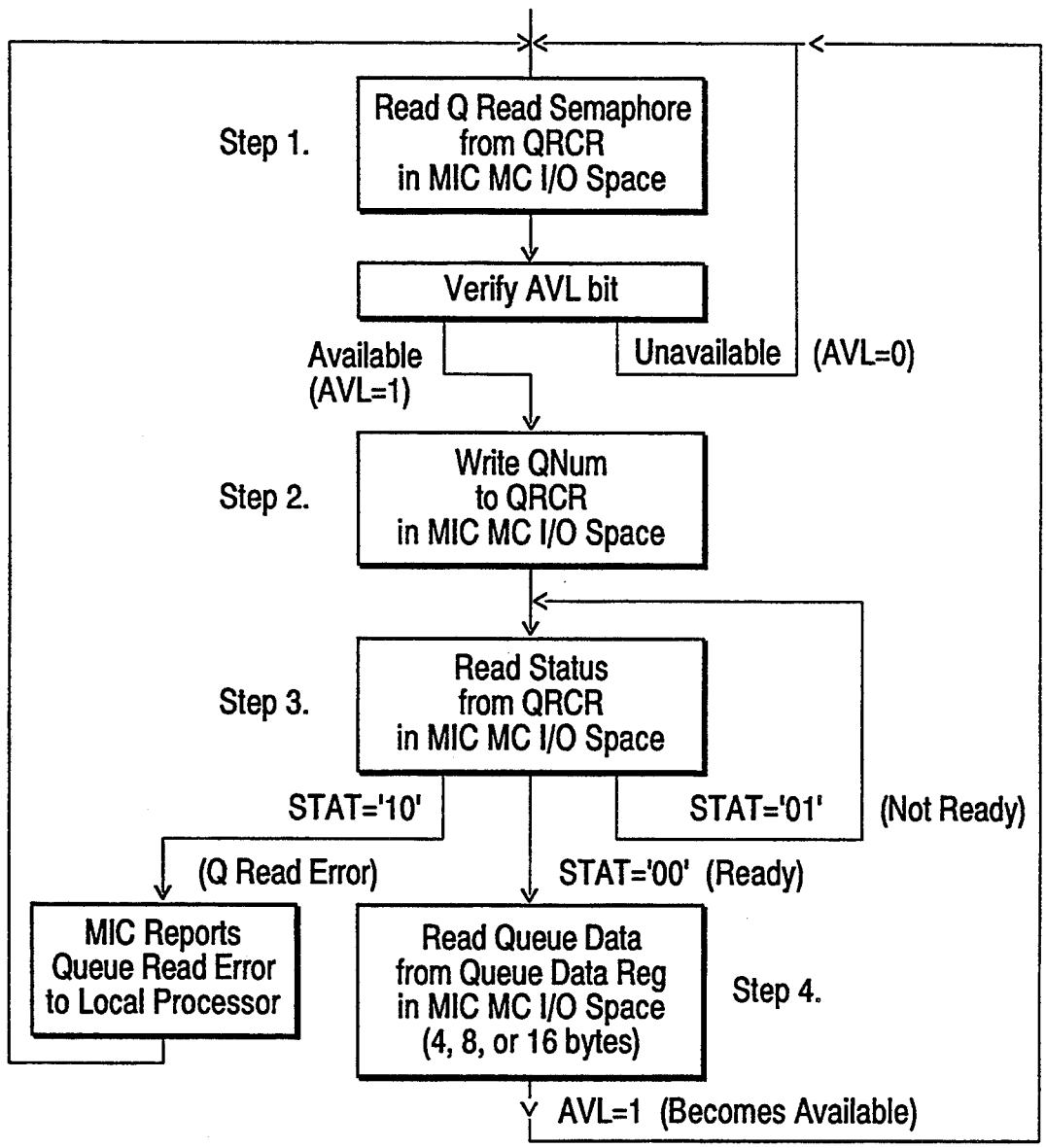
FIG. 43 is a flow diagram of the micro channel queue read operation protocol flow.

FIGS. 43 and 44 describe the control protocol flows for a MC Queue Read and Queue Write accesses. These flows illustrate the basic steps required by all MC devices which utilize the MIC Queue management support. The MIC 112 being, a MC device as well, is designed to implement these required steps to access a Queue when performing a MPC post operation.

MC/Queue Access Procedures and Restrictions

This section describes in more detail the MC Queue Access procedure. In addition, variations to the basic steps in performing a MC Queue Access are described as well as specific notes.

MC Queue Read Operation Protocol, Method "A"

Below, describes the recommended Queue Read procedure for all systems.

Step 1. RD QRCR.
   If AVL='0' then goto Step 1.
   If AVL='1' then the MIC automatically sets AVL='0' AND
   (goto Step 2, to continue OR goto Step 5, to cancel)

Step 2. WR QRCR (Q#='Valid Queue Number', STAT='XX', ACK='0', AVL='X')
   MIC automatically begins fetching Queue Data AND (goto Step 3, to continue OR goto Step 5, to cancel)

Step 3. RD QRCR
   If STAT='00' (Queue Read Data Ready) then (goto Step 4, to continue OR goto Step 5, to cancel)

If STAT='01' (Queue Read Data Not Ready) then (goto Step 3, to continue OR goto Step 5, to cancel)

If STAT='10' (Queue Read Error) then goto Step 5, to cancel

Note: STAT='11' is not possible.

Step 4. RD QDR (Data is read from the Q indicated by the Q# in the QRCR)

When all required bytes have been read then the MIC will automatically set AVL='1' AND goto Step 1. OR If all bytes have not been read then (goto Step 4, to continue OR goto Step 5, to cancel).

Step 5. WR QRCR (Q#='X',STAT='XX',ACK='1-',AVL='X') then AVL='1' AND goto Step 1.

Note: When STAT='00', the MIC will allow the MC Master to read the requested Queue data WITHOUT inserting a NOT READY condition on the Micro Channel.

Note: The MC Master should never read more bytes than is indicated for the Queue being read. Exceeding the indicated byte count will cause an USW and/or a NOT READY condition on the Micro Channel.

MC Queue Read Operation Protocol, Method "B"

Below, describes the recommended procedure for completing a Queue Read in systems which only allow ONE bus master to perform a Queue Read operation.

Step 2. WR QRCR (Q#='Valid Queue Number', STAT='XX',ACK='0',AVL='X')

MIC automatically begins fetching Queue Data AND (goto Step 3, to continue OR goto Step 5, to cancel)

Step 3. RD QRCR

If STAT='00' (Queue Read Data Ready) then (goto Step 4, to continue OR goto Step 5, to cancel)

If STAT='01' (Queue Read Data Not Ready) then (goto Step 3, to continue OR goto Step 5, to cancel)

If STAT='10' (Queue Read Error) then goto Step 5, to cancel

Note: STAT='11' is not possible.

Step 4. RD QDR (Data is read from the Q indicated by the Q# in the QRCR)

When all required bytes have been read then the MIC will automatically set AVL='1' AND goto Step 2. OR If all bytes have not been read then (goto Step 4, to continue OR goto Step 5, to cancel).

Step 5. WR QRCR (Q#='X',STAT='XX',ACK='1-',AVL='X') then AVL='1' AND goto Step 2.

MC Queue Read Operation Protocol, Method "C"

Below, describes the procedure for completing a Queue Read without the use of the Queue Read semaphore or status flags.

Note: Method "C" is not the recommended procedure for Queue Reads. This method should NOT be used if one of the following is true;

1. The system contains multiple masters which can perform Queue Read operations.
2. The system Micro Channel NOT READY timeout of 3.5 usec must not be violated.
3. The system can not recover from a Micro Channel NOT READY timeout error without severe implications.
4. The system/adapter can not mask out the USW which occurred due to error condition "d" described in the next section.

Note: Estimating the NOT READY time when using Method "C" can only be determined by a detailed analysis of the MIC, adapter, and system hardware and software environments. If any of this information is unavailable or indeterminate then Method "C" is not recommended.

Step 2. WR QRCR (Q#='Valid Queue Number', STAT='XX',ACK='0',AVL='X')

MIC automatically begins fetching Queue Data AND (goto Step 4, to continue OR goto Step 5, to cancel)

Step 4. RD QDR (Data is read from the Q indicated by the Q# in the QRCR)

When all required bytes have been read, goto Step 2 OR

If all bytes have not been read then (goto Step 4, to continue OR goto Step 5, to cancel).

Step 5. WR QRCR (Q#='X',STAT='XX',ACK='1-',AVL='X') then AVL='1' AND goto Step 2.

MC Queue Read Operation Error Conditions/Cautions

The MIC 112 will generate a USW if one of the following conditions occur;

1. Step 2 is performed anytime after the completion of Step 2 and before the completion of either Step 4 OR Step 5.

Note: The QRCR does not get updated if this error occurs.

2. The number of bytes read in Step 4 are greater than the number of byte fetched for the Queue.
3. Step 4 is performed before Step 2.
4. Step 4 is performed when STAT='01' OR STAT='10'.
5. Step 5 is performed anytime after Step 2, except when STAT='10'.

Note: The MIC does NOT generate a Channel Check condition if one of the above errors occurs. Instead, posting the USW to the Error Queue causes a LPB Interrupt to become active. It is then up to the adapter and/or system to determine the error recovery procedure.

Note: Performing Step 4 before Step 2 WILL cause a NOT READY condition on the Micro 'Channel, which can only be cleared by the master aborting the cycle. This may cause either a Micro Channel Timeout or Channel Check condition.

Note: Performing Step 4 after Step 2 without completing Step 3 may cause a NOT READY condition, (STAT='01'), on the Micro Channel, followed by one of the following conditions to occur;

a) Step 4 will complete normally, if STAT='00'. OR
b) the NOT READY condition will continue, if STAT='10', until cleared by the master aborting the cycle. This may cause either a Micro Channel Timeout or Channel Check condition.

Note: Method "A", Method "B", and Method "C" should NOT be used together in a system.

Note: See the Queue Error Register defined on the LPB 115 for additional errors which may be reported. Errors which cause STAT='10' are defined in the Queue Error Register.

Queue Write Operation Protocol, Method "A"

Below, describes the recommended Queue Write Procedure for all systems.

Step 1. RD QWCR

If AVL='0' then goto Step 1.

If AVL='1' then the MIC will automatically set AVL='0' AND (goto Step 2, to continue and modify the QWCR OR goto Step 3, to continue and do not modify the QWCR OR goto Step 4, to cancel).

Step 2. WR QWCR (Q#='Valid Q#',QBC='Valid Q Byte Count, ACK='0',AVL='X')

Goto Step 3, to continue OR goto Step 4, to cancel.

Step 3. WR QDR (Data is written to the Q indicated by the Q# in the QWCR with the number of bytes indicated by the QBC in the QWCR)

When all valid bytes have been written then the MIC automatically sets AVL='1' when space becomes available for another QW operation AND goto Step 1. OR If all valid bytes have not been written then (goto Step 3, to continue OR goto Step 4, to cancel).

Step 4. WR QWCR (Q#='X'QBC='X',ACK='1-',AVL='X') then the MIC automatically ends the Q operation and sets AVL='1' when space becomes available for another QW operation AND goto Step 1.

Note: AVL='1' indicates that the MIC 112 is capable of performing either a 4, 8, or 16 byte Queue Write operation WITHOUT inserting a NOT READY condition on the Micro Channel.

Note: When Method "A" is used, a MC Master should never write more bytes than is indicated by the QBC field in the QWCR. Exceeding the indicated byte count may cause an USW and/or a NOT READY condition on the Micro Channel.

MC Queue Write Operation Protocol, Method "B"

Below, describes the procedure for completing a Queue Write without the use of the Queue Write semaphore.

Note: Method "B" is not the recommended procedure for Queue Writes. This method should NOT be used if one of the following is true;
1. The system contains multiple masters which can perform Queue Write operations.
2. The system Micro Channel NOT READY timeout of 3.5 usec must not be violated.
3. The system can not recover from a Micro Channel NOT READY timeout error without severe implications.

Note: Estimating the NOT READY time when using Method "B" can only be determined by a detailed analysis of the MIC 112, adapter, and system hardware and software environments. If any of this information is unavailable or indeterminate then Method "B" is not recommended.

Step 0. If the QWCR needs modification then goto Step 2 OR

If the QWCR does not need modification then goto Step 3.

Step 2. WR QWCR (Q#='Valid Q#',QBC='Valid Q Byte Count, ACK='0',AVL='X')

Goto Step 3, continue OR goto Step 4, to cancel.

Step 3. WR QDR (Data is written to the Q indicated by the Q# in the QWCR)

When all valid bytes have been written then goto Step 0 OR

If all valid bytes have not been written then (goto Step 3, to continue OR goto Step 4, to cancel).

Step 4. WR QWCR (Q#='X',QBC='X',ACK='1-',AVL='X') then the MIC automatically ends the current Q operation AND goto Step 0.

Queue Write Operation Error Conditions/Cautions

The MIC 112 will generate a USW if one of the following conditions occur;

1. Step 2 is performed anytime (after the completion of Step 2, or after the start of Step 3) AND (before the completion of either Step 3 or Step 4).

Note: The QWCR does not get updated if this error occurs.

2. The number of bytes written in Step 3 is greater than the QBC AND Step 1 was performed before Step 3.

Note: This error is only valid for method "A" and may not occur if performed in the MC Basic Transfer mode.

3. The Queue Write Buffer experienced a Queue overflow condition.

Note: This error should not be possible.

Note: The MIC 112 does NOT generate a Channel Check condition if one of the above errors occurs. Instead, posting the USW to the Error Queue causes a LPB Interrupt to become active. It is then up to the adapter and/or system to determine the error recovery procedure.

Note: Performing Step 3 without performing Step 1 may cause a NOT READY condition on the Micro Channel, which may extend greater than 3.5 usec. This may then cause either a Micro Channel Timeout or Channel Check condition.

Note: Performing Step 4 after Step 3 has started and before Step 3 has completed will cause the MIC 112 to terminate the Queue Write operation and a Queue Error for the Q# defined in the QWCR will be indicated to the Local Processor.

Note: Method "A" and Method "B" should NOT be used together in a system.

Note: See the Queue Error Register defined on the LPB 115 for additional errors which may be reported.

Queue Access from the MIC

The MIC 112 has direct access to the Queue Manager function. This allows the MIC 112 access to the Queues without arbitrating for the MC 110 or LPB 115. A priority scheme within the MIC 112 resolves contention for the Queue Pointers requested by the LPB 115 or MC 110.

Specialized Queues and Registers

Besides the QM function the MIC 112 supports three specialized Queues and a specialized register. The three Queues are as follows;

Queue "D" MIC Command Queue. This Queue stores MCWs which are used to initiate MIC Commanded Transfers.

Queue "E" Unsolicited Status Word Queue. This Queue stores USWs which have been generated by the MIC as a result of an error.

Queue "F" Free Block List Queue. This Queue stores starting pointers for available blocks of memory within the LDB 117.

The specialized register is called the Job Pending Register (JPR). This register is used by either a LPB 115 or MC device to determine which of the 16 available Queues contains a pending Queue entry or job.

MIC Command Queue

The MIC 112 automatically monitors the status of the MIC Command Queue (MCQ), Queue "D." If a Queue entry is appended to this Queue then the MIC 112 initiates a Commanded Transfer. See "Commanded Transfers" for more details of a Commanded Transfer. The MCQ can hold up to 1K MCWs.

Free Block List

The MIC 112 manages a special Queue defined as the LDS Free Block List. This Queue contains 4 byte entries which represent the starting address of a range or block within the LDB 117. Up to 1K LDS Blocks can be defined for use. The size of these blocks is dependent on the addresses defined in the FBL Queue and the available memory space.

Note: Since only 1M bytes of data is accessible within LDB 117, only the 20 least significant bits of the 4 byte Free Block entry are valid.

The FBL is controlled in the same manner as the other Queues. The FBL can be loaded during initialization with 4-byte Queue entries equivalent to the starting physical address of the Block in LDS. An interrupt does not need to be assigned for the FBL.

A free block can be removed from the FBL by either a LPB Queue Read operation, a MC Queue Read operation, or reading of the MC Free Block Register. Once removed it is the responsibility of the removing device to utilize and manage this block.

When use of the block is no longer required, the block can be added back into the FBL, by either a LPB Queue Write or MC Queue Write operation. This then makes the block available for use by another device.

Note: The MIC 112 does not automatically return a block to the FBL. It is the responsibility of the Local Processor or System Processor to initiate a block return to the FBL.

MC Free Block List Register

Figure 45:
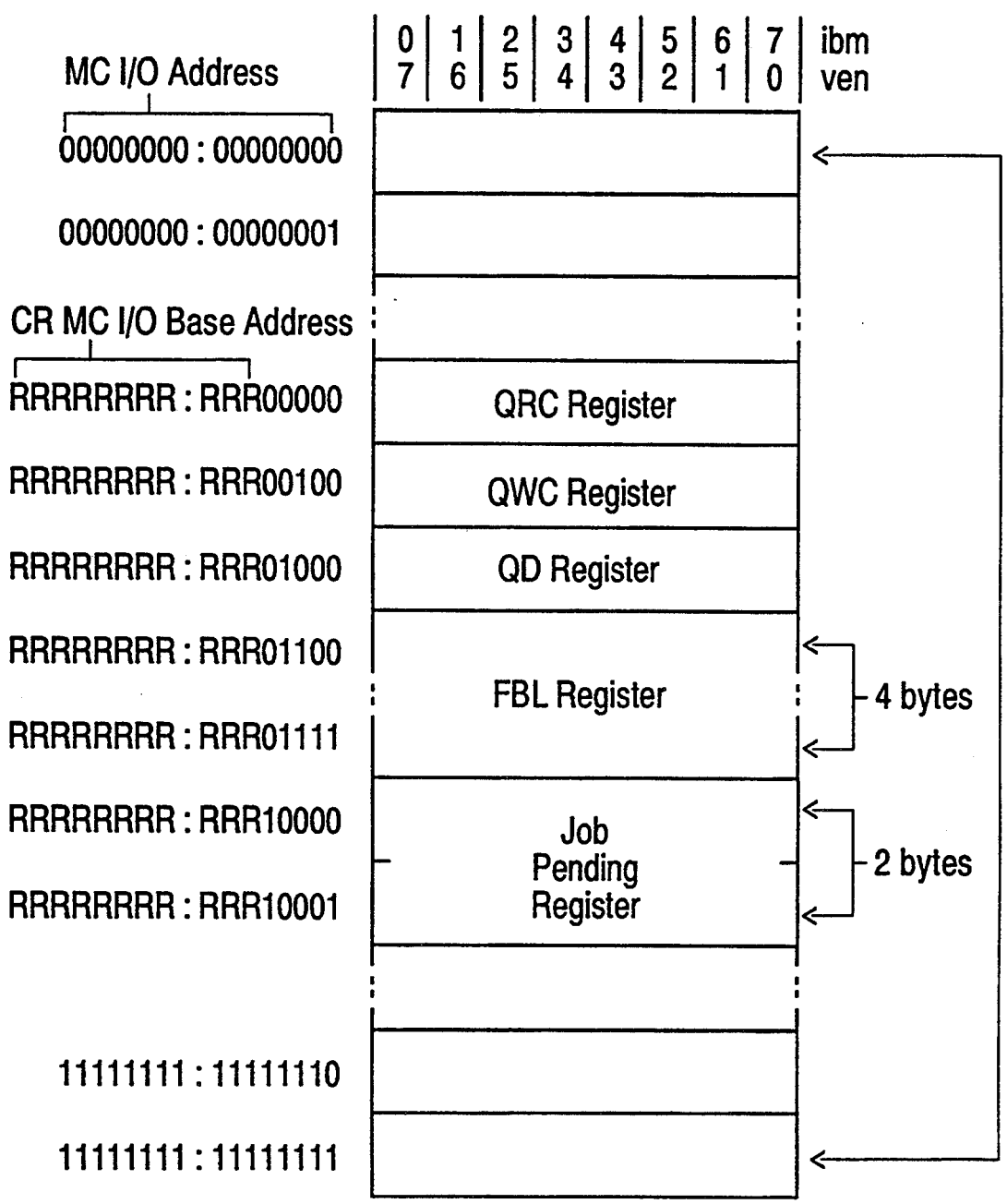
FIG. 45 depicts the free block list and job pending register mapped against the micro channel I/O map.

To improve performance of MC devices which need access to this Queue, the MIC 112 prefetches four 4-byte entries from the FBL. This allows a MC device quick access to Free Blocks in the MC I/O Address space. The four 4-byte entries are temporarily stored within the Prefetch Free Block Buffer until read by a MC device. A 4-byte Prefetched Free Block can be read from the MC Free. Block List Register starting at a MC I/O Address of MIC CR MC I/O Base Address + '01100'. FIG. 45 illustrates this register relative to the MC I/O Address space.

The MC FBL Register provides access to the FBL for any MC device. The FBL Register provides a 4-byte address which represents the starting MC Memory address to a block within the LDB 117. Reading this register removes one of the 4-byte Free Block entries from the Prefetched Free Block Buffer, causing the MIC 112 to begin prefetching another, automatically.

Since only 20 bits are valid from the Free Block List, the MIC 112 must construct a valid 32-bit MC Memory Address. The upper 12 bits are taken from the LDB MC Memory Base Address Register in POS 3 and 4, Subaddress '0101'. The lower 20 bits are taken from the Free Block List.

In addition, the MIC 112 provides a status bit for the MC device. This status bit indicates whether the Free Block Entry is valid or not. The Status can also be used to determine whether a FB fetch retry is necessary or termination of the transfer is required.

Note: The least significant 2 bits of the FBL Entry has been used to represent the FB Status. In doing so, this forces all Free Blocks read from the MC 110 via the FBR to be on 4 byte address boundaries. Note: The MC FBR is a READ ONLY register.

Job Pending Register

The Job Pending Register (JPR) is used to indicate whether a Queue contains a Queue entry or not. When Queues share a hardware interrupt, the JPR can be used to determine which Queue is causing the interrupt. The JPR is 16 bits wide and contains a bit for each Queue. The JPR is accessible from either the LPB 115 or the MC 110. The JPR is located at LPB I/O address='1100' and at MC I/O address='CR MC I/O Base Address:10000'. Note: The JPR can only be written from the LPB 115 when LPM='0'.

Control, Status, and Initialization Registers

The MIC 112 allows devices on the LPB 115 and the MC 110 to access necessary initialization, control, and status registers. Registers related to LPB operations are contained within the LPB Memory and I/O address space. Registers related to MC operations, are contained within the MC POS Registers.

LPB 115

A LPB device can have access to some of the MIC control registers as well as status and initialization registers. The control registers are defined in the LPB memory space and reside within addresses '1002' through '100F' and addresses '1100' through '1146'. Note: To access these control registers, −CSEL MUST be active.

A status register is available to a LPB device via the LPB I/O space which indicates possible Queue errors which may have occurred. This register is called the Queue Error Register (QER) and can be found at LPB I/O address '1142'. The QER can only be written when LPM='0'.

MIC Programmable Option Select. (POS) Registers

The MIC 112 provides software programmable system configuration registers which replace hardware switches and jumpers. These registers are referred to as Programmable Option Select (POS) registers. The POS registers provide configuration and identification data for the MIC 112 and system processor. These registers are loaded with configuration information immediately after system power on reset (POR). The System Configuration protocol is used to access the POS registers. The POS registers consist of eight bytes located at POS I/O addresses XXX0 through XXX7. Several of the POS registers contain required information.

The POS registers also support the use of the Sub-Address feature. The Sub-Address feature allows access to additional registers. These additional registers include programmable LDS size, MC memory slave addresses for accesses to LDS, Interrupt assignments, timers, and MC I/O slave addresses for accesses to the Queues and status. Sub−Addressing is also used to access the Vital Products Data (VPD), necessary for proper MC identification.

An adapter ADF file provides the initial values of all POS registers. The system setup procedure is responsible for loading the values from the ADF file to nonvolatile system memory. The system is also responsible for conflict checking of keywords. During the system POR setup procedure, the values for an adapter's POS registers are read from the nonvolatile RAM and written to the adapter.

Note:
1. Current PS/2 setup software is not capable of accessing or utilizing the POS sub-address feature. Instead, the adapter programmer must either incorporate the loading of these registers in either the device driver or as a separate executable program.
2. The GO bit MUST be set by the LP before the MIC 112 can respond to any MC activity, this INCLUDES POS registers. The GO bit MUST be set within 1 msec from system POS or the MIC 112 will indicate a NOT READY condition on the MC 110.

3. A System Reset or STI Reset Instruction to the MIC 112 will cause the contents of all POS Registers which contain a default state, to return to their default states.

POS 0/1 and VPD Initialization

Information required for POS registers 0 and 1, as well as the VPD is located in LPS. The VPD LPB Base Address register, defines the starting address where the values for POS reg 0/1 and VPD can be found. This base address register MUST be initialized before the system setup software accesses these registers.

When the system setup procedure reads either POS register 0, 1 or the VPD registers, the MIC 112 will fetch the required data from LPS using the VPD base address. This operation requires that the MIC arbitrate for the LPB 115 and become a LPB Master. The adapter designer must guarantee that the MIC 112 can access this data within 1 msec, per MC 110 specifications.

Testability Interface

The STI is used as a serial test interface to the MIC 112. The STI allows access to the MIC's Self Test and Scan control logic. Having access and control to registers and functions allows for improved test and debug of the MIC 112. The STI allows for two different operations to be performed;

1. Instruction/Status Operation
2. Scan Operation

These modes allow the capability for self-testing to be performed. Self-test can be used to determine the state or health of the MIC chip itself.

Self-test

Self-test verifies a large percentage of the MIC's internal logic by using internal scan strings, clock control logic, a Random Pattern Generator (RPG) and a Multiple Input Signature Register (MISR). Using a known starting value within the RPG, a signature can be generated in the MISR which reflects the state or health of the MIC chip itself.

What has been described is a queue pointer manager providing a queue management facility partially implemented in hardware, resulting in a relatively inexpensive queuing mechanism with increased performance over a software managed queue structure.

Although a specific embodiment of the invention has been disclosed, it will be understood by those having skill in the art that changes can be made to that specific embodiment without departing from the spirit and the scope of the invention.

What is claimed is:

1. In a data communications network having local processing units and shared communication buses, a token ring arbitration architecture wherein the token ring arbitration architecture comprises:

a 1-bit token ring used for arbitration only including a plurality of nodes coupled to a shared bus;

arbitration in logic means in a first node coupled to a first control line of the ring used solely for arbitration; for receiving a 1-bit token signal from a preceding node coupled to the ring signifying that the shared bus is available to the first node;

arbitration out logic means in the first node coupled to a second control line of the ring used only for arbitration, for transmitting the token signal to a following node coupled to the ring signifying that the shared bus is available to the following node; and request of bus logic means in the first node coupled to a third control line receiving a request signal from another node signifying that another node is waiting for the shared bus to become available;

whereby the first node has the shared bus available for as long a duration as needed, unless another node requests availability of the shared bus.

2. The ring arbitration architecture of claim 1, which further comprises:

token hold timing means in the first node for timing a maximum duration between a first instant when both the request signal has been received on the third control line and a second instant when the token signal is transmitted on the second control line.

3. The ring arbitration architecture of claim 1, which further comprises:

token rotation timing means in the first node for timing a second maximum duration between the second instant when the token signal is transmitted on the second control line and a third instant when a next token signal is due on the first control line by the first node;

first error logic means in the first node coupled to the token rotation timing means and coupled to an error line for transmitting an error signal to the plurality of nodes signifying that an error has been discovered by the first node; and the token rotation timing means timing the second maximum duration starting at the second instant, and when the first control line has not received the next token signal by the third instant, the first error logic means transmitting the error signal on the error line.

4. The ring arbitration architecture of claim 3, which further comprises:

second error logic means in the plurality of nodes coupled to the error line, for receiving the error signal and in response thereto, signalling the plurality of nodes to enter a ring down state.

5. The ring arbitration architecture of claim 4, wherein the first error logic means modulates the error signal to a first signal state representing the occurrence of a recoverable error detected by the first node or alternately modulating the error signal to a second signal state representing the occurrence of a non-recoverable error detected by the first node.

6. The ring arbitration architecture of claim 4, wherein the first node is a ring master node, which transmits a new token signal on the ring after the plurality of nodes have entered the ring down state.

7. The ring arbitration architecture of claim 1, wherein the ring and the shared bus occupying a unitary circuit card onto which is mounted the plurality of nodes.

8. The ring arbitration architecture of claim 6, which further comprises:

a communications network coupled to the first node; and, a data processing device coupled to a second node.

9. The ring arbitration architecture of claim 1, wherein a second node is both the preceding node and the following node, the plurality of nodes consisting of the first node and the second node.

10. In a data communications network having local processing units, and shared communications buses, a token ring arbitration method wherein the token ring arbitration method comprises the steps of:

generating a 1-bit token signal on a ring used for arbitration only, the ring including a plurality of nodes coupled to a shared bus;

determining which of a plurality of nodes has control of the shared bus;

receiving in a first node coupled to a first control line of the ring used for arbitration only the token signal from a preceding node coupled to the ring used for arbitration only;

signifying that the shared bus coupled to the first node is available to the first node;

transmitting from the first node coupled to a second control line of the ring, the token signal to a following node signifying that the shared bus is available to the following node; and receiving at the first node coupled to a third control line, a request signal from another node signifying that another node is waiting for the shared bus to become available;

whereby the first node has a data line available for as long a duration as needed, unless the following node requests availability of the data line.

11. The ring arbitration method of claim 10, which further comprises the steps of:

storing in the first node, a maximum duration value representing a maximum duration between a first instant when the request signal has been received on the third line and a second instant when the token signal is transmitted on the second line; and, timing the maximum duration at the first node, starting at the first instant and initiating at the second instant the transmission of the token on the second control line.

12. The ring arbitration method of claim 10, which further comprises the steps of:

storing in the first node, a second maximum duration value representing a second maximum duration between the second instant when the token signal is transmitted on the second control line and a third instant when a next token signal is due on the first control line by the first node;

transmitting from the first node coupled to an error line of the ring, an error signal to the plurality of nodes signifying that an error has occurred in the first node; and, timing at the first node the second maximum duration starting at the second instant and transmitting the error signal on the error line if the first node has not received the next token signal by the third instant.

13. The ring arbitration method of claim 12, which further comprises the steps of:

receiving at the plurality of nodes coupled to the error line, the error signal and in response thereto, signalling the nodes to enter a ring down state.

14. The improved token ring communications method of claim 13, which further comprises the steps of:

modulating in the first node the error signal to a first signal state representing the detection of a recoverable error by the first node or alternately modulating the error signal to a second signal state representing the detection of a non-recoverable error by the first node.

15. The ring arbitration method of claim 14, which further comprises the steps of:

transmitting from a preselected ring master node a new token signal on the ring after the plurality of nodes have entered the ring down state.

16. The ring arbitration method of claim 10, wherein the ring and the shared bus occupy a unitary circuit card onto which is mounted the plurality of nodes.

17. The ring arbitration method of claim 16, wherein the first node is coupled to a communications network interface and the second node is coupled to a data processing device.

18. The ring arbitration d of claim 10, wherein a second node is both the preceding node and the following node, the plurality of nodes consisting of the first node and the second node.

19. A data communications network having local processing units and shared communication buses, wherein access to a shared bus by a plurality of processors is arbitrated by an improved token ring arbitration architecture wherein the improvement comprises:

a 1-bit token ring used for arbitration only including a plurality of nodes coupled to the shared bus;

a plurality of processors coupled to the shared bus which are arbitrated by the 1-bit token ring;

arbitration in logic means coupled to a first control line of a ring used for arbitration only for receiving a token signal from a preceding processor coupled to such ring signifying that the shared bus is available to the processor;

arbitration out logic means coupled to a second control line of the ring used for arbitration only for transmitting the token signal to a following processor coupled to the ring signifying that the shared bus is available to the following processor;

request of bus logic means coupled to a third control line for receiving a request signal from another processor coupled to the ring signifying that another processor is waiting for the shared bus to become available; and communication logic means to communicate with the shared bus if the processor has the token;

so that the processor has access to the shared bus as long as a duration is needed, unless another node requests availability of the shared bus.

20. The token ring arbitration architecture of claim 1 wherein a 1-bit token arbitration signal is a one cycle active low pulse.

* * * * *